(12) United States Patent
Takahashi

(10) Patent No.: US 6,262,852 B1
(45) Date of Patent: *Jul. 17, 2001

(54) REAL IMAGE MODE FINDER AND CAMERA USING THE SAME

(75) Inventor: Toshio Takahashi, Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/357,076

(22) Filed: Jul. 19, 1999

(30) Foreign Application Priority Data

Jul. 21, 1998 (JP) .................................................. 10-205541

(51) Int. Cl.⁷ .......................... G02B 25/00; G02B 27/10; G02B 27/12; G02B 13/02; G02B 13/08
(52) U.S. Cl. .......................... 359/643; 359/627; 359/640; 396/384; 396/386
(58) Field of Search .................................. 359/618, 625, 359/627, 631, 633, 640, 643, 644, 645, 646; 396/271, 296, 351, 373, 379, 382, 383, 384, 385, 386

(56) References Cited

U.S. PATENT DOCUMENTS

| | | | | |
|---|---|---|---|---|
| 5,920,427 | * | 7/1999 | Ogata | 359/432 |
| 5,970,266 | * | 10/1999 | Takato | 396/379 |
| 6,018,417 | * | 1/2000 | Yano | 359/431 |
| 6,035,145 | * | 8/2000 | Kanni | 396/379 |
| 6,038,069 | * | 3/2000 | Yamaguchi | 359/432 |
| 6,041,193 | * | 3/2000 | Aoki | 369/379 |
| 6,052,225 | * | 4/2000 | Hoshi | 359/432 |
| 6,058,273 | * | 5/2000 | Abe | 396/384 |
| 6,115,182 | * | 9/2000 | Haushita | 359/618 |

FOREIGN PATENT DOCUMENTS

| | | |
|---|---|---|
| 3-81749 | 4/1991 | (JP) . |
| 3-217829 | 9/1991 | (JP) . |
| 5-93859 | 4/1993 | (JP) . |
| 8-76192 | 3/1996 | (JP) . |
| 8-129203 | 5/1996 | (JP) . |
| 8-240769 | 9/1996 | (JP) . |
| 9-211544 | 8/1997 | (JP) . |

* cited by examiner

*Primary Examiner*—Georgia Epps
*Assistant Examiner*—Saeed Seyrafi
(74) *Attorney, Agent, or Firm*—Pillsbury Winthrop LLP

(57) ABSTRACT

A real image mode finder includes an objective optical system with a positive refracting power, an image erecting optical system with a roof reflecting section, a first planar reflecting section, and a second planar reflecting section, and an eyepiece optical system with a positive refracting power. The image erecting optical system is constructed so that the optical axis does not cross in this optical system and a ray of light from the objective optical system is introduced into the roof reflecting section, the first planar reflecting section, and the second planar reflecting section in this order. The real image mode finder also satisfies the following conditions:

$$49° < \gamma < 62.5°$$

$$20° < \alpha < 30°$$

where $\gamma$ is an angle of incidence of an axial ray of light on the second planar reflecting section and $\alpha$ is an angle of incidence of the axial ray of light on the roof ridgeline of the roof reflecting section. In this way, the real image mode finder which is easy in fabrication and small in size while maintaining good optical performance can be provided.

47 Claims, 34 Drawing Sheets

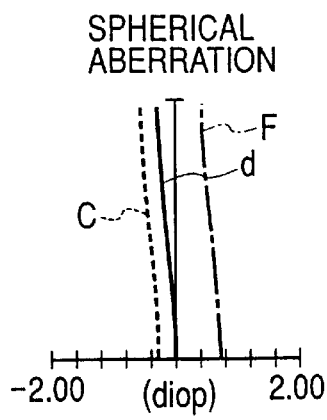
FIG. 18A SPHERICAL ABERRATION
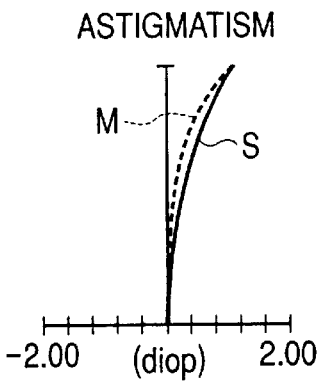
FIG. 18B ASTIGMATISM
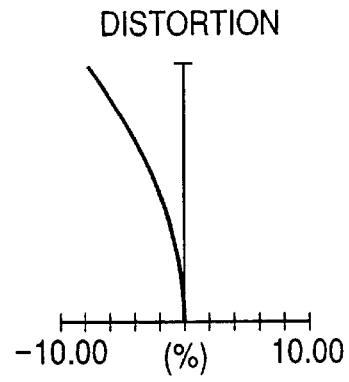
FIG. 18C DISTORTION
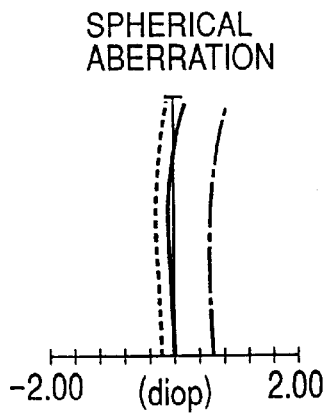
FIG. 19A SPHERICAL ABERRATION
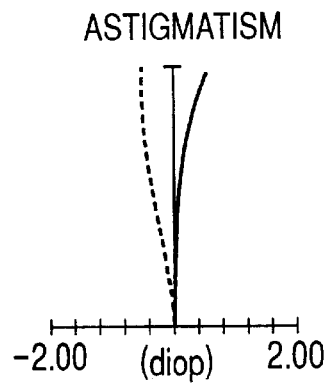
FIG. 19B ASTIGMATISM
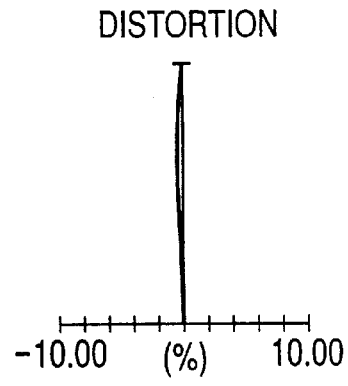
FIG. 19C DISTORTION
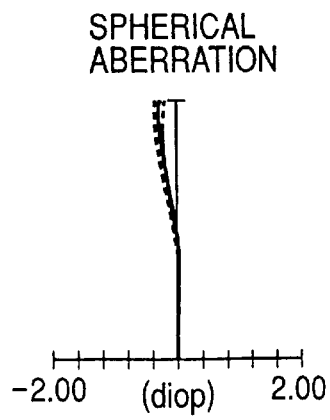
FIG. 20A SPHERICAL ABERRATION
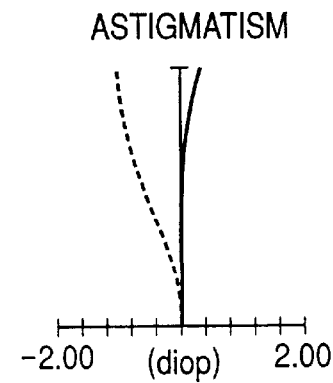
FIG. 20B ASTIGMATISM
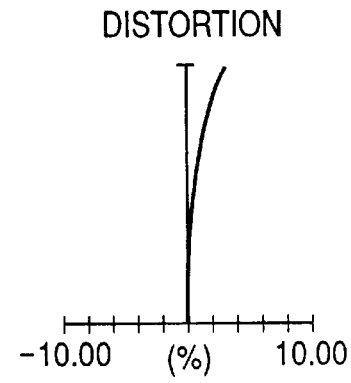
FIG. 20C DISTORTION

SPHERICAL ABERRATION

-2.00  (diop)  2.00

ASTIGMATISM

-2.00  (diop)  2.00

DISTORTION

-10.00  (%)  10.00

SPHERICAL ABERRATION

-2.00  (diop)  2.00

ASTIGMATISM

-2.00  (diop)  2.00

DISTORTION

-10.00  (%)  10.00

SPHERICAL ABERRATION

-2.00  (diop)  2.00

ASTIGMATISM

-2.00  (diop)  2.00

DISTORTION

-10.00  (%)  10.00

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

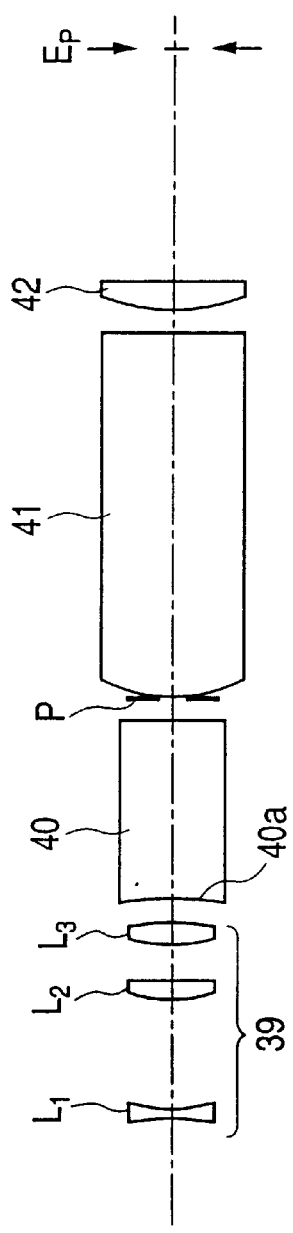
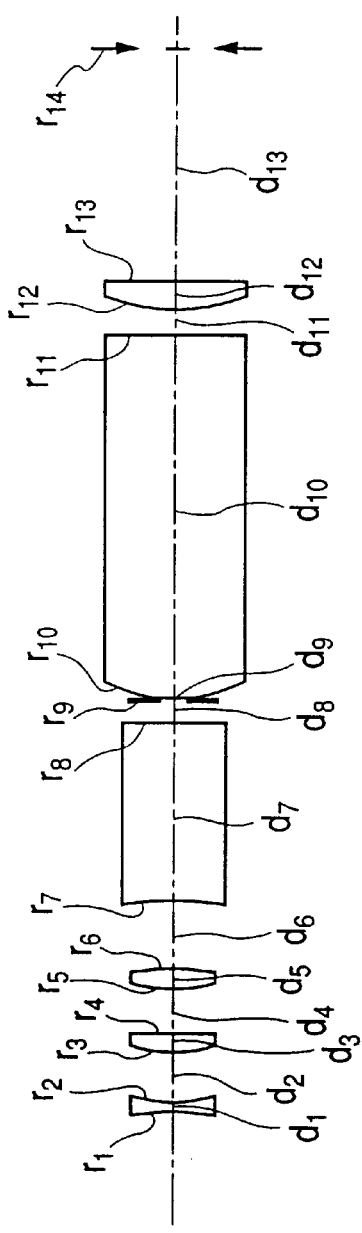
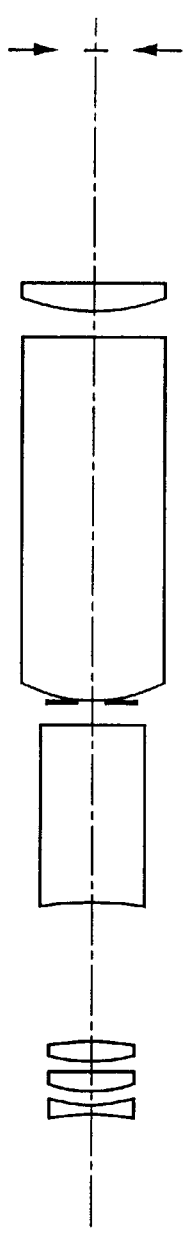
FIG. 29A
FIG. 29B
FIG. 29C

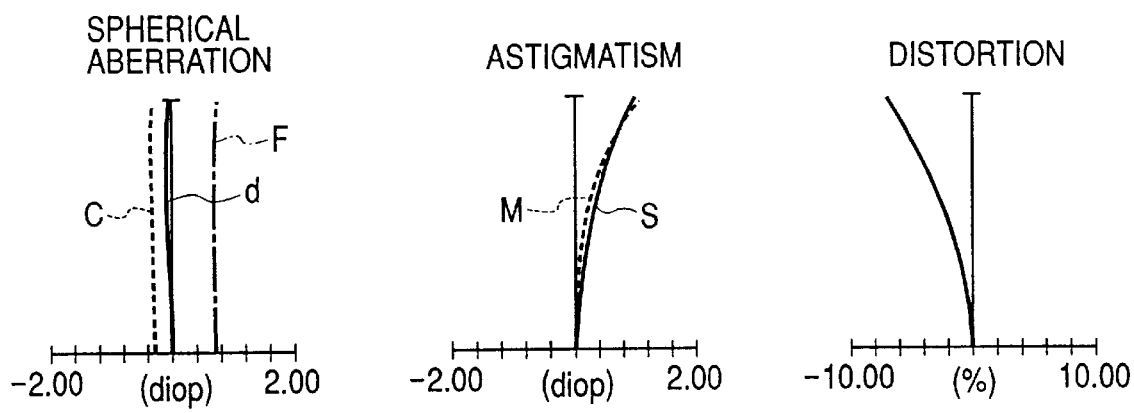
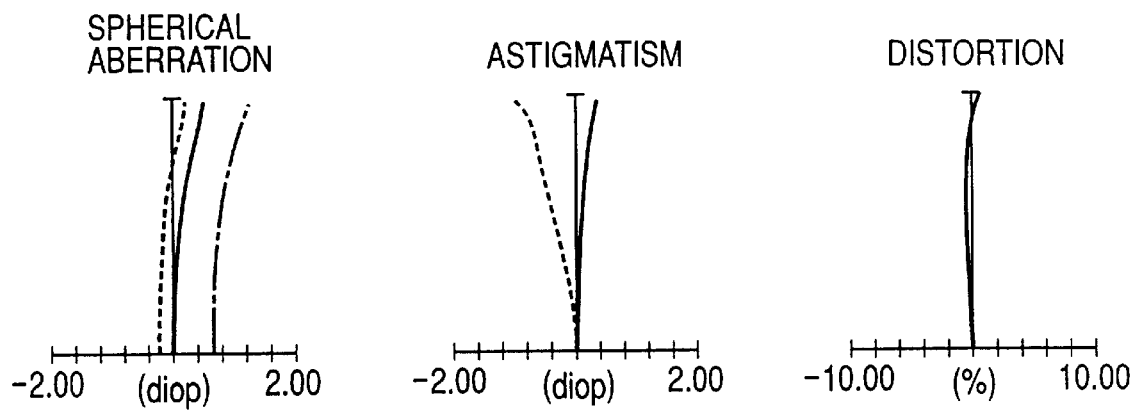
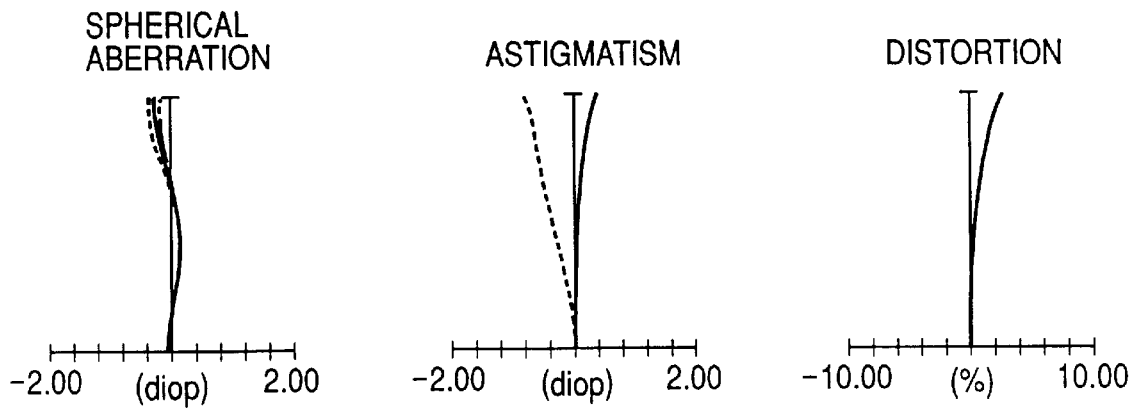

SPHERICAL ABERRATION

-2.00  (diop)  2.00

ASTIGMATISM

-2.00  (diop)  2.00

DISTORTION

-10.00  (%)  10.00

SPHERICAL ABERRATION

-2.00  (diop)  2.00

ASTIGMATISM

-2.00  (diop)  2.00

DISTORTION

-10.00  (%)  10.00

SPHERICAL ABERRATION

-2.00  (diop)  2.00

ASTIGMATISM

-2.00  (diop)  2.00

DISTORTION

-10.00  (%)  10.00

FIG. 38A
SPHERICAL ABERRATION
FIG. 38B
ASTIGMATISM
FIG. 38C
DISTORTION
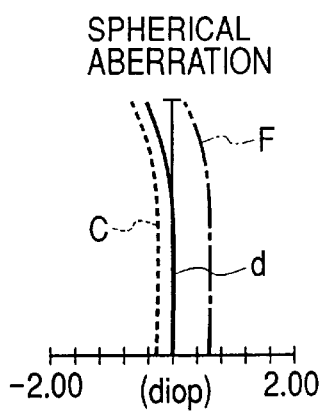
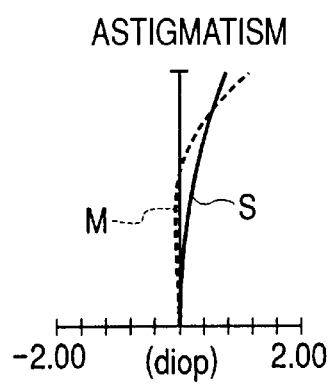
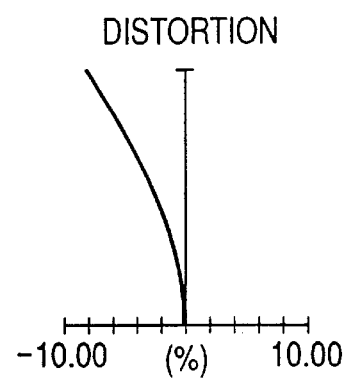
FIG. 39A
SPHERICAL ABERRATION
FIG. 39B
ASTIGMATISM
FIG. 39C
DISTORTION
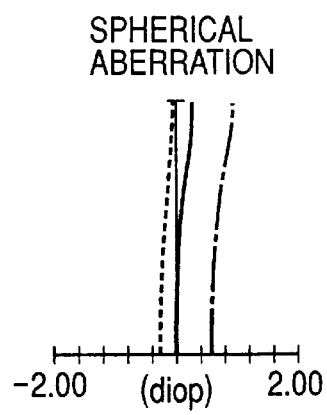
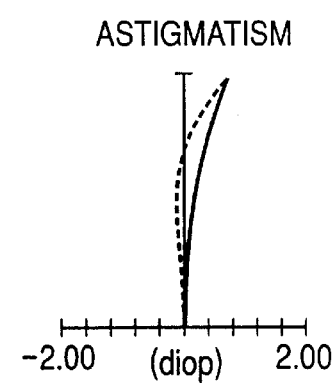
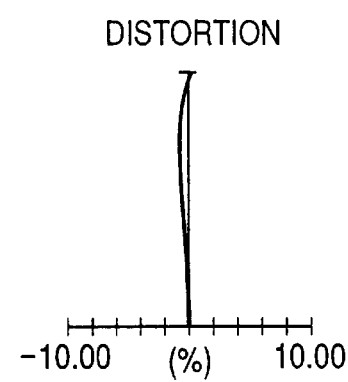
FIG. 40A
SPHERICAL ABERRATION
FIG. 40B
ASTIGMATISM
FIG. 40C
DISTORTION
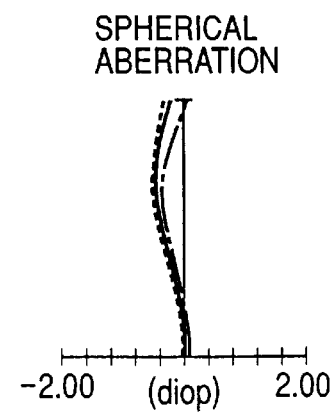
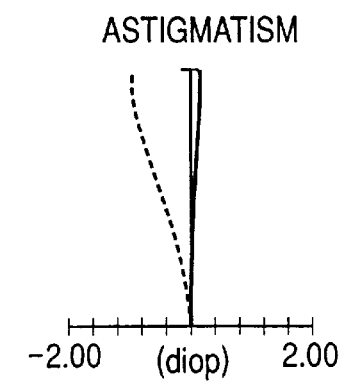
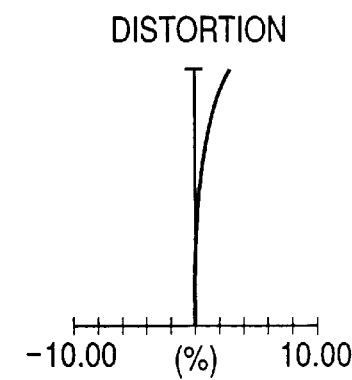

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

-2.00  (diop)  2.00

ASTIGMATISM

-2.00  (diop)  2.00

DISTORTION

-10.00  (%)  10.00

SPHERICAL ABERRATION

-2.00  (diop)  2.00

ASTIGMATISM

-2.00  (diop)  2.00

DISTORTION

-10.00  (%)  10.00

SPHERICAL ABERRATION

-2.00  (diop)  2.00

ASTIGMATISM

-2.00  (diop)  2.00

DISTORTION

-10.00  (%)  10.00

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

REAL IMAGE MODE FINDER AND CAMERA USING THE SAME

BACKGROUND OF THE INVENTION

1. Field of the Invention

This invention relates to a real image mode finder suitable for use in a lens shutter camera or an electronic still camera in which a finder optical system is constructed to be independent of a photographing optical system.

2. Description of Related Art

In general, finders in which a finder optical system is constructed to be independent of a photographing optical system, used in lens shutter cameras, can be roughly divided into two classes: virtual image mode finders and real image mode finders. In the case where an attempt is made to improve a variable magnification ratio of the virtual image mode finder, the diameter of a front lens must be enlarged, which constitutes an obstacle to compactness of the finder. In this way, the real image mode finder is used for preference in a compact camera.

Recently, in keeping with compactness of the lens shutter camera and an improvement on the variable magnification ratio of its finder, further compactness of the finder mounted in the camera has been required. In particular, interest in a so-called depth-reduced camera, which is designed to reduce the depth of the camera (in a direction indicated by an arrow Q in FIG. 1), is heightened. In order to construct such a camera, it is particularly necessary to reduce the overall length of the finder, not to speak of a collapsible length of the photographing optical system. Here, the overall length refers to an actual length from the foremost object-side surface of an objective optical system including an image erecting optical system to the rearmost pupil-side surface of an eyepiece optical system. In addition, for compactness of the finder, a reduction in the thickness of the image erecting optical system, as well as in the overall length of a lens system constituting the finder, is required.

Furthermore, in recent compact cameras, a camera usually referred to as a zoom type in which lenses need not be exchanged and photography can be performed with a single lens system in regard to various focal lengths is being chiefly used, and a higher variable magnification ratio is required. A variable magnification camera with a variable magnification ratio as high as 2.5 or more is also often required.

In order to meet such demands, it is necessary to construct a depth-reduced camera which is small in size and has a high variable magnification ratio.

An image erecting optical system for constituting such a camera includes, for example, a conventional Porro prism, a combination of a roof prism and a pentaprism such as that disclosed in Japanese Patent Preliminary Publication No.. Hei 9-211544, or an optical system disclosed in each of Japanese Patent Preliminary Publication Nos. Hei 3-81749, Hei 3-217829, and Hei 8-129203.

On the other hand, a finder for constituting the camera which is small in size and has a high variable magnification ratio is designed so that an objective optical system includes lenses with negative, positive, and positive powers in this order from the object side, as disclosed in each of Japanese Patent Preliminary Publication Nos. Hei 5-93859 and Hei 8-240769, or an objective optical system includes lenses with negative, positive, and negative powers in this order from the object side, as disclosed in Japanese Patent Preliminary Publication No. Hei 8-76192.

However, if the Porro prism is used as the image erecting optical system of the finder, a finder optical system becomes bulky in a vertical direction when a ray of light is deflected vertically, which causes obstruction to compactness of the camera.

In contrast with this, when the image erecting optical system is constructed with a combination of the roof prism and the pentaprism as disclosed in Hei 9-211544, a vertical space required for the finder optical system is approximately halved, compared with the case where the Porro prism is used, even when the ray of light is deflected vertically as shown in FIG. 2. In this case, however, an angle of deflection θ of the ray of light in the roof prism is about 90°. If the angle of deflection θ is made smaller than 90°, a thickness A of the image erecting optical system will be increased. In general, this indicates that as the angle of deflection θ of the ray increases, a space can be saved with respect to a direction along the optical axis of incidence on the finder.

In FIG. 3A, an angle of incidence γ of an axial ray Li on a reflecting surface R is larger than that of FIG. 3B. From these figures, it is found that when light beams with identical diameters are bent, a space $C_0$ required increases with increasing angle of incidence of the ray on the reflecting surface. Thus, when an image erecting optical system in which the space $C_0$ is relatively large is used to reduce the thickness of the finder (that is, diminish a distance from the entrance surface of the objective optical system to the exit surface of the eyepiece optical system), it is inevitable that a space (indicated by reference symbol B in FIG. 2) in which the zoom lens units of the objective optical system are movable becomes narrow, which is unfavorable. Specifically, if an attempt is made to forcedly attain a high variable magnification ratio in a narrow zoom space in order to reduce the depth of the camera, the refracting power of each of the lens units of the objective optical system in the finder must be strengthened. This causes considerable degradation to the performance of the finder even with a slight manufacturing error.

Similarly, in an embodiment disclosed in Hei 3-81749, as shown in FIG. 4, the angle of deflection of a ray of light at a first reflecting member 101 is small and thus compactness of the finder is accomplished in terms of its lateral direction, but not in terms of the depth of the camera. Further, In an embodiment disclosed in Hei 3-217829, as shown in FIG. 5, the angle of deflection of a ray at a first reflecting section 102 is large and this is favorable for a reduction in thickness of the finder. Since, however, this finder is designed so that the angle of deflection of the ray at a second reflecting section 103 is also relatively large and an incident ray of the finder is nearly parallel to an emergent ray thereof, the angle of deflection of the ray at a third reflection section 104 must be made small, and the thickness of the finder cannot be completely reduced.

In the disclosure of Hei 8-129203, a light beam is introduced into a roof reflecting section through two reflecting members. In this embodiment, the angles of deflection of the ray at the two planar reflecting members are small and this is suitable for reducing the depth of the camera. With such a configuration, however, the optical path length of the eyepiece optical system must be increased in order to ensure the optical path of the roof reflecting section. For this purpose, if an attempt is made to simply construct the eyepiece optical system, for example, with a single lens, it becomes very difficult to diminish the focal length of the eyepiece optical system. This directly causes a reduction in finder magnification, which is a value dividing the focal length of the objective optical system by that of the eyepiece optical system, and results in a cumbersome finder. This finder also has the drawback that since the roof reflecting section is located closer to the eyepiece side than an intermediate image position, the roof ridgeline of the roof reflecting section enters the visual field even when the eye is slightly separated from the camera.

For the objective optical system, a smaller zoom space is suitable for compactness of the camera because of a restriction on the layout of the camera.

In each of the embodiments disclosed in Hei 5-93859 and Hei 8-240769, the objective optical system is constructed with lens units having negative, positive, and positive refracting powers in this order from the object side. Although this power distribution makes the first lens unit easy to fix when the magnification of the finder is changed, the back focal distance of the objective optical system becomes diminished. Thus, when the roof reflecting section is particularly interposed between the objective optical system and the intermediate image position thereof, the roof reflecting section generally needs an optical path length longer than the case where a ray of light is twice-reflected by planar reflecting surfaces. Consequently, its arrangement becomes difficult or a severe restriction is imposed on the angle of reflection of the ray.

A finder set forth in each of the first to third embodiments of Hei 8-76192 is constructed with lens units having negative, positive, and negative refracting powers in this order from the object side, and has the power distribution which allows the third lens unit to be fixed when the magnification is changed. On the other hand, this finder, which is designed to need a large zoom space, is not suitable for compactness or a reduction of thickness. A finder of the fourth embodiment is constructed to attain a high variable magnification ratio with a narrow zoom space, but distortion produced in the vicinity of the wide-angle position of the finder is as much as 15% and thus it cannot be positively said that complete optical performance is maintained. Further, a single lens is used as a condenser lens in the vicinity of the intermediate image position. In this way, when the single lens is properly used, good optical performance is easier to obtain than the case where the entrance surface of a prism is provided with a curvature to possess the function of the condenser lens. This arrangement, however, brings about a costly finder which has a large number of parts. Since the number of surfaces of optical members are also increased, the transmittance of light is reduced and a finder which is dark in visual field and hard to see is obtained. Additionally, in this embodiment, there is the need to construct an image erecting optical system using mirrors between the objective optical system and the intermediate image position. In general, however, a mirror reflecting surface has a reflectance lower than the totally reflecting surface of a prism, and thus there is a high possibility that the finder becomes darker.

SUMMARY OF THE INVENTION

It is, therefore, a primary object of the present invention to provide a real image mode finder which is provided with an image erecting optical system simply constructed to be suitable for compactness or a reduction in depth of a camera, while maintaining good optical performance, is easy to fabricate and use, and is small in size and thickness.

It is another object of the present invention to provide a real image mode finder which is capable of obtaining a high variable magnification ratio while maintaining excellent optical performance.

In order to achieve the above objects, the real image mode finder according to the present invention includes an objective optical system with a positive refracting power; an image erecting optical system with a roof reflecting section, a first planar reflecting section, and a second planar reflecting section; and an eyepiece optical system with a positive refracting power. The image erecting optical system is constructed so that the optical axis does not cross in this optical system and a ray of light from the objective optical system is introduced into the roof reflecting section, the first planar reflecting section, and the second planar reflecting section in this order. The real image mode finder also satisfies the following conditions:

$$49° < \gamma < 62.5°$$

$$20° < \alpha < 30°$$

where $\gamma$ is an angle of incidence of an axial ray of light on the second planar reflecting section and $\alpha$ is an angle of incidence of the axial ray of light on the roof ridgeline of the roof reflecting section.

Further, the real image mode finder of the present invention includes an objective optical system with a positive refracting power; an image erecting optical system with a roof reflecting section, a first planar reflecting section, and a second planar reflecting section; and an eyepiece optical system with a positive refracting power. The image erecting optical system is constructed so that the optical axis does not cross in this optical system and a ray of light from the objective optical system is introduced into the roof reflecting section, the first planar reflecting section, and the second planar reflecting section in this order. The first and second planar reflecting sections are constructed integrally with a prism, and a predetermined surface of the prism where an effective light beam does not pass is shaped into a concave form.

Still further, the real image mode finder of the present invention includes, in order from the object side, an objective optical system in which three lens units with negative, positive, and negative refracting powers are arranged to change the magnification of the finder; a condenser lens component with a positive refracting power; an image erecting optical system; and an eyepiece optical system with a positive refracting power. The real image mode finder also satisfies the following conditions:

$$1.5 < D/fw < 2.2$$

$$2.52 < Z < 10$$

where D is an axial distance from the foremost object-side surface of the objective optical system to the rearmost image-side surface thereof, fw is the focal length of the objective optical system at the wide-angle position of the finder, and Z is a variable magnification ratio.

These and other objects as well as the features and advantages of the present invention will become apparent from the following detailed description of the preferred embodiments when taken in conjunction with the accompanying drawings.

BRIEF DESCRIPTION OF THE DRAWINGS

FIGS. 18A, 18B, and 18C are diagrams showing aberration curves at the wide-angle position of the real image mode finder of the fifth embodiment;

FIGS. 19A, 19B, and 19C are diagrams showing aberration curves at the middle position of the real image mode finder of the fifth embodiment;

FIGS. 20A, 20B, and 20C are diagrams showing aberration curves at the telephoto position of the real image mode finder of the fifth embodiment;

FIGS. 29A, 29B, and 29C are sectional views showing arrangements, developed along the optical axis, at wide-angle, middle, and telephoto positions, respectively, of the real image mode finder of an eighth embodiment in the present invention;

FIGS. 30A, 30B, and 30C are diagrams showing aberration curves at the wide-angle position of the real image mode finder of the eighth embodiment;

FIGS. 31A, 31B, and 31C are diagrams showing aberration curves at the middle position of the real image mode finder of the eighth embodiment;

FIGS. 32A, 32B, and 32C are diagrams showing aberration curves at the telephoto position of the real image mode finder of the eighth embodiment;

FIGS. 38A, 38B, and 38C are diagrams showing aberration curves at the wide-angle position of the real image mode finder of the tenth embodiment;

FIGS. 39A, 39B, and 39C are diagrams showing aberration curves at the middle position of the real image mode finder of the tenth embodiment;

FIGS. 40A, 40B, and 40C are diagrams showing aberration curves at the telephoto position of the real image mode finder of the tenth embodiment;

DETAILED DESCRIPTION OF THE PREFERRED EMBODIMENTS

The real image mode finder according to the present invention includes an objective optical system with a positive refracting power; an image erecting optical system with a roof reflecting section, a first planar reflecting section, and a second planar reflecting section; and an eyepiece optical system with a positive refracting power. The image erecting optical system is constructed so that the optical axis does not cross in this optical system and a ray of light from the objective optical system is introduced into the roof reflecting section, the first planar reflecting section, and the second planar reflecting section in this order. The real image mode finder also satisfies the following conditions:

$$49° < \gamma < 62.5° \qquad (1)$$

where $\gamma$ is an angle of incidence of an axial ray of light on the second planar reflecting section.

Figure 3A:
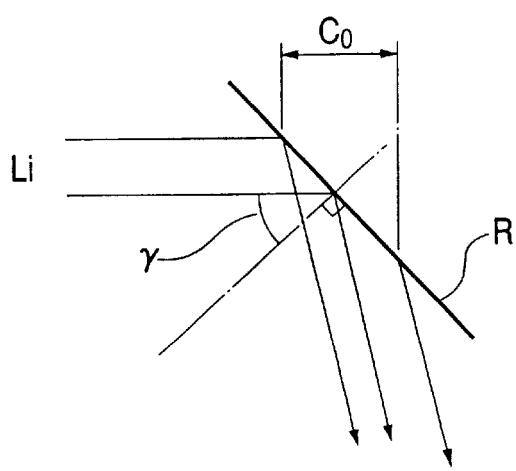
FIGS. 3A and 3B are views for explaining light incident on reflecting surfaces and the states of its reflections.
Figure 3B:
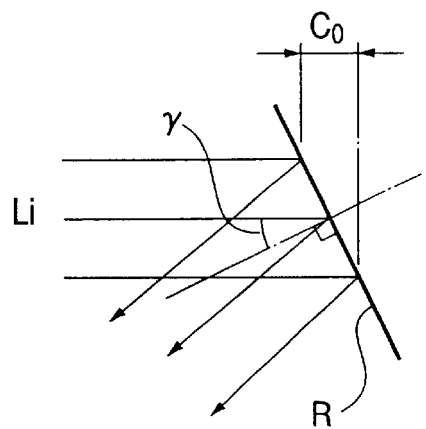
Figure 4:
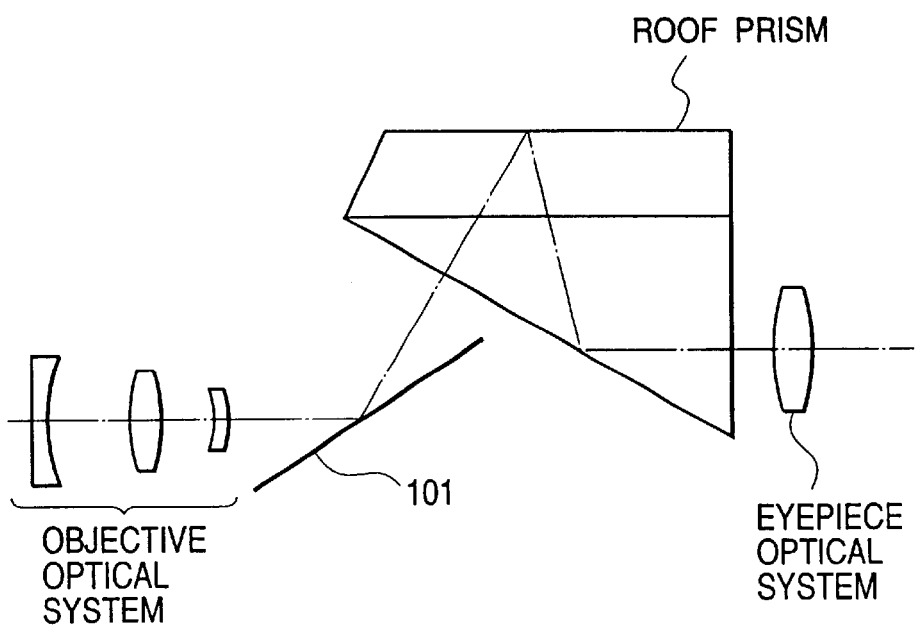
FIG. 4 is a sectional view showing the arrangement, along the optical axis, of another conventional real image mode finder.
Figure 5:
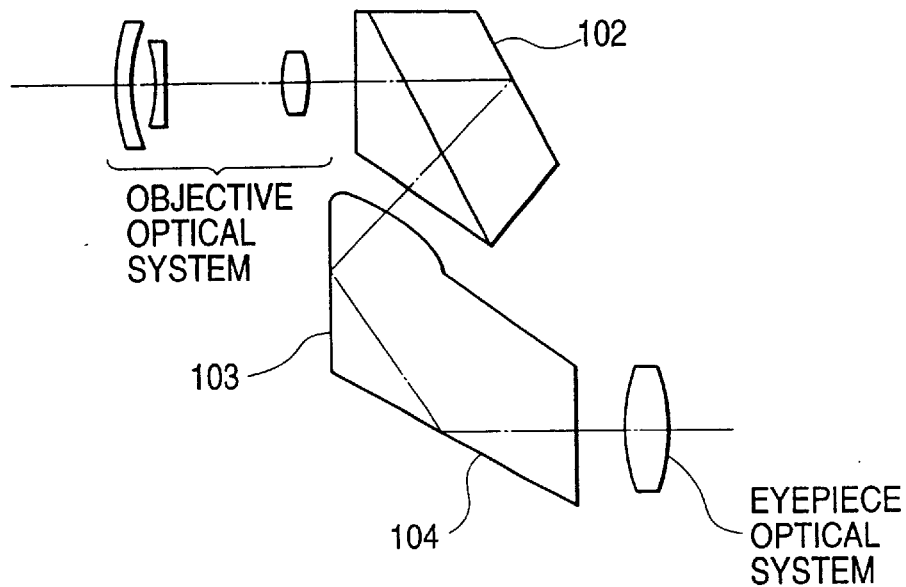
FIG. 5 is a sectional view showing the arrangement, along the optical axis, of still another conventional real image mode finder.

Here, if the value of the angle $\gamma$ exceeds the upper limit of Condition (1), the angle of incidence of the axial ray on the second planar reflecting section will increase, and thus, as shown in FIG. 3B, the space $C_0$ also increases. This needs a large space along the direction of the optical axis after the second planar reflecting section. Such an arrangement causes obstruction to a reduction in depth of a camera.

Figure 1:
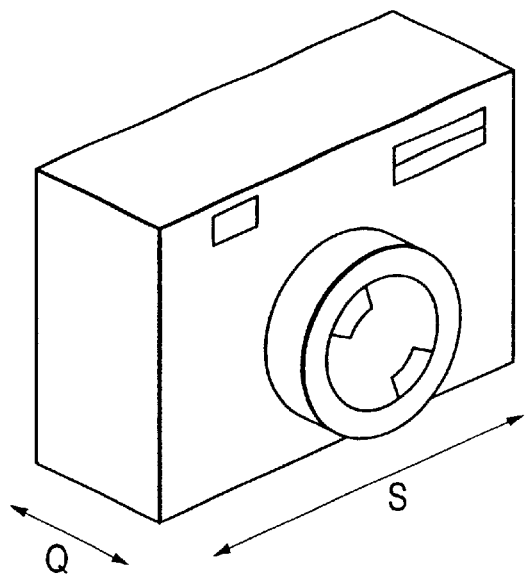
FIG. 1 is a perspective view showing a general compact camera.
Figure 2:
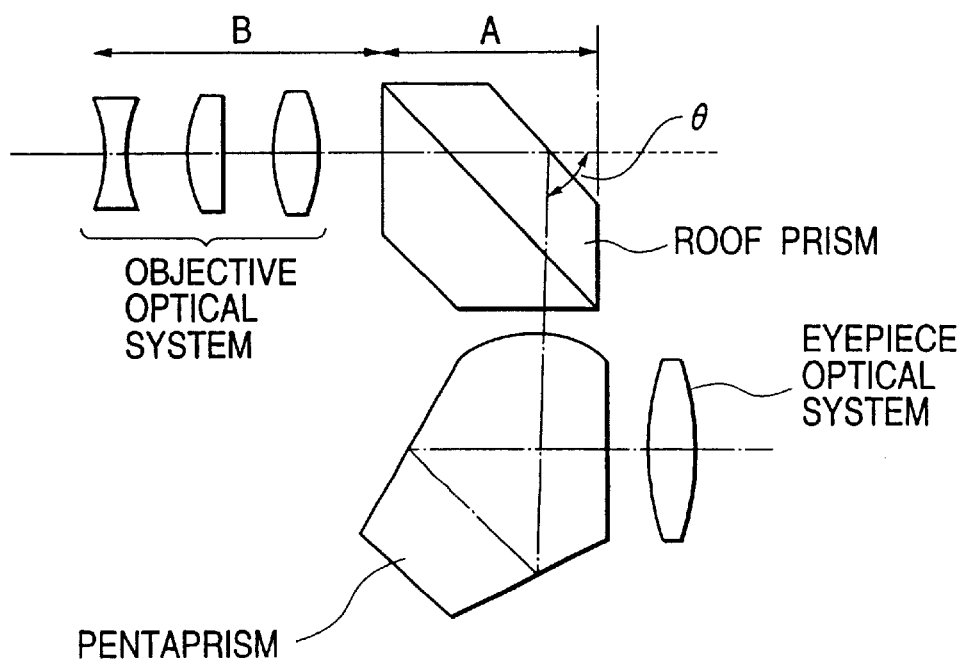
FIG. 2 is a sectional view showing the arrangement, along an optical axis, of a conventional real image mode finder.

On the other hand, if the value of the angle $\gamma$ is below the lower limit of Condition (1), the angle of deflection of the axial ray at the second planar reflecting section becomes too small and an optical path length required in the vicinity of the second planar reflecting section will increase. Thus, with a simple eyepiece optical system which is constructed with, for example, a single lens, it is difficult to ensure the optical path length required. Such an arrangement, although suitable for reducing the depth of the camera (in a direction indicated by the arrow Q in FIG. 1), needs a large space in the direction in which the optical axis is bent by the second planar reflecting section, for example, in the lateral direction of the camera (indicated by an arrow S in FIG. 1). This is unfavorable.

Also, each of the first and second planar reflecting sections may be substituted by a rotational symmetric aspherical surface, an anamorphic surface, a toric surface, or a curved surface which is symmetrical to only a plane including a returned optical axis.

Where the real image mode finder of the present invention is mounted in a camera, it is necessary to construct a compact image erecting optical system because a finder cam member and other electrical systems are arranged in the finder. Thus, in order to achieve this purpose, it is desirable that the angle γ satisfies the following condition;

$$51.5° < \gamma < 56.5° \tag{1'}$$

Also, it is more desirable that the angle γ, if possible, satisfies the following condition;

$$53.5° < \gamma < 55° \tag{1''}$$

or $$53.5° < \gamma < 53° \tag{1'''}$$

In addition to Conditions (1), (1'), and (1''), the real image mode finder of the present invention is capable of allowing a reduction of its thickness by satisfying the following condition:

$$20° < \alpha < 30° \tag{2}$$

where α is an angle of incidence of the axial ray on the roof ridgeline of the roof reflecting section.

Figure 6A:
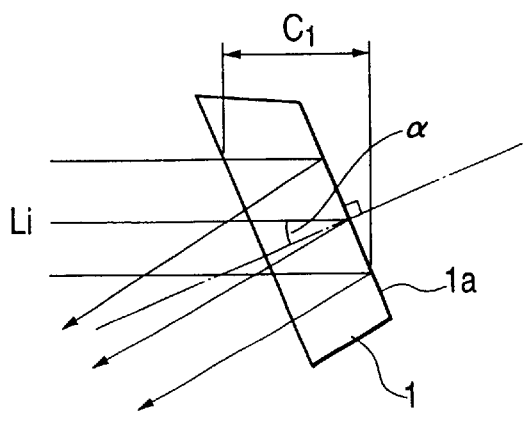
FIG. 6A is a view showing light incident on a roof prism used in the real image mode finder of the present invention and a state of its reflection.
Figure 6B:
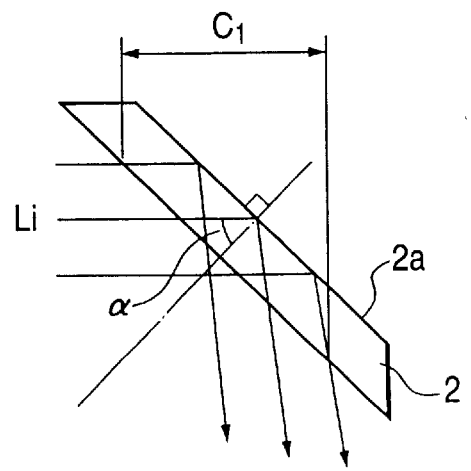
FIG. 6B is a view showing light incident on a roof prism used in the conventional real image mode finder and a state of its reflection.

In the real image mode finder of the present invention, the angle of incidence α of the axial ray on the roof ridgeline of the roof reflecting section constituting the image erecting optical system used is defined by Condition (2). FIG. 6A shows light Li incident on a roof ridgeline 1a of a roof prism 1 used in the real image mode finder of the present invention and a state of its reflection. FIG. 6B shows the light Li incident on a roof ridgeline 2a of a roof prism 2 used in a conventional real image mode finder and a state of its reflection. As shown in these figures, the finder of the present invention, in contrast with the conventional finder, requires a less space (in a direction along the optical axis of the objective optical system, indicated by reference symbol $C_1$ in FIG. 6A) to reflect the light. Hence, the finder of the present invention is capable of ensuring a larger zoom space of the objective optical system than the conventional finder.

However, if the value of the angle α oversteps the upper limit of Condition (2), the angle of incidence of the axial ray on the roof ridgeline becomes extremely large. In this case, therefore, unless the depth of the camera is increased, the problem will be caused that the share of the roof prism in a finder optical system is extremely increased and it becomes difficult to ensure the zoom space of the objective optical system.

On the other hand, if the value of the angle α is below the lower limit of Condition (2), the result becomes advantageous for compactness of the finder, but the angle of incidence of the axial ray on the roof ridgeline is exceedingly decreased. Consequently, the first planar reflecting section must be placed in the objective optical system, and the construction of the finder becomes difficult.

In addition to Conditions (1), (1'), (1''), and (2), the real image mode finder of the present invention is capable of allowing a reduction of its thickness by satisfying the following condition:

$$52.5° < \beta < 67.5° \tag{3}$$

where β is an angle of incidence of the axial ray on the first planar reflecting section.

In the real image mode finder of the present invention, the angle of incidence of the axial ray on the first planar reflecting section is maintained within the limit of Condition (3), and thereby the balance between the depth of the camera and the optical path length required for the eyepiece optical system can be held.

Here, if the value of the angle β oversteps the upper limit of Condition (3), the ray deflected by the first planar reflecting section toward the second planar reflecting section becomes nearly parallel to the lateral direction of the camera, which is favorable for reducing the depth of the camera. However, a distance from the intermediate image position of the finder to the eyepiece optical system is increased, and an eyepiece optical system which is simply constructed cannot be used.

On the other hand, if the value of the angle β passes the lower limit of Condition (3), the angle of incidence of the axial ray on the first planar reflecting section becomes exceedingly small, which is unsuitable for reducing the thickness of the finder. This is attributable to the requirement that incident light should be nearly parallel to emergent light. If the angle of incidence of the axial ray on the first planar reflecting section is decreased, the angle of incidence of the axial ray on the second planar reflecting section will cease to be diminishable. This causes oversizing of the image erecting optical system itself.

Where the real image mode finder of the present invention is mounted in a camera, it is necessary to construct a compact image erecting optical system because a finder cam member and other electrical systems are arranged in the finder. Thus, In order to achieve this purpose, it is desirable that the angles α and β satisfy the following conditions, respectively;

$$22.5° < \alpha < 27.5° \tag{2'}$$

$$56.5° < \beta < 65° \tag{3'}$$

Also, It is more desirable that the angles α and β, if possible, satisfy the following conditions, respectively;

$$24° < \alpha < 26° \tag{2''}$$

$$60° < \beta < 62.5° \tag{3''}$$

As members constituting the image erecting optical system used in the real image mode finder of the present invention, mirror surfaces or prisms can be used. Where the mirror surfaces are used, each reflecting surface must be sputtered and has the disadvantage that its reflectance is lower than that of the totally reflecting surface of a prism. However, since in this case a medium contained in the image erecting optical system is air, its refracting power is usually lower than the case of the prisms and the optical path length becomes diminished. This is suitable for compactness of the camera.

Where the image erecting optical system is constructed with the prisms, angles of reflection of light and the refractive index of a medium are properly set, and thereby one or all of the reflecting surfaces can be configured as the totally reflecting surfaces. The use of the totally reflecting surfaces makes the reflectance very high and the visual field of the finder bright, and does away with the need for mirror-sputtering the reflecting surfaces of the prisms, with a resulting cost advantage. There is an additional advantage that when it is difficult to reduce the optical path length of the finder optical system, prisms with no totally reflecting surface are used and thereby its arrangement is facilitated.

Furthermore, it is also possible that the image erecting optical system is constructed with a combination of a mirror surface and a prism to thereby provide a finder, optimizing their merits, which is compact in design and bright in visual field.

Here, in order to facilitate the total reflection with a prism or adjust the optical path length of the finder optical system, it is desirable that a refractive index Nd of a prism medium satisfies the following condition:

$$1.4 < Nd < 1.9 \tag{4}$$

If the value of the refractive index Nd is below the lower limit of Condition (4), the refractive index of the prism medium will be extremely lowered and the limit of the angle of incidence of light in which the total reflection is possible will be narrowed, thus causing the problem that the number of degrees of design freedom of the prism is highly limited. On the other hand, if an attempt is made to construct a prism such that the value of the refractive index Nd exceeds the upper limit of Condition (4), an expensive material must be used, which is not entirely favorable.

It is preferable that the value of the refractive index Nd, if possible, is set to satisfy the following condition:

$$1.48 < Nd < 1.6 \tag{4'}$$

When the refractive index Nd satisfies Condition (4'), an angle of total reflection of incident light can be more properly set, and the prism can be constructed at an ideal cost.

In view of the deformation of a prism caused by temperature and humidity, it is desirable to use a glass material or low-hygroscopic resin (for example, polycarbonate or polyolefin resin) as the medium of the prism.

Where a prism is placed as a reflecting member in the finder optical system, a condenser lens component is used not as a single lens, but as the entrance or exit surface of the prism. In this way, the number of parts is reduced so that a low-cost finder can be obtained, and it is possible to decrease the number of surfaces and improve the total transmittance of light.

The real image mode finder of the present invention includes an objective optical system with a positive refracting power; an image erecting optical system with a roof reflecting section, a first planar reflecting section, and a second planar reflecting section; and an eyepiece optical system with a positive refracting power. The image erecting optical system is constructed so that the optical axis does not cross in this optical system and a ray of light from the objective optical system is introduced into the roof reflecting section, the first planar reflecting section, and the second planar reflecting section in this order. The first and second planar reflecting sections are constructed integrally with a prism, and a predetermined surface of the prism where an effective light beam does not pass is shaped into a concave form.

Figure 7:
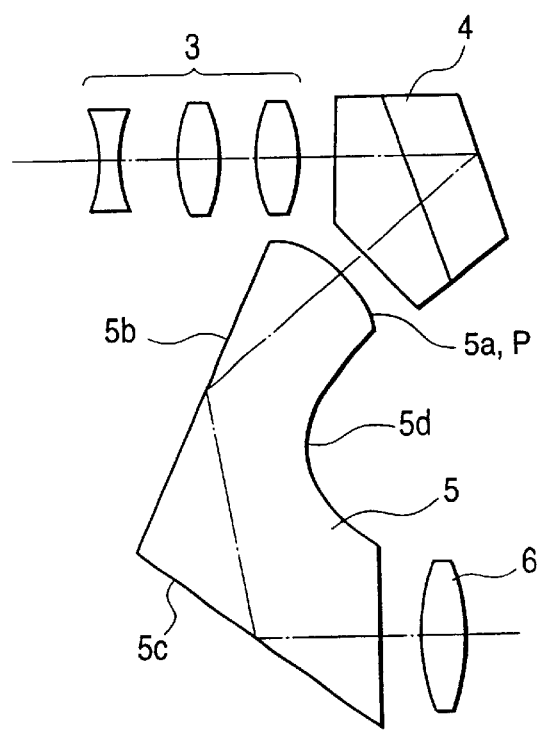
FIG. 7 is a sectional view showing the arrangement, along the optical axis, of the real image mode finder of the present invention.

As shown in FIG. 7, the finder of the present invention includes, in order from the object side, an objective optical system 3 comprised of lens units having negative, positive, and positive refracting powers; a roof prism 4; a prism 5; and an eyepiece optical system 6. The prism 5 is provided with a first planar reflecting section 5b and a second planar reflecting section 5c, and the roof prism 4 and the prism 5 constitute an image erecting optical system. The image erecting optical system is such that the optical axis does not cross therein. In the finder of the present invention, an intermediate image is formed between the roof prism 4 including prism surfaces and the prism 5. In the prism 5, a condenser lens component is imparted to an entrance surface 5a, and a portion where effective light does not pass is cut out so that a concavity 5d is configured. Incident light on the objective optical system 3 is practically parallel to emergent light from the eyepiece optical system 6. In FIG. 7, reference symbol P represents an intermediate image position. Also, the objective optical system 3 may be constructed so that lens units having negative, positive, and negative refracting powers are arranged in this order from the object side.

Figure 8:
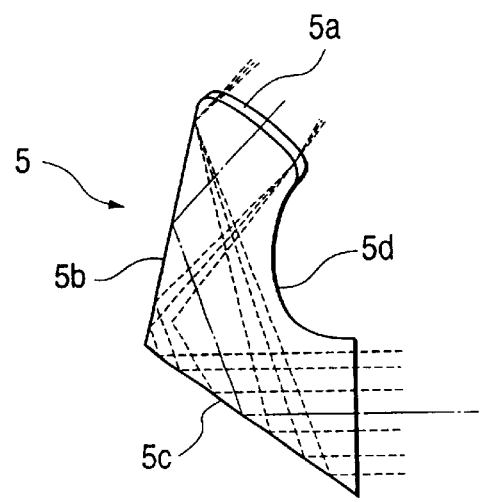
FIG. 8 is a view showing an example of a prism used in the real image mode finder of the present invention.

FIG. 8 shows a detailed configuration of the prism 5 in FIG. 7. The concavity 5d of the prism 5 is shaped so that a crossline made by the surface of the concavity 5d with planes parallel to planes including the optical axis going through the prism 5 is arcuate. That is, the surface of the concavity 5b is configured as an arcuate curved surface. By doing so, the surface of the concavity 5b is configured to have a light-diverging function, and therefore the amount of ghost light originating from the prism 5 can be decreased. When the concavity 5d has the arcuate curved surface, its fabrication is easy. Moreover, other optical members and electrical systems are arranged in a space caused by configuring the concavity 5b and thereby compactness of a camera mounting the finder of the present invention is achieved. Here, the arcuate surface refers to a configuration such that the differential values of a surface are continuous as in an approximate circle, an ellipse, or hyperboloid, and is configured as a surface with no angle.

Where the concavity 5d is configured to have an arcuate curved surface with the same radius, there is the fear that the terminal of this arcuation become an edge and ghost light is produced therefrom. In addition, where the concavity 5d is configured in the same way, rays other than effective light cannot be removed to a maximum unless the ray height of incident light on the prism 5 is identical with that of emergent light therefrom. In particular, when a target mark is placed on the entrance surface 5a, ghost light is liable to occur.

Figure 9A:
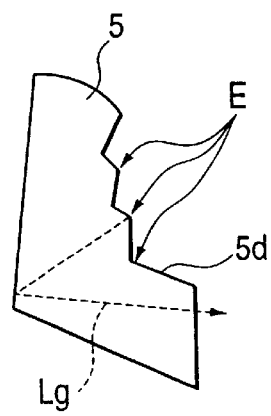
FIGS. 9A, 9B, and 9C are views showing other examples of prisms used in the real image mode finder of the present invention.
Figure 9B:
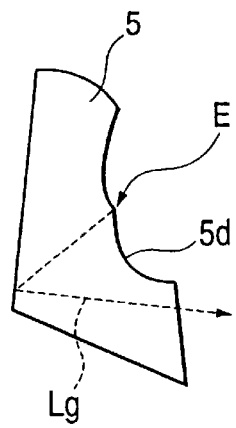
Figure 9C:
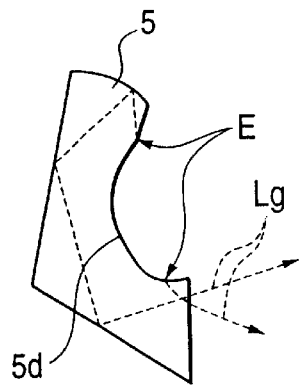

Thus, in the case where such problems are raised, as shown in FIGS. 9A, 9B, and 9C, it is good practice to configure the concavity 5d of the prism 5 in such a way that the crossline made by the surface of the concavity 5d with planes parallel to planes including the optical axis going through the prism 5 is smoothly connected by a plurality of arcs with different radii, that is, to configure the concavity 5d of the prism 5 with a discontinuous, smooth curved surface. By doing so, the fabrication of the concavity 5d is further facilitated, and ghost light Lg is reflected at edges E of the discontinuous surface toward the outside of an effective section. In this way, an excellent effect of removing ghost light is brought about.

In addition, if a function for diffusing light is imparted to the surface of the concavity 5d, or a light-absorbing paint is applied thereto, ghost light can be more effectively removed.

Figure 10A:
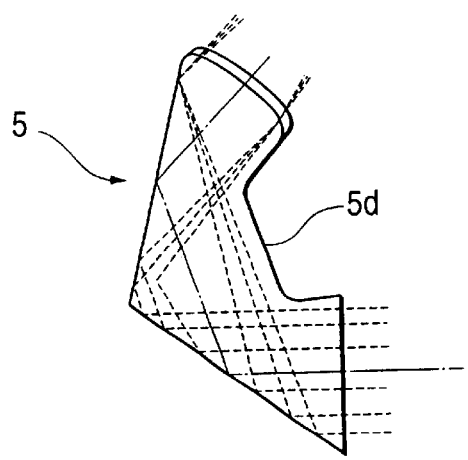
FIGS. 10A and 10B are views showing further other examples of prisms used in the real image mode finder of the present invention.
Figure 10B:
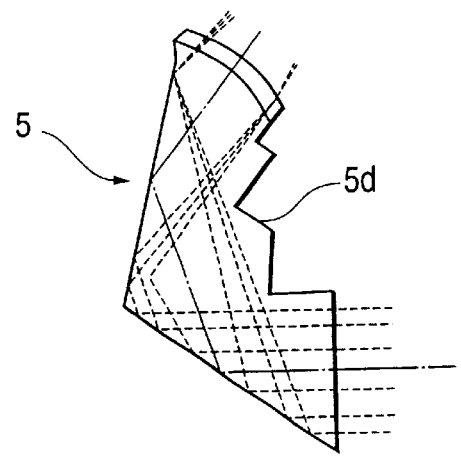

FIGS. 10A and 10B show different configurations of the prism 5 which are usable in the above case. In particular, the configuration shown in FIG. 10A is such that an ineffective section of the prism is cut out to a maximum (to form the angular concavity 5d). In FIG. 10B, the ineffective section is cut out as far as possible, taking much account of the facilitation of fabrication.

It is needless to say that the finder having the image erecting optical system constructed with the prism in which the ineffective section is eliminated, as mentioned above, also satisfies Conditions (1) and (2) and thereby compactness and a reduction in thickness of the finder can be achieved.

The real image mode finder of the present invention may be designed to include, in order from the object side, an objective optical system having three lens units with negative, positive, and positive refracting powers; a condenser lens component with a positive refracting power; an image erecting optical system having a prism placed on the object side of an intermediate image; and an eyepiece optical system with a positive refracting power.

In the finder constructed as stated above, the lens units constituting the objective optical system are moved along the optical axis, and thereby the magnification of the finder can be changed.

It is desirable that this finder satisfies the following conditions:

$$1.15 < D/L < 1.58 \tag{5}$$

$$2.52 < Z < 10 \tag{6}$$

where D is an axial distance from the foremost object-side surface of the objective optical system to the rearmost image-side surface thereof, L is an axial air-equivalent length from the entrance surface of the prism placed on the object side of the intermediate image to the intermediate image, and Z is a variable magnification ratio.

The present invention provides a finder which can mount a versatile image erecting optical system and is high in degree of freedom, small in size, and simple in arrangement, by satisfying Conditions (5) and (6).

Figure 11:
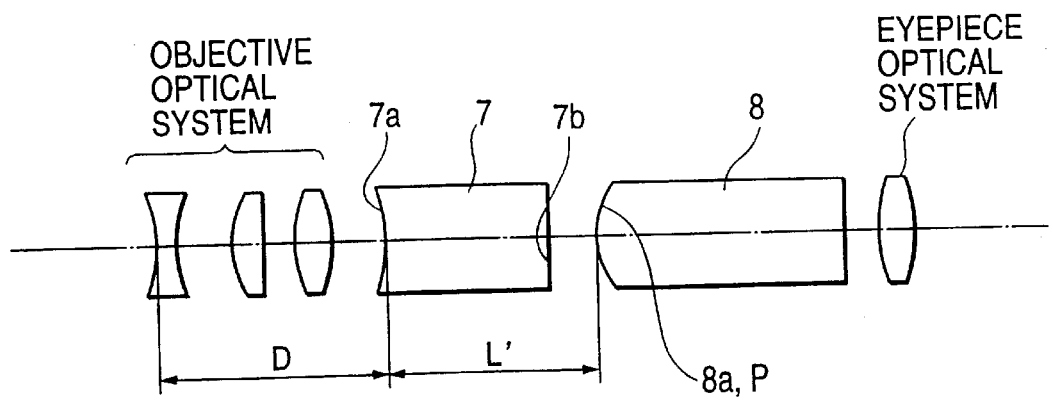
FIG. 11 is a view for explaining an arrangement of the real image mode finder of the present invention.

The definitions of the distance D and the length L in the finder optical system in this case are shown in FIG. 11. Also, the length L is the air-equivalent length and thus is replaced with an actual length L' in the figure.

For compactness of a camera, a space (for example, a zoom space or the back space of the objective optical system) for moving the lens units constituting the objective optical system becomes a key point. For a compact or depth-reduced camera, a finder with a small zoom space is preferable. However, when a simple arrangement is made in preference to others, there is a limit to a reduction of the space. Specifically, if an attempt is made to attain the compactness of the finder with a small number of lenses, the refracting power of each lens must be increased, and as a result, a finder in which optical performance is liable to deteriorate, due to manufacturing errors, is obtained. Hence, for compactness and thickness reduction of the finder, compactness of the image erecting optical system is often preferable to a forced reduction of the zoom space. At first thought, an increase in the back focal distance of the objective optical system may seem to incur a contradiction in compactness of the camera. However, it increases the number of degrees of design freedom of the image erecting optical system and as a result, contributes to compactness of the finder.

In order to largely increase the back focal distance, the objective optical system of the finder may be constructed with four lens units so that the object-side surface of its fourth lens unit (placed on the rearmost image side) is configured as a convex surface directed toward the object side. By doing so, the back focal distance of the objective optical system can be increased while controlling the production of coma and astigmatism at the telephoto position of the finder.

On the other hand, when a negative refracting power is imparted to the entrance surface of the prism placed on the object side of the intermediate image, constituting the image erecting optical system, an effect that the fourth lens unit and the prism are integrated is secured. For example, in FIG. 11, a case is cited in which an entrance surface $7a$ of a prism 7 of the finder is provided with a negative refracting power. In this way, if the image erecting optical system is constructed with the prism 7 and a prism 8, and their reflecting surfaces are configured as totally reflecting surfaces, this arrangement, in contrast with the case where mirrors are used, is capable of forming the image of a finder which is high in reflectance and bright in visual field. Furthermore, the negative refracting power is imparted to the entrance surface $7a$ of the prism 7 constituting the image erecting optical system and thereby the number of surfaces making correction for aberration possible is increased even with a small number of parts. Hence, it becomes possible to favorably suppress the production of aberrations.

The arrangement of the objective optical system of the finder that has negative, positive, and positive refracting powers in this order from the object side is advantageous for holding the back focal distance and good optical performance of the objective optical system. The power distribution that the first lens unit of the objective optical system is provided with the negative refracting power approaches that of a retrofocus type, and thus it is easy to obtain a long back focal distance in spite of the fact that the entire length of the objective optical system is diminished. Moreover, the positive refracting power is imparted to each of the second and third lens units and thereby rapid refraction of light in a zoom region is prevented, so that it is easy to obtain good optical performance even in the case of a high variable magnification ratio.

The present invention is intended to realize a real image mode finder which is easy in use, design, and fabrication and has a variable magnification ratio of about 2.5 or more. This is accomplished by satisfying Condition (6). If the value of the ratio Z exceeds the upper limit of Condition (6), a finder which is low in cost and simple in arrangement will cease to be obtainable. On the other hand, below the lower limit, the design and fabrication of the finder become easy, but the variable magnification ratio is too low to achieve the object of the present invention.

In order to facilitate the construction of the zoom mechanism of the finder, it is desirable that the value of the ratio Z is defined to satisfy the following condition:

$$2.52 < Z < 3.2 \tag{6'}$$

Moreover, it is preferable that the value of the ratio Z is defined to satisfy the following condition:

$$2.52 < Z < 2.75 \tag{6''}$$

On the other hand, Condition (5) serves to determine the size of the zoom space of the objective optical system which is important for the back focal distance of the objective optical system and compactness of the camera in the case where the objective optical system is used in combination with a different image erecting optical system.

If the value of D/L oversteps the upper limit of Condition (5), the back focal distance becomes insufficient. In particular, when an attempt is made to interpose the roof reflecting member between the objective optical system and the intermediate image position, the number of degrees of design freedom is highly limited with respect to the angle of deflection of the axial ray, or the zoom space becomes extremely large. This constitutes an obstacle to compactness of the camera. On the other hand, below the lower limit, a back focal distance beyond the capacity of the finder is required, and hence the refracting power of each lens unit of the objective optical system must be strengthened. In this way, not only is desired optical performance unobtainable, but also fabrication becomes difficult. Furthermore, in this case, correction for coma becomes difficult in the vicinity of the middle position to the telephoto position where the magnification of the finder is changed. At the same time, when the magnification is changed in the range from the wide-angle position to the telephoto position, a shift of a diopter caused by the movement of an image plane around the visual field of the finder becomes too extreme to be negligible.

The real image mode finder of the present invention is capable of obtaining further compactness and higher performance by satisfying the following condition:

$$-3.8 < f_1/Z < -2.5 \text{ (mm)} \tag{7}$$

where $f_1$ is the focal length of the first lens unit provided with the negative refracting power of the objective optical system and is expressed in millimeters.

Here, if the value of $f_1/Z$ exceeds the upper limit of Condition (7), the negative refracting power of the first lens unit becomes so strong that the optical performance of the finder is considerably degraded even with a slight fabrication error and a ray is strongly refracted. Consequently, spherical aberration and coma are deteriorated significantly (particularly in the proximity of the telephoto position).

On the other hand, if the value of $f_1/Z$ is below the lower limit of Condition (7), the negative refracting power of the first lens unit becomes so weak that a wide zoom space of the objective optical system is required., which is unsuitable for compactness of the finder. In addition, the fact that an adequate back focal length cannot be ensured makes it impossible to optimize the properties of a retrofocus type optical system with negative, positive, and positive refracting powers.

The value of $f_1/Z$ satisfies the following condition and thereby an ideal finder is obtained:

$$-3.8 < f_1/Z < -2.8 \text{ (mm)} \tag{7'}$$

In a finder satisfying Conditions (7) and (7'), when the first lens unit of the objective optical system is fixed, fabrication is further facilitated. In this arrangement, if aspherical surfaces are used for at least one surface of the first lens unit and the rearmost pupil-side surface of the objective optical system, the optical performance of the finder will be improved. In particular, an excellent effect is produced on correction for coma at the wide-angle and telephoto positions. This is because these two aspherical surfaces are located at positions where a marginal beam of light is farthest away from a central beam of light.

In the real image mode finder of the present invention, the exit surface of the prism placed on the object side of the intermediate image may be provided with a condenser lens component. In the finder shown in FIG. 11, for instance, an exit surface 7b of the prism 7 placed on the object side of the intermediate image can be provided with the condenser lens component. By doing so, a lens that has a condenser function need not be added, and a reduction of thickness of the finder can be achieved. Even when this condenser lens component is placed on an entrance surface 8a of the prism 8 situated on the image side of the intermediate image, the same effect is secured.

In the real image mode finder of the present invention, it is favorable that the second lens unit (the middle lens unit) of the objective lens system including three lens units is constructed with a single positive lens to satisfy the following condition:

$$0.3 < (r_b + r_a)/(r_b - r_a) < 3.0 \tag{8}$$

where $r_a$ is the radius of curvature of the object-side surface of the second lens unit and $r_b$ is the radius of curvature of the image-side surface of the second lens unit.

Here, if the value of $(r_b + r_a)/(r_b - r_a)$ exceeds the upper limit of Condition (8), the second lens unit must be configured as a large meniscus lens that has a convex form on the object side. Consequently, aberrations including coma produced on the object-side surface of the second lens unit are increased, and it becomes difficult to keep an aberration balance. The fabrication of the second lens unit also becomes difficult.

On the other hand, below the lower limit, the principal point of the second lens unit ceases to be situated on the object side, and a high variable magnification ratio cannot be obtained with a small zoom space. Moreover, it becomes difficult to favorably correct coma produced at the telephoto position.

Figure 12:
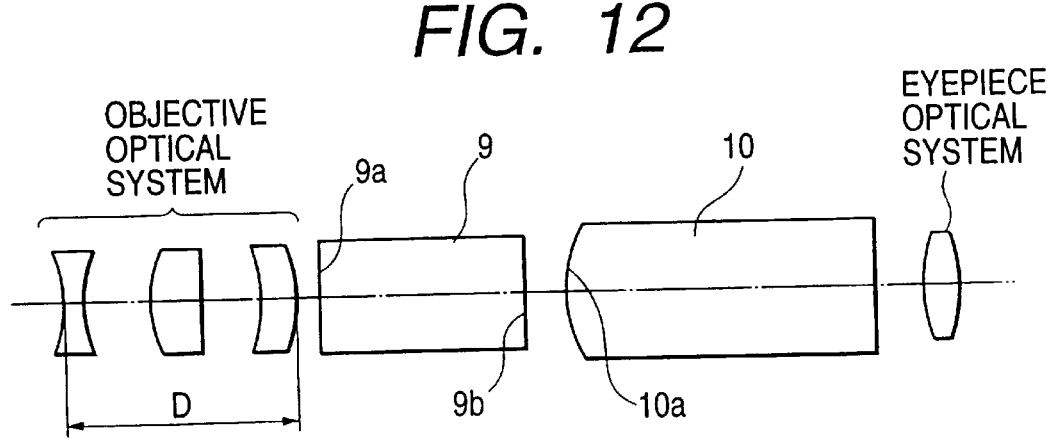
FIG. 12 is a view for explaining another arrangement of the real image mode finder of the present invention.

The real image mode finder according to the present invention may be constructed to include, in order to object side, an objective optical system having three lens units with negative, positive, and negative refracting powers, a condenser lens component provided with a positive refracting power, and an eyepiece optical system with a positive refracting power. In this case, it is desirable to satisfy Condition (6) and the following condition:

$$1.5 < D/fw < 2.2 \tag{9}$$

where fw is the focal length of the objective optical system at the telephoto position. The definition of the distance D in this case is shown in FIG. 12.

The arrangement of the objective optical system that has the negative, positive, and negative refracting powers in this order from the object side is advantageous for ensuring the back focal distance and improving the optical performance of the objective optical system. The power distribution that the first lens unit of the objective optical system is provided with the negative refracting power approaches that of a retrofocus type and thus a sufficient back focal distance is obtained. Furthermore, a weaker negative refracting power than the first lens unit is imparted to the third lens unit and thereby good optical performance can be maintained even when the back focal distance is increased.

The present invention, as mentioned above, is intended to realize a finder which is easy in use, design, and fabrication and has a variable magnification ratio of about 2.5 or more. Even a finder satisfying Condition (9) is designed to satisfy Condition (6) at the same time.

If the value of the ratio Z exceeds the upper limit of Condition (6), the finder cannot be constructed with a simple arrangement, and the problem of cost will be caused. Below the lower limit, the design and fabrication of the finder becomes easy, but the variable magnification ratio will be decreased.

Here, if a lower cost and simpler arrangement of the finder are required, it is desirable that the ratio Z satisfies Condition (6'). Moreover, when the ratio Z satisfies Condition (6"), an ideal finder is obtained.

Condition (9) is adapted to choose the size of the zoom space of the objective optical system required for achieving compactness of the finder. If the value of D/fw oversteps the upper limit of Condition (9), the zoom space becomes extremely large. This is advantageous for an improvement on the optical performance of the finder, but makes it impossible to attain the compactness of the finder. Below the lower limit, a zoom space required to obtain a desired variable magnification ratio becomes insufficient, and the problems arise that the optical performance of the finder is degraded and the fabrication of the finder becomes difficult. The result is that the insufficiency of the zoom space must be compensated by increasing the refracting power of each lens unit of the objective optical system, and it becomes difficult to correct spherical aberration and coma.

In order to maintain the balance between the good optical performance and the zoom space, it is desirable that the value of D/fw satisfies the following condition:

$$1.5 < D/fw < 2.0 \tag{9'}$$

Thus, when the upper limit of the value of D/fw is set to be less than 2.0, the compactness of the finder can be achieved.

The third lens unit of the objective optical system is fixed when the magnification of the finder is changed, and thereby the fabrication of the finder is facilitated. In order to construct the finder in this way, as shown in FIG. 12, it is good practice that an entrance surface 9a of an object-side prism 9 is configured as a planar surface. In addition, when aspherical surfaces are used for the foremost object-side surface of the second lens unit of the objective optical system and at least one surface of the third lens unit, the optical performance of the finder can be further improved. This is because these two aspherical surfaces are located at positions where a marginal beam of light is farthest away from a central beam of light, and in particular, brings about an effect on correction for coma.

In the real image mode finder of the present invention, in order to achieve the compactness of the finder while maintaining the optical performance to such an extent that there is no problem in practical use, it is necessary to satisfy the following condition:

$$-3.9 < f_1/Z < -3.1 \text{ (mm)} \tag{10}$$

In this case, if the value of $f_1/Z$ is particularly below the lower limit of Condition (10), the negative refracting power of the first lens unit of the objective optical system becomes so weak that a wider zoom space is required, which is unsuitable for compactness of the finder. If the wider zoom space cannot be ensured, neither can the properties of the objective optical system of a retrofocus type be optimized which is constructed to have negative and positive refracting powers in this order from the object side.

Even with the finder thus constructed, as shown in FIG. 12, it is desirable that a condenser lens component is imparted to an exit surface 9b of the prism 9 or an entrance surface 10a of a prism 10.

In the real image mode finder of the present invention, where a variable magnification function is provided, good optical performance can be ensured and the fabrication is facilitated by fixing the first lens unit when the objective optical system is constructed to have negative, positive, and positive refracting powers in this order from the object side, and by fixing the third lens unit when constructed to have negative, positive, and negative refracting powers.

The real image mode finder of the present invention is designed to properly satisfy the above conditions in accordance with the application of a camera to be mounted, and thereby is used as a finder which is easy in use and is reduced in size and thickness.

The embodiments of the present invention will be described below.

First Embodiment

Figure 13:
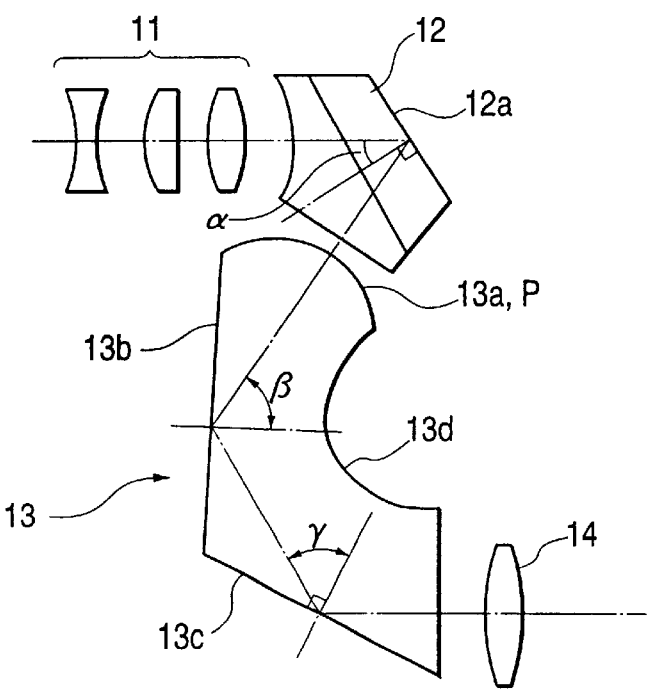
FIG. 13 is a sectional view showing the arrangement, along the optical axis, of the real image mode finder of a first embodiment in the present invention.

As shown in FIG. 13, the finder of this embodiment includes, in order from the object side, an objective optical system 11 comprised of a negative lens, a positive lens, and a positive lens; a roof prism 12 whose entrance surface has a negative refracting power; a prism 13; and an eyepiece optical system 14. In the finder of the first embodiment, light from an object is first introduced, through the objective optical system 11 constructed with three lens units having negative, positive, and positive refracting powers, into the roof prism 12. The light is then deflected there and is introduced into the prism 13. The light having passed through the prism 13 is introduced through the eyepiece optical system 14 into an observer's eye.

In the finder of the first embodiment, the roof prism 12 and the prism 13 constitute an image erecting optical system. The back focal distance of the objective optical system 11 is increased so that roof reflection takes place between the objective optical system 11 and the intermediate image position P. In the roof prism 12, an image is inverted to be upside down. On the other hand, an entrance surface 13a of the prism 13 is provided with a positive refracting power, and the prism 13 has the function of a condenser lens. The prism 13 also has a first planar reflecting section 13b and a second planar reflecting section 13c. Moreover, in the prism 13, a portion where light other than effective light passes is cut out into an arcuate shape and is configured as a concavity 13d in order to suppress the production of ghost light. In the image erecting optical system comprised of the roof prism 12 and the prism 13, reflections takes place four times in total, each as total reflection, and thus a bright finder image can be obtained. In order to suppress the production of ghost light which has its source in the image erecting optical system, it is good practice to impart a function for diffusing rays of light to the concavity 13d of the prism 13 or apply a light-absorbing paint thereto.

Also, the angle of incidence α of the axial ray on a roof ridgeline 12a of the roof prism 12 is 25°. The angle of incidence β of the axial ray on the first planar reflecting section 13b of the prism 13 is set to 61° and the angle of incidence γ of the axial ray on the second planar reflecting section 13c is set to 54° so that the optical axis does not cross in the image erecting optical system. Also, in any of the embodiments to be described below, as in the first embodiment, it is assumed that the angles of incidence α, β, and γ are set to 25°, 61°, and 54°, respectively.

Second Embodiment

Figure 14:
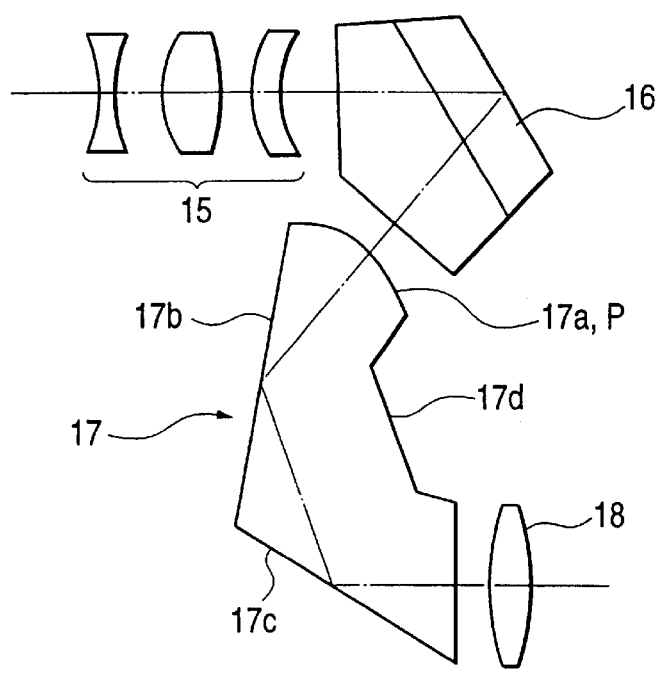
FIG. 14 is a sectional view showing the arrangement, along the optical axis, of the real image mode finder of a second embodiment in the present invention.

As shown in FIG. 14, the finder of this embodiment includes, in order from the object side, an objective optical system 15 comprised of a negative lens, a positive lens, and a negative lens; a roof prism 16; a prism 17; and an eyepiece optical system 18. In the finder of the second embodiment, light from an object is first introduced, through the objective optical system 15 constructed with three lens units having negative, positive, and negative refracting powers, into the roof prism 16. The light is then deflected there and is introduced into the prism 17. The light having passed through the prism 17 is introduced through the eyepiece optical system 18 into the observer's eye.

In the finder of the second embodiment, the roof prism 16 and the prism 17 constitute an image erecting optical system. In the roof prism 16, an image is inverted to be upside down. On the other hand, an entrance surface 17a of the prism 17 is provided with a positive refracting power, and the prism 17 has the function of a condenser lens. The prism 17 also has a first planar reflecting section 17b and a second planar reflecting section 17c. The finder is constructed so that the optical axis does not cross in the image erecting optical system. Moreover, in the prism 17, an ineffective section 17d where light other than effective light passes is shaped into an angular form in order to suppress the production of ghost light. In the image erecting optical system comprised of the roof prism 16 and the prism 17, reflections take place four times in total, each as total reflection, and thus a bright finder image can be obtained. Even with the finder of the second embodiment, it is good practice to impart a function for diffusing rays of light to the ineffective section 17d or apply a light-absorbing paint thereto.

Third Embodiment

Figure 15:
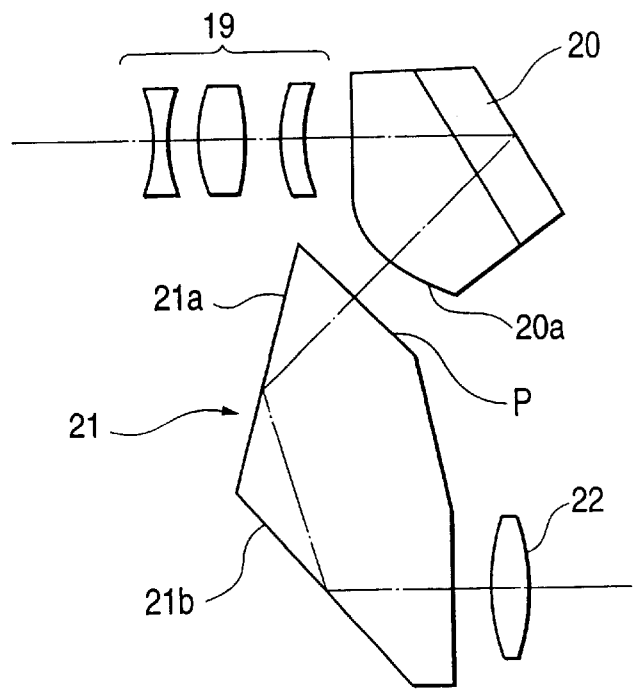
FIG. 15 is a sectional view showing the arrangement, along the optical axis, of the real image mode finder of a third embodiment in the present invention.

The finder of this embodiment, as shown in FIG. 15, is constructed to include, in order from the object side, an objective optical system 19 composed of a negative lens, a positive lens, and a negative lens; a roof prism 20; a prism 21; and an eyepiece optical system 22. In the finder of the third embodiment, light from an object is first introduced, through the objective optical system 19 constructed with three lens units having negative, positive, and negative refracting powers, into the roof prism 20. The light is then deflected there and is introduced into the prism 21. The light having passed through the prism 21 is introduced through the eyepiece optical system 22 into the observer's eye.

In the finder of the third embodiment, the roof prism 20 and the prism 21 constitute an image erecting optical system. In the roof prism 20, an image is inverted to be upside down. An exit surface 20a of the roof prism 20 is provided with a positive refracting power, and the roof prism 20 has the function of a condenser lens. On the other hand, the prism 21 has a first planar reflecting section 21a and a second planar reflecting section 21b. In this case also, the finder is constructed so that the optical axis does not cross in the image erecting optical system. In the prism 21, a portion where light other than effective light passes, although not cut out, may be cut out as in the prism used in the finder of each of the first and second embodiments. In the image erecting optical system comprised of the roof prism 20 and the prism 21, reflections take place four times in total, each as total reflection, and thus a bright finder image can be obtained.

Fourth Embodiment

Figure 16:
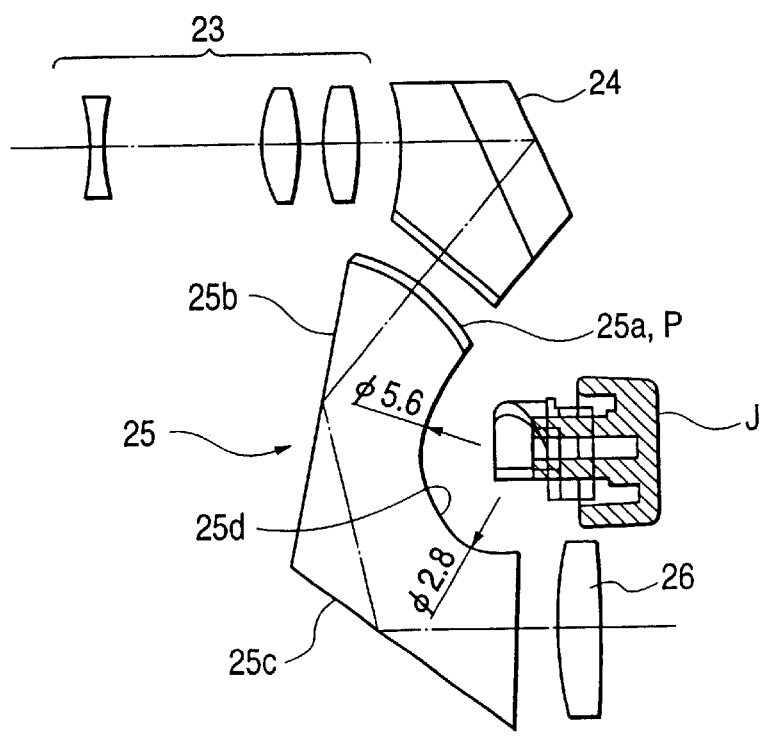
FIG. 16 is a sectional view showing the arrangement, along the optical axis, of the real image mode finder of a fourth embodiment in the present invention.

The finder of this embodiment, as shown in FIG. 16, is constructed to include, in order from the object side, an objective optical system 23 comprised of a negative lens, a positive lens, and a positive lens; a roof prism 24 whose entrance surface has a negative refracting power; a prism 25; and an eyepiece optical system 26. In the finder of the fourth embodiment, light from an object is first introduced, through the objective optical system 23 constructed with three lens units having negative, positive, and positive refracting powers, into the roof prism 24. The light is then deflected there and is introduced into the prism 25. The light having passed through the prism 25 is introduced through the eyepiece optical system 26 into the observer's eye.

In the finder of the fourth embodiment, the roof prism 24 and the prism 25 constitute an image erecting optical system. In the roof prism 24, an image is inverted to be upside down. On the other hand, an entrance surface 25a of the prism 25 is provided with a positive refracting power, and the prism 25 has the function of a condenser lens. The prism 25 also has a first planar reflecting section 25b and a second planar reflecting section 25c. The finder is constructed so that the optical axis does not cross in the image erecting optical system. Moreover, an ineffective section of the prism 25 is configured with a concavity 25d which has an arcuate curved surface, in order to suppress the production of ghost light. For this, when the finder of the fourth embodiment is mounted in a camera, optical members and electrical systems, such as a diopter adjusting knob J, can be arranged in a space caused by configuring the concavity 25d. This is effective for compactness of the camera. In the image erecting optical system comprised of the roof prism 24 and the prism 25, reflections take place four times in total, each as total reflection, and thus a bright finder image can be obtained.

In order to eliminate more favorably ghost light in the finder of the fourth embodiment, it is desirable that the concavity 25d of the prism 25 is configured with a discontinuous, smooth curved surface. By doing so, the edges of the discontinuous surface are eliminated and the fear that ghost light is produced therefrom is dissipated. In order to obtain the smooth surface, it is only necessary to configure a surface so that a plurality of circumferences with different radii of curvature are smoothly connected, for example, looking at in a direction normal to the plane of the paper in FIG. 16. In the fourth embodiment, the surface of the concavity 25d is configured so that circumferences with radii $\phi$ of 2.8 mm and 5.6 mm are smoothly connected. By doing so, the fabrication of the concavity 25d is facilitated. Furthermore, when a function for diffusing light is imparted to the surface of the concavity 25d or a light-absorbing paint is applied thereto, the production of ghost light can be completely suppressed.

Fifth Embodiment

Figure 17A:
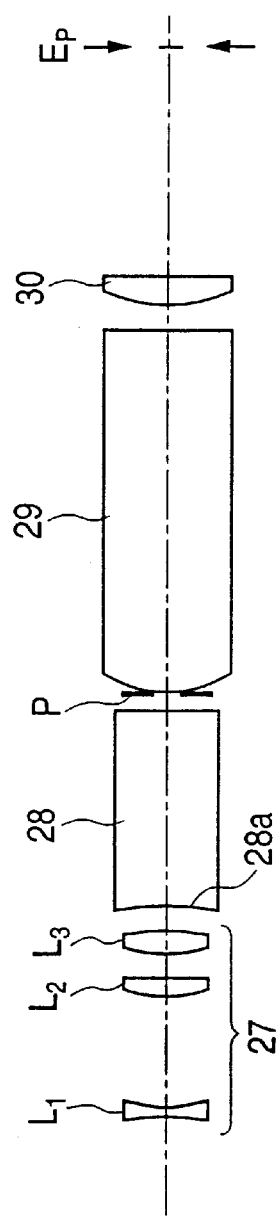
FIGS. 17A, 17B, and 17C are sectional views showing arrangements, developed along the optical axis, at wide-angle, middle, and telephoto positions, respectively, of the real image mode finder of a fifth embodiment in the present invention.
Figure 17B:
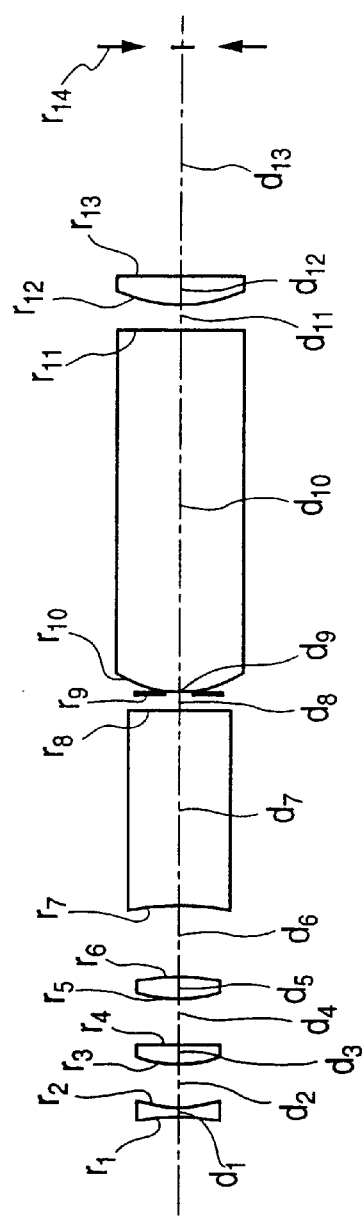
Figure 17C:
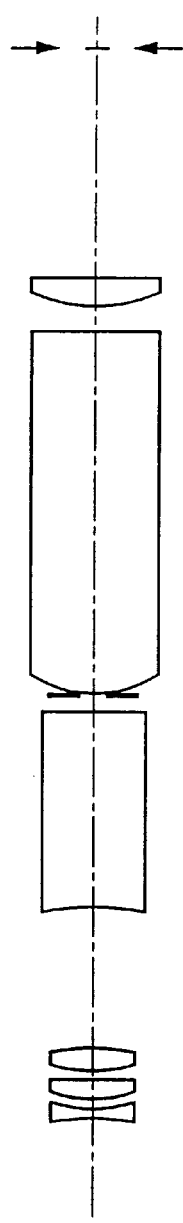

The finder of this embodiment, as shown in FIGS. 17A, 17B, and 17C, is constructed to include, in order from the object side, an objective optical system 27 comprised of a first lens unit $L_1$ with a negative refracting power, a second lens unit $L_2$ with a positive refracting power, and a third lens unit $L_3$ with a positive refracting power; a prism 28 whose entrance surface has a negative refracting power; a prism 29; and an eyepiece optical system 30. Reference symbol Ep represents an eyepoint. In the finder of the fifth embodiment, the prism 28 and the prism 29 constitute an image erecting optical system, and in particular, an entrance surface 28a of the prism 28 is configured as an aspherical surface and at the same time, is provided with a negative refracting power.

The finder of the fifth embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side.

The following are various numerical data relative to the finder of the fifth embodiment.

Finder magnification=0.40×–1.06×
Angle of incidence=25.2° –9.0°
Pupil diameter=4 mm
D/L=1.3995
Variable magnification ratio Z=2.643
Refractive index Nd=1.52542
$f_1/Z$=–3.666
$(r_b+r_a)/(r_b-r_a)$=1.395
$r_1$=–18.0525
  $d_1$=0.7400 $nd_1$=1.58423 $vd_1$=30.49
$r_2$=8.3727 (aspherical)
  $d_2$=7.7567 (wide-angle), 2.9430 (middle), 0.7000 (telephoto)
$r_3$=7.3181 (aspherical)
  $d_3$=1.3143 $nd_3$=1.49241 $vd_3$=57.66
$r_4$=44.3998
  $d_4$=1.8839 (wide-angle), 3.2421 (middle), 0.6446 (telephoto)

$r_5=9.8215$ $d_5=1.7093$ $nd_5=1.49241$ $vd_5=57.66$ $r_6=-12.5850$ (aspherical)

$d_6=1.9066$ (wide-angle), 5.3487 (middle), 10.2007 (telephoto)

$r_7=-26.8623$ (aspherical)

$d_7=14.4000$ $nd_7=1.52542$ $vd_7=55.78$ $r_8=\infty$ $d_8=1.5000$ $r_9=\infty$ (intermediate image position)

$d_9=0$ $r_{10}=10.6000$ $d_{10}=26.3805$ $nd_{10}=1.52542$ $vd_{10}=55.78$ $r_{11}=\infty$ $d_{11}=1.7863$ $r_{12}=12.8880$ (aspherical)

$d_{12}=2.2210$ $nd_{12}=1.49241$ $vd_{12}=57.66$ $r_{13}=-36.7301$ $d_{13}=17.3$ $r_{14}$ (eyepoint)

Conic Constants and Aspherical Coefficients

Second surface $K=-7.4745$ $A_4=9.4793\times10^{-4}$, $A_6=7.8368\times10^{-5}$, $A_8=-1.1259\times10^{-5}$, $A_{10}=3.4350\times10^{-7}$ Third surface $K=-0.5225$ $A_4=-6.7046\times10^{-4}$, $A_6=1.1542\times10^{-4}$, $A_8=-1.4425\times10^{-5}$, $A_{10}=8.2692\times10^{-7}$ Sixth surface $K=-10.8965$ $A_4=-2.8795\times10^{-4}$, $A_6=3.1438\times10^{-5}$, $A_8=-4.2576\times10^{-6}$, $A_{10}=3.2600\times10^{-7}$ Seventh surface $K=1.3058$ $A_4=-4.6174\times10^{-4}$, $A_6=-5.4411\times10^{-5}$, $A_8=9.0328\times10^{-6}$ $A_{10}=-5.2268\times10^{-7}$ Twelfth surface $K=1.0137$ $A_4=-2.1030\times10^{-4}$, $A_6=3.1374\times10^{-6}$, $A_8=-1.6951\times10^{-7}$, $A_{10}=3.0109\times10^{-9}$ FIGS. 18A–18C, 19A–19C, and 20A–20C show aberration curves in the finder of the fifth embodiment.

Sixth Embodiment

Figure 21A:
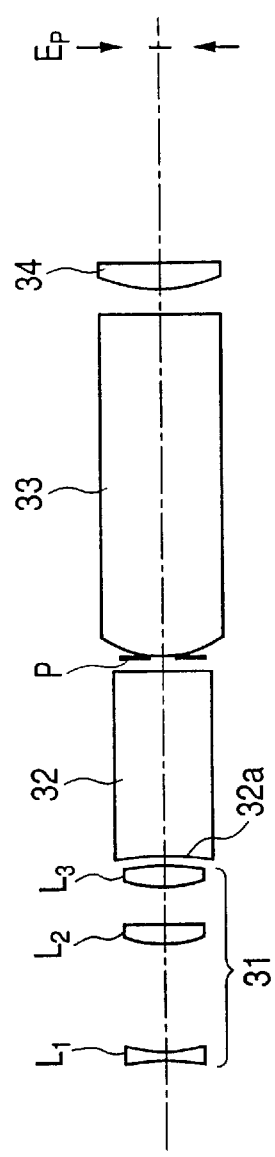
FIGS. 21A, 21B, and 21C are sectional views showing arrangements, developed along the optical axis, at wide-angle, middle, and telephoto positions, respectively, of the real image mode finder of a sixth embodiment in the present invention.
Figure 21B:
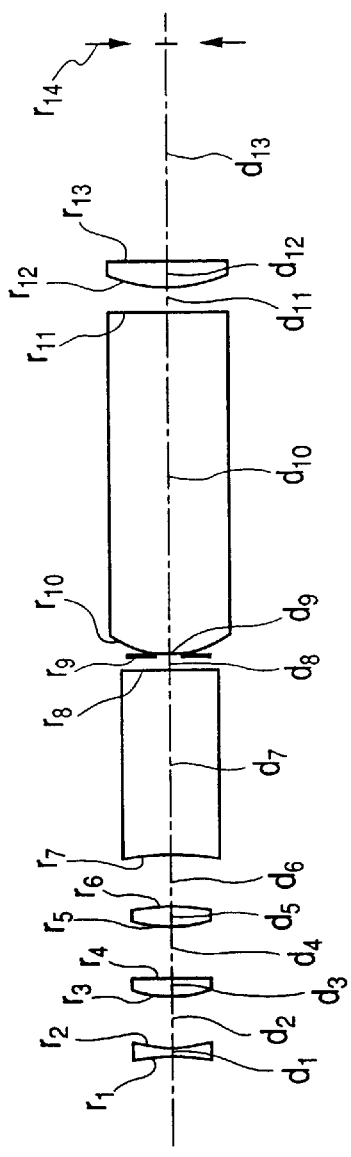
Figure 21C:
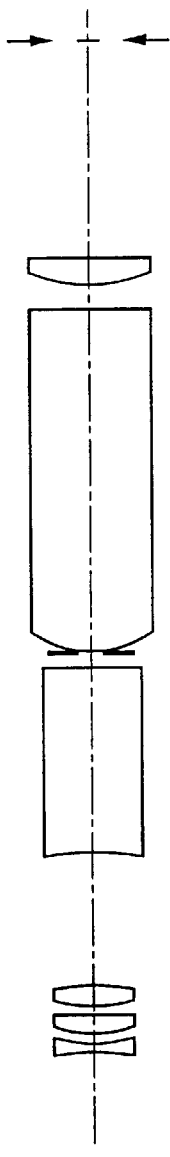
Figure 22A:
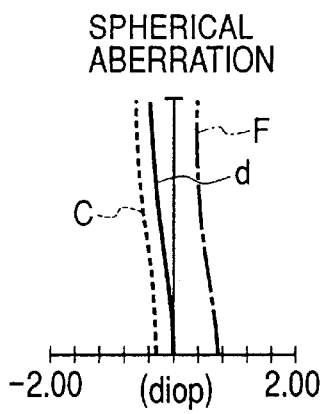
FIGS. 22A, 22B, and 22C are diagrams showing aberration curves at the wide-angle position of the real image mode finder of the sixth embodiment.
Figure 22B:
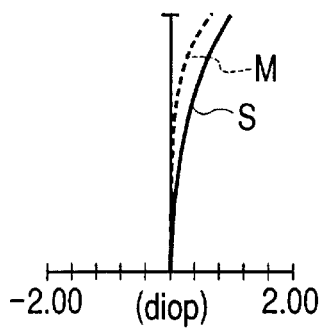
Figure 22C:
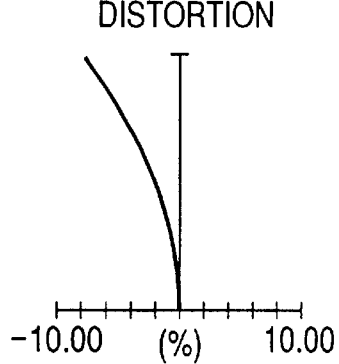
Figure 23A:
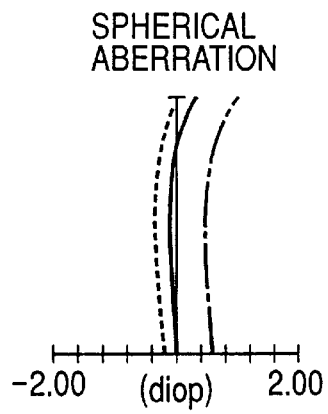
FIGS. 23A, 23B, and 23C are diagrams showing aberration curves at the middle position of the real image mode finder of the sixth embodiment.
Figure 23B:
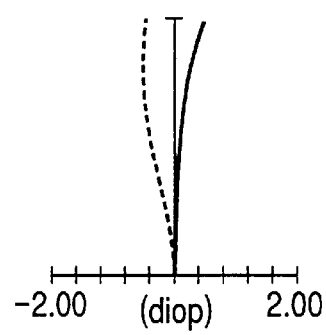
Figure 23C:
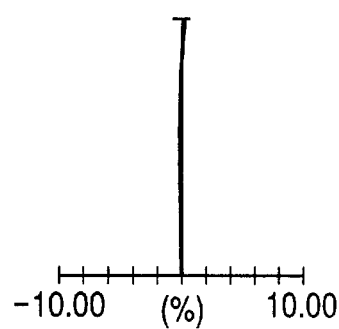
Figure 24A:
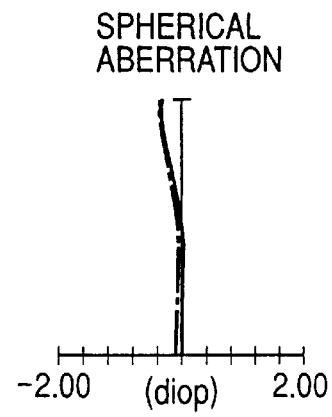
FIGS. 24A, 24B, and 24C are diagrams showing aberration curves at the telephoto position of the real image mode finder of the sixth embodiment.
Figure 24B:
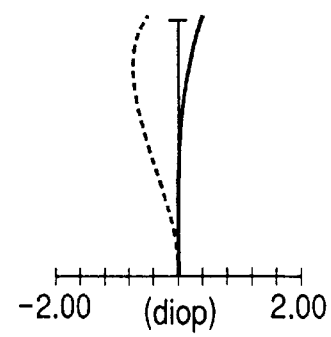
Figure 24C:
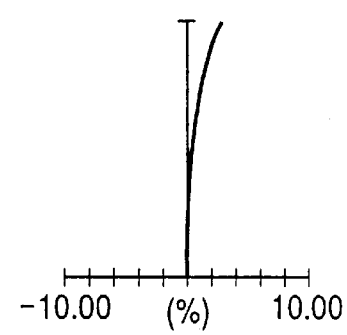

The finder of this embodiment, as shown in FIGS. 21A, 21B, and 21C, is constructed to include, in order from the object side, an objective optical system 31 comprised of the first lens unit $L_1$ with a negative refracting power, the second lens unit $L_2$ with a positive refracting power, and the third lens unit $L_3$ with a positive refracting power; a prism 32 whose entrance surface has a negative refracting power; a prism 33; and an eyepiece optical system 34. In the finder of the sixth embodiment, the prism 32 and the prism 33 constitute an image erecting optical system, and in particular, an entrance surface 32a of the prism 32 is configured as an aspherical surface and at the same time, is provided with a negative refracting power.

The finder of the sixth embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side. The finder of the sixth embodiment is particularly designed to have a pupil diameter of 5 mm and thus is capable of providing a finder image which is easy for an observer to observe.

The following are various numerical data relative to the finder of the sixth embodiment.

Finder magnification=0.40×–1.06×

Angle of incidence=25.2° –9.0°

Pupil diameter=5 mm

D/L=1.4262

Variable magnification ratio Z=2.643

Refractive index Nd=1.52542

$f_1/Z=-3.673$ $(r_b+r_a)/(r_b-r_a)=0.474$ $r_1=-14.0864$ $d_1=0.8000$ $nd_1=1.58423$ $vd_1=30.49$ $r_2=9.6950$ (aspherical)

$d_2=8.0036$ (wide-angle), 3.6195 (middle), 0.7022 (telephoto)

$r_3=7.2393$ (aspherical)

$d_3=1.7085$ $nd_3=1.49241$ $vd_3=57.66$ $r_4=-20.2700$ $d_4=2.8710$ (wide-angle), 3.9069 (middle), 0.7000 (telephoto)

$r_5=17.4984$ $d_5=1.3390$ $nd_5=1.49241$ $vd_5=57.66$ $r_6=-21.3327$ (aspherical)

$d_6=0.8207$ (wide-angle), 4.1653 (middle), 10.2927 (telephoto)

$r_7=-38.0436$ (aspherical)

$d_7=14.4000$ $nd_7=1.52542$ $vd_7=55.78$ $r_8=\infty$ $d_8=1.5000$ $r_9=\infty$ (intermediate image position)

$d_9=0$ $r_{10}=10.6000$ $d_{10}=26.3965$ $nd_{10}=1.52542$ $vd_{10}=55.78$ $r_{11}=\infty$ $d_{11}=1.7598$ $r_{12}=13.0627$ (aspherical)

$d_{12}=2.2210$ $nd_{12}=1.49241$ $vd_{12}=57.66$ $r_{13}=-35.3287$ $d_{13}=17.3$ $r_{14}$ (eyepoint)

Conic Constants and Aspherical Coefficients

Second surface $K=-6.7030$ $A_4=1.5167\times10^{-4}$, $A_6=1.0344\times10^{-4}$, $A_8=-1.0703\times10^{-5}$, $A_{10}=2.2063\times10^{-7}$ Third surface $K=-0.5707$ $A_4=-7.3061\times10^{-4}$, $A_6=9.8795\times10^{-5}$, $A_8=-1.2673\times10^{-5}$, $A_{10}=7.2200\times10^{-7}$ Sixth surface $K=-10.8206$ $A_4=1.3263\times10^{-4}$, $A_6=1.0177\times10^{-5}$, $A_8=-3.9071\times10^{-6}$, $A^{10}=3.7497\times10^{-7}$ Seventh surface $K=-2.4361$ $A_4=-4.1171\times10^{-4}$, $A_6=-3.7000\times10^{-5}$, $A_8=1.2410\times10^{-5}$, $A_{10}=-9.5301\times10^{-7}$ Twelfth surface $K=1.2467$ $A_4=-2.0233\times10^{-4}$, $A_6=9.1801\times10^{-7}$,
$A_8=-6.5682\times10^{-8}$, $A_{10}=1.1294\times10^{-9}$ FIGS. 22A–22C, 23A–23C, and 24A–24C show aberration curves in the finder of the sixth embodiment.

Seventh Embodiment

Figure 25A:
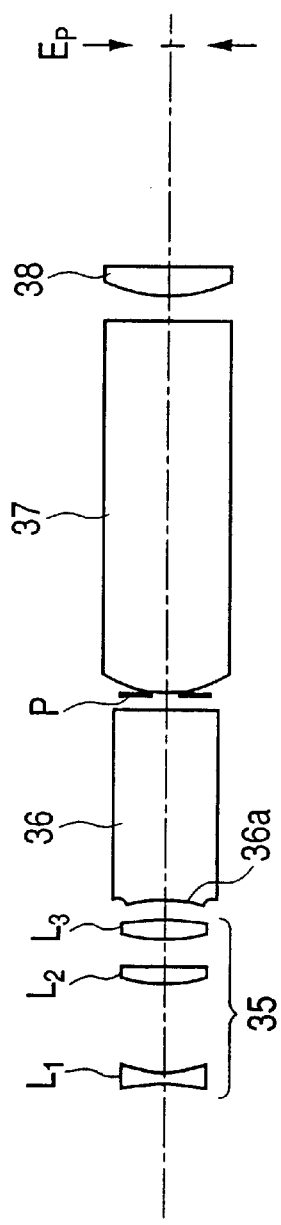
FIGS. 25A, 25B, and 25C are sectional views showing arrangements, developed along the optical axis, at wide-angle, middle, and telephoto positions, respectively, of the real image mode finder of a seventh embodiment in the present invention.
Figure 25B:
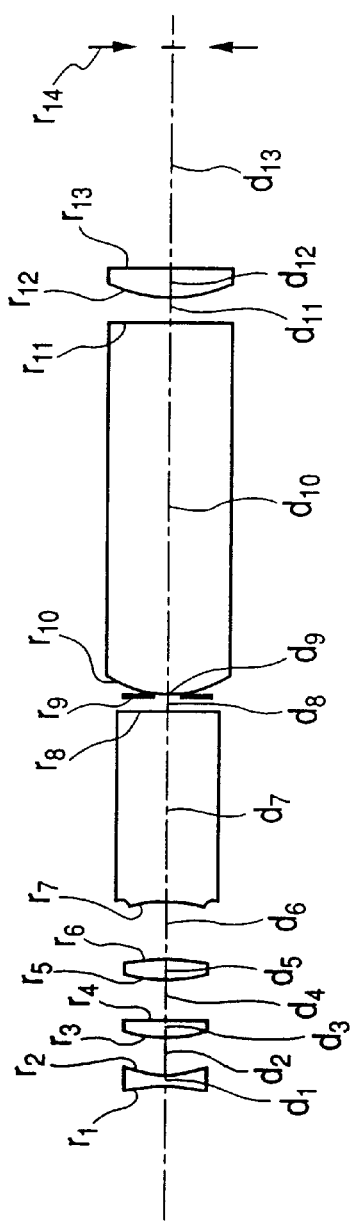
Figure 25C:
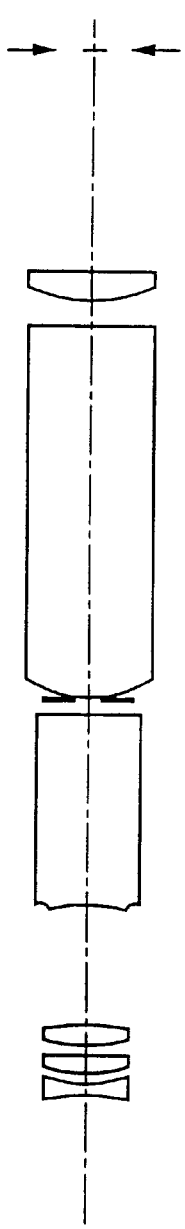
Figure 26A:
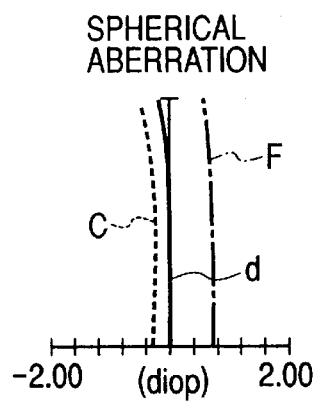
FIGS. 26A, 26B, and 26C are diagrams showing aberration curves at the wide-angle position of the real image mode finder of the seventh embodiment.
Figure 26B:
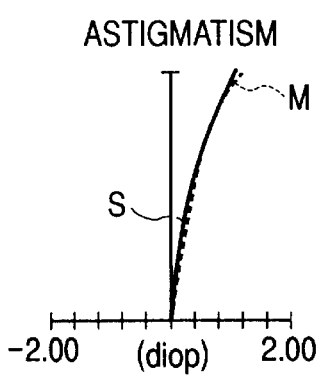
Figure 26C:
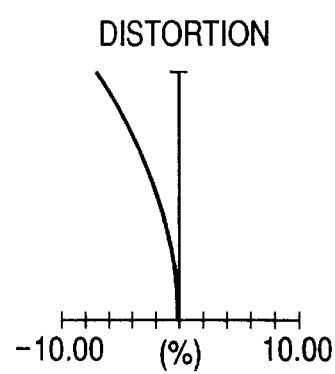
Figure 27A:
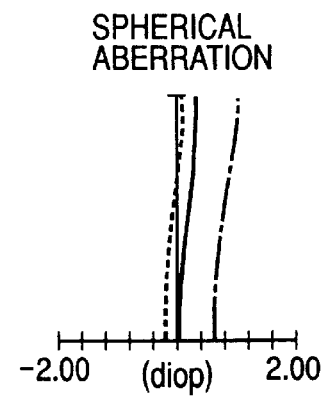
FIGS. 27A, 27B, and 27C are diagrams showing aberration curves at the middle position of the real image mode finder of the seventh embodiment.
Figure 27B:
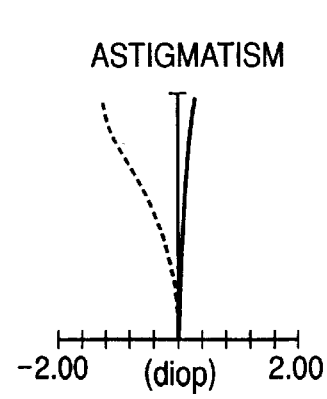
Figure 27C:
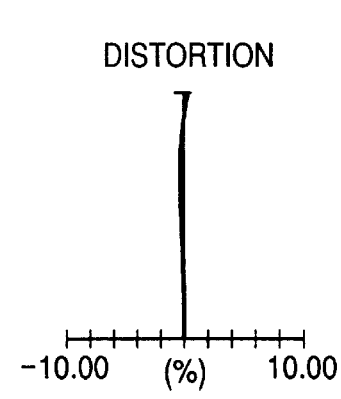
Figure 28A:
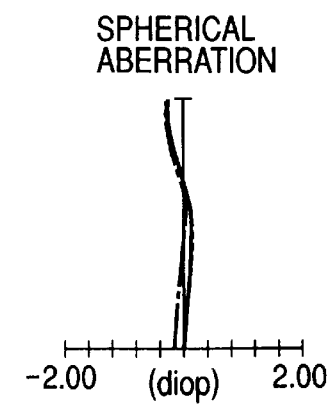
FIGS. 28A, 28B, and 28C are diagrams showing aberration curves at the telephoto position of the real image mode finder of the seventh embodiment.
Figure 28B:
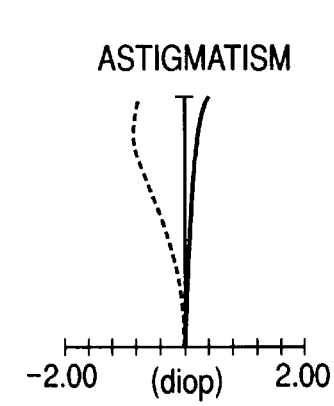
Figure 28C:
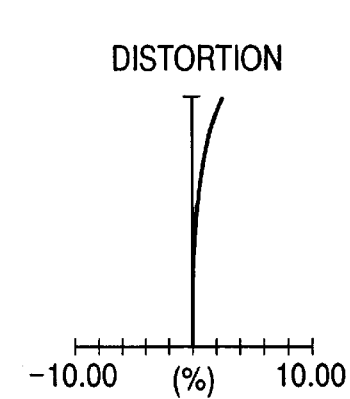

The finder of this embodiment, as shown in FIGS. 25A, 25B, and 25C, is constructed to include, in order from the object side, an objective optical system 35 comprised of the first lens unit $L_1$ with a negative refracting power, the second lens unit $L_2$ with a positive refracting power, and the third lens unit $L_3$ with a positive refracting power; a prism 36 whose entrance surface has a negative refracting power; a prism 37; and an eyepiece optical system 38. In the finder of the seventh embodiment, the prism 36 and the prism 37 constitute an image erecting optical system, and in particular, an entrance surface 36a of the prism 36 is configured as an aspherical surface and at the same time, is provided with a negative refracting power.

The finder of the seventh embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side. The finder of the seventh embodiment is particularly designed to make the zoom space small and to be very favorable for compactness and depth reduction of the finder.

The following are various numerical data relative to the finder of the seventh embodiment.

Finder magnification=0.40×–1.04×
Angle of incidence=24.8° –9.1°
Pupil diameter=4 mm
D/L=1.2348
Variable magnification ratio Z=2.593
Refractive index Nd=1.52542
$f_1/Z=-3.016$
$(r_b+r_a)/(r_b-r_a)=1.206$
$r_1=-14.6732$
    $d_1=0.7000$ $nd_1=1.58423$ $vd_1=30.49$
$r_2=6.7495$ (aspherical)
    $d_2=6.4953$ (wide-angle), 2.7530 (middle), 0.7000 (telephoto)
$r_3=5.2732$ (aspherical)
    $d_3=1.2510$ $nd_3=1.49241$ $vd_3=57.66$
$r_4=56.4043$
    $d_4=1.9166$ (wide-angle), 2.7838 (middle), 0.7000 (telephoto)
$r_5=9.7835$
    $d_5=1.6034$ $nd_5=1.49241$ $vd_5=57.66$
$r_6=-11.4742$ (aspherical)
    $d_6=1.3405$ (wide-angle), 4.1852 (middle), 8.3457 (telephoto)
$r_7=-12.2760$ (aspherical)
    $d_7=14.1500$ $nd_7=1.52542$ $vd_7=55.78$
$r_8=\infty$
    $d_8=1.5000$
$r_9=\infty$ (intermediate image position)
    $d_9=0$
$r_{10}=9.3752$
    $d_{10}=27.0000$ $nd_{10}=1.52542$ $vd_{10}=55.78$
$r_{11}=\infty$
    $d_{11}=1.6211$
$r_{12}=10.7196$ (aspherical)
    $d_{12}=2.5335$ $nd_{12}=1.49241$ $vd_{12}=57.66$
$r_{13}=-93.6061$
    $d_{13}=16.9$
$r_{14}$ (eyepoint)

Conic Constants and Aspherical Coefficients

Second surface
K=–9.0375
$A_4=2.9190\times10^{-3}$, $A_6=-1.9028\times10^{-4}$,
$A_8=2.4857\times10^{-5}$, $A_{10}=-3.5462\times10^{-6}$ Third surface
K=–0.3780
$A_4=-6.9458\times10^{-4}$, $A_6=1.5259\times10^{-5}$,
$A_8=2.6078\times10^{-6}$, $A_{10}=-7.7165\times10^{-7}$ Sixth surface
K=–9.3792
$A_4=1.3385\times10^{-4}$, $A_6=2.8367\times10^{-5}$,
$A_8=-1.5231\times10^{-6}$, $A_{10}=7.4239\times10^{-8}$ Seventh surface
K=17.4105
$A_4=9.7360\times10^{-4}$, $A_6=-3.1247\times10^{-4}$,
$A_8=1.2173\times10^{-4}$ $A_{10}=-1.1815\times10^{-5}$ Twelfth surface
K=2.1491
$A_4=-3.7353\times10^{-4}$, $A_6=-4.2150\times10^{-6}$, $A_8=-1.7729\times10^{-8}$, $A_{10}=-5.0117\times10^{-9}$ FIGS. 26A–26C, 27A–27C, and 28A–28C show aberration curves in the finder of the seventh embodiment.

Eighth Embodiment

The finder of this embodiment, as shown in FIGS. 29A, 29B, and 29C, is constructed to include, in order from the object side, an objective optical system 39 comprised of the first lens unit $L_1$ with a negative refracting power, the second lens unit $L_2$ with a positive refracting power, and the third lens unit $L_3$ with a positive refracting power; a prism 40 whose entrance surface has a negative refracting power; a prism 41; and an eyepiece optical system 42. In the finder of the eighth embodiment, the prism 40 and the prism 41 constitute an image erecting optical system, and in particular, an entrance surface 40a of the prism 40 is configured as an aspherical surface and at the same time, is provided with a negative refracting power.

The finder of the eighth embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side. In the finder of the eighth embodiment, the refracting power of each lens is set to be somewhat weaker than those in other embodiments, and therefore its fabrication is facilitated.

The following are various numerical data relative to the finder of the eighth embodiment.

Finder magnification=0.40×–1.04×
Angle of incidence=24.90° –9.1°
Pupil diameter=4 mm
D/L=1.5483
Variable magnification ratio Z=2.592
Refractive index Nd=1.52542
$f_1/Z=-3.250$
$(r_b+r_a)/(r_b-r_a)=0.920$
$r_1=-16.6636$
    $d_1=0.7000$ $nd_1=1.58423$ $vd_1=30.49$
$r_2=7.0952$ (aspherical)
    $d_2=7.4701$ (wide-angle), 3.4835 (middle), 1.0312 (telephoto)
$r_3=5.5020$ (aspherical)

$d_3=1.6315$ $nd_3=1.49241$ $vd_3=57.66$
$r_4=-132.8127$
    $d_4=2.5108$ (wide-angle), 3.1293 (middle), 0.7000 (telephoto)
$r_5=14.2653$
    $d_5=1.3867$ $nd_5=1.49241$ $vd_5=57.66$
$r_6=-14.9657$ (aspherical)
    $d_6=1.8184$ (wide-angle), 4.9596 (middle), 9.9844 (telephoto)
$r_7=-16.3690$ (aspherical)
    $d_7=13.0005$ $nd_7=1.52542$ $vd_7=55.78$
$r_8=\infty$
    $d_8=1.5000$
$r_9=\infty$ (intermediate image position)
    $d_9=0$
$r_{10}=10.7238$
    $d_{10}=26.9129$ $nd_{10}=1.52542$ $vd_{10}=55.78$
$r_{11}=\infty$
    $d_{11}=1.5972$
$r_{12}=11.2912$ (aspherical)
    $d_{12}=2.4593$ $nd_{12}=1.49241$ $vd_{12}=57.66$
$r_{13}=-63.5641$
    $d_{13}=16.9$
$r_{14}$ (eyepoint)
Conic Constants and Aspherical Coefficients
Second surface
    $K=-12.1237$
    $A_4=3.5268\times10^{-3}$, $A_6=-3.1387\times10^{-4}$,
    $A_8=3.8780\times10^{-5}$, $A_{10}=-4.5175\times10^{-6}$
Third surface
    $K=-0.2993$
    $A_4=-9.1956\times10^{-4}$, $A_6=6.6052\times10^{-5}$,
    $A_8=-2.5063\times10^{-6}$, $A_{10}=-6.4242\times10^{-7}$
Sixth surface
    $K=-9.1896$
    $A_4=6.2847\times10^{-5}$, $A_6=6.6780\times10^{-5}$,
    $A_8=-5.3031\times10^{-6}$, $A_{10}=4.6131\times10^{-8}$
Seventh surface
    $K=17.5731$
    $A_4=-3.1963\times10^{-5}$, $A_6=-8.3475\times10^{-5}$,
    $A_8=1.4901\times10^{-5}$ $A_{10}=-7.6044\times10^{-7}$
Twelfth surface
    $K=2.4192$
    $A_4=-3.8284\times10^{-4}$, $A_6=6.5181\times10^{-7}$,
    $A_8=-2.0980\times10^{-7}$, $A_{10}=-1.7447\times10^{-9}$
FIGS. 30A–30C, 31A–31C, and 32A–32C show aberration curves in the finder of the eighth embodiment.

Ninth Embodiment

Figure 33A:
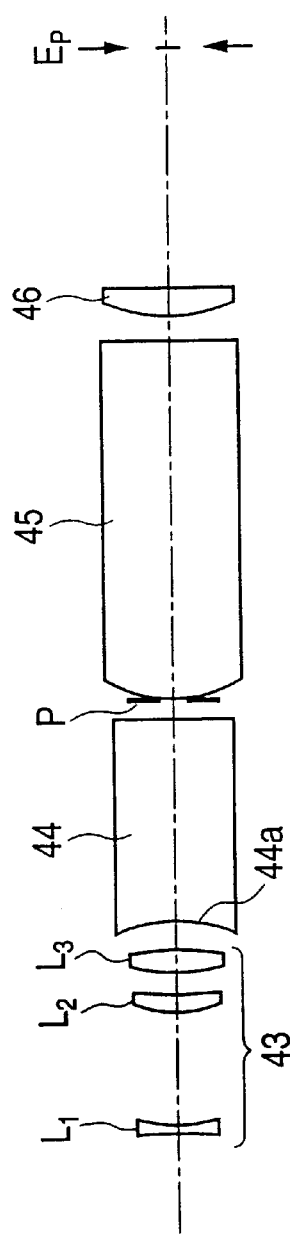
FIGS. 33A, 33B, and 33C are sectional views showing arrangements, developed along the optical axis, at wide-angle, middle, and telephoto positions, respectively, of the real image mode finder of a ninth embodiment in the present invention.
Figure 33B:
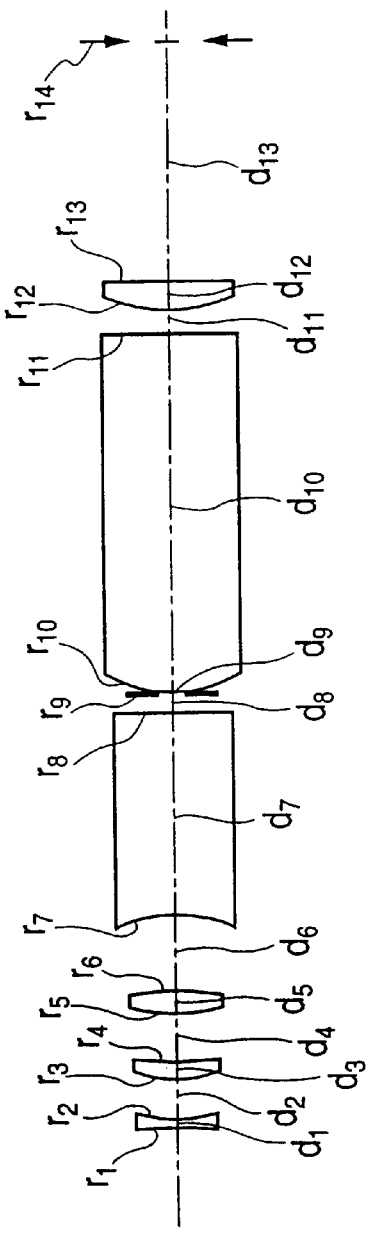
Figure 33C:
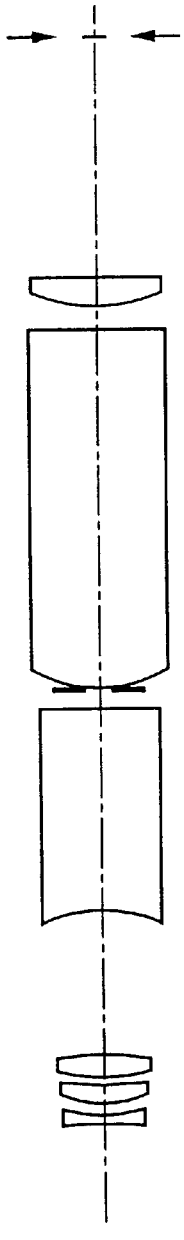
Figure 34A:
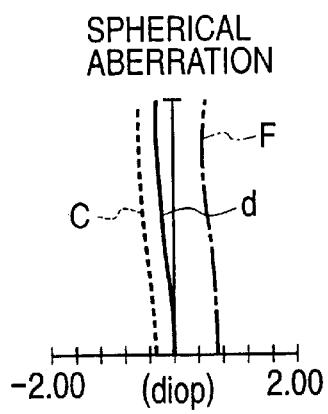
FIGS. 34A, 34B, and 34C are diagrams showing aberration curves at the wide-angle position of the real image mode finder of the ninth embodiment.
Figure 34B:
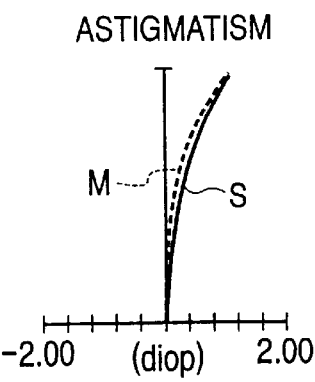
Figure 34C:
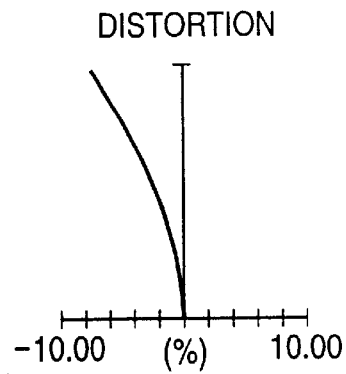
Figure 35A:
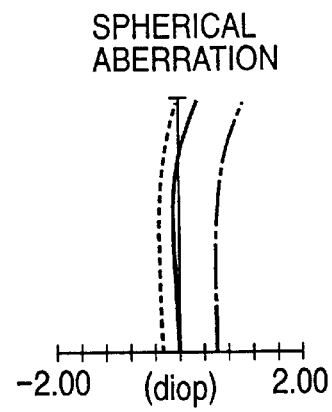
FIGS. 35A, 35B, and 35C are diagrams showing aberration curves at the middle position of the real image mode finder of the ninth embodiment.
Figure 35B:
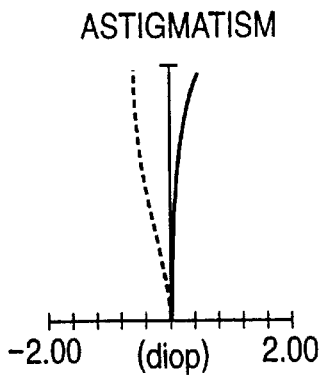
Figure 35C:
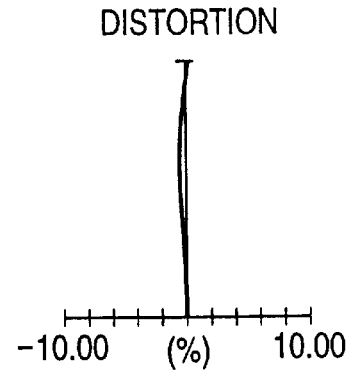
Figure 36A:
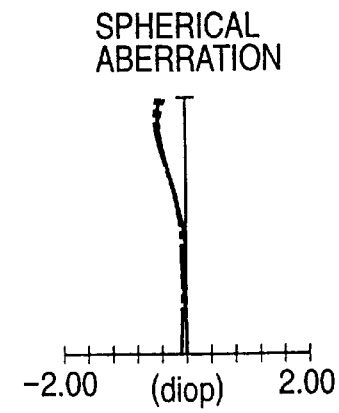
FIGS. 36A, 36B, and 36C are diagrams showing aberration curves at the telephoto position of the real image mode finder of the ninth embodiment.
Figure 36B:
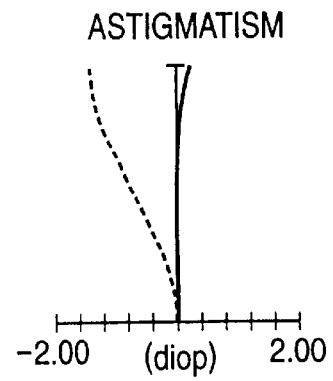
Figure 36C:
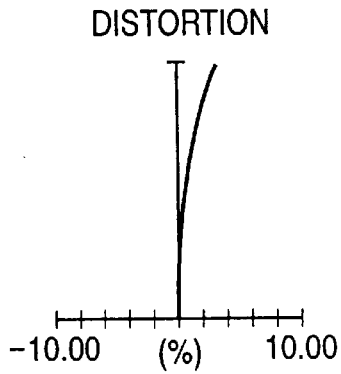

The finder of this embodiment, as shown in FIGS. 33A, 33B, and 33C, is constructed to include, in order from the object side, an objective optical system 43 comprised of the first lens unit $L_1$ with a negative refracting power, the second lens unit $L_2$ with a positive refracting power, and the third lens unit $L_3$ with a positive refracting power; a prism 44 whose entrance surface has a negative refracting power; a prism 45; and an eyepiece optical system 46. In the finder of the ninth embodiment, the prism 44 and the prism 45 constitute an image erecting optical system, and in particular, an entrance surface 44a of the prism 44 is configured as an aspherical surface and at the same time, is provided with a negative refracting power.

The finder of the ninth embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side. In the finder of the ninth embodiment, a variable magnification ratio is set to be somewhat higher than those in other embodiments.

The following are various numerical data relative to the finder of the ninth embodiment.
Finder magnification=0.40×–1.09×
Angle of incidence=25.30° –8.70°
Pupil diameter=4 mm
D/L=1.4020
Variable magnification ratio Z=2.733
Refractive index Nd=1.52542
$f_1/Z=-3.462$
$(r_b+r_a)/(r_b-r_a)=1.915$
$r_1=-19.4452$
    $d_1=0.7400$ $nd_1=1.58423$ $vd_1=30.49$
$r_2=7.8334$ (aspherical)
    $d_2=7.9590$ (wide-angle), 2.8012 (middle), 0.7015 (telephoto)
$r_3=7.0315$ (aspherical)
    $d_3=1.2173$ $nd_3=1.49241$ $vd_3=57.66$
$r_4=22.3993$
    $d_4=1.5428$ (wide-angle), 3.3244 (middle), 0.6020 (telephoto)
$r_5=8.5553$
    $d_5=1.8299$ $nd_5=1.49241$ $vd_5=57.66$
$r_6=-11.4068$ (aspherical)
    $d_6=2.0490$ (wide-angle), 5.3779 (middle), 10.2192 (telephoto)
$r_7=-19.7049$ (aspherical)
    $d_7=14.4000$ $nd_7=1.52542$ $vd_7=55.78$
$r_8=\infty$
    $d_8=1.5000$
$r_9=\infty$ (intermediate image position)
    $d_9=0$
$r_{10}=10.6000$
    $d_{10}=26.3784$ $nd_{10}=1.52542$ $vd_{10}=55.78$
$r_{11}=\infty$
    $d_{11}=1.7598$
$r_{12}=13.1926$ (aspherical)
    $d_{12}=2.2210$ $nd_{12}=1.49241$ $vd_{12}=57.66$
$r_{13}=-34.3712$
    $d_{13}=17.3$
$r_{14}$ (eyepoint)
Conic Constants and Aspherical Coefficients
Second surface
    $K=-7.4548$
    $A_4=1.2169\times10^{-3}$, $A_6=8.1002\times10^{-5}$,
    $A_8=-2.2431\times10^{-6}$, $A_{10}=-1.4313\times10^{-6}$
Third surface
    $K=-0.5302$
    $A_4=-6.9973\times10^{-4}$, $A_6=1.0601\times10^{-4}$,
    $A_8=-3.0963\times10^{-6}$, $A_{10}=-5.4082\times10^{-7}$
Sixth surface
    $K=-10.8460$
    $A_4=-3.5472\times10^{-4}$, $A_6=1.6332\times10^{-5}$,
    $A_8=1.4380\times10^{-6}$, $A_{10}=-8.9593\times10^{-8}$
Seventh surface
    $K=-0.8642$
    $A_4=-4.2209\times10^{-4}$, $A_6=-1.2824\times10^{-4}$,
    $A_8=2.1151\times10^{-5}$ $A_{10}=-1.3443\times10^{-6}$ Twelfth surface
K=1.0124
$A_4=-2.0216\times10^{-4}$, $A_6=3.0233\times10^{-6}$,
$A_8=-1.5842\times10^{-7}$, $A_{10}=2.7017\times10^{-9}$ FIGS. 34A–34C, 35A–35C, and 36A–36C show aberration curves in the finder of the ninth embodiment.

Tenth Embodiment

Figure 37A:
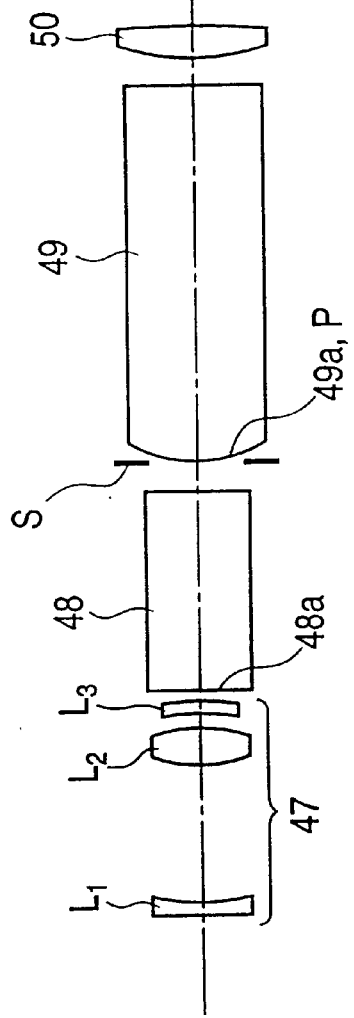
FIGS. 37A, 37B, and .37C are sectional views showing arrangements, developed along the optical axis, at wide-angle, middle, and telephoto positions, respectively, of the real image mode finder of a tenth embodiment in the present invention.
Figure 37B:
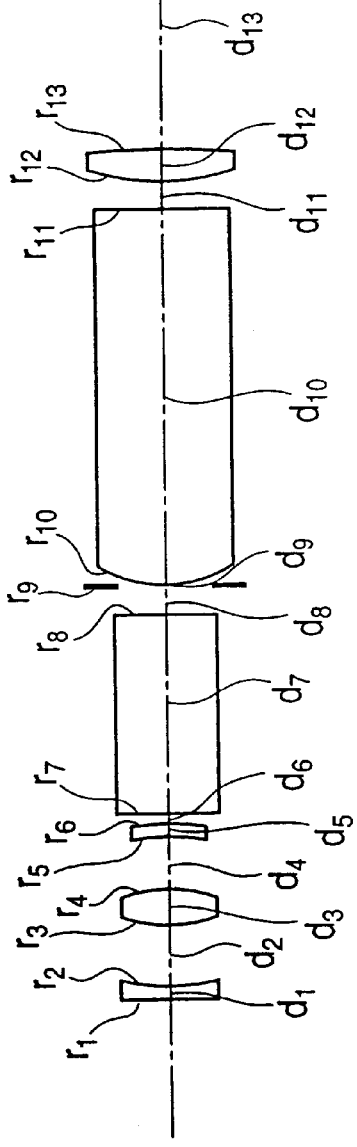
Figure 37C:
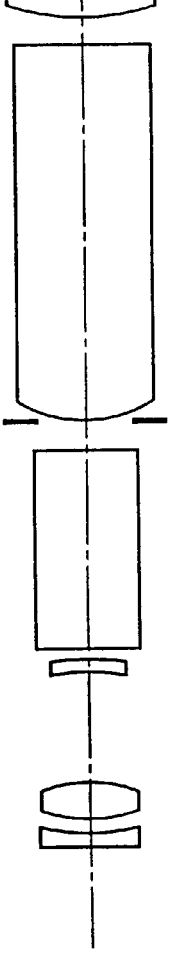

The finder of this embodiment, as shown in FIGS. 37A, 37B, and 37C, is constructed to include, in order from the object side, an objective optical system 47 comprised of the first lens unit $L_1$ with a negative refracting power, the second lens unit $L_2$ with a positive refracting power, and the third lens unit $L_3$ with a negative refracting power; a prism 48; a prism 49; and an eyepiece optical system 50. In the finder of the tenth embodiment, the prism 48 and the prism 49 constitute an image erecting optical system, and in particular, an entrance surface 48a of the prism 48 is configured as a planar surface. The intermediate image position P is set to lie on an entrance surface 49a of the prism 49. Also, reference symbol S denotes a stop.

The finder of the tenth embodiment has a variable magnification function. The first lens unit $L_1$ is moved along the optical axis toward the pupil side when the magnification is changed in the range from the wide-angle position to the middle position, and is moved toward the object side in the range from the middle position to the telephoto position. The second lens unit $L_2$ is simply moved along the optical axis toward the object side when the magnification is changed in the range from the wide-angle position to the telephoto position. The third lens unit $L_3$ remains fixed.

The following are various numerical data relative to the finder of the tenth embodiment.
Finder magnification=0.40×–1.04×
Angle of incidence=24.9° −9.0°
Pupil diameter=5 mm
D/fw=1.8957
Variable magnification ratio Z=2.598
Refractive index Nd=1.52542
$r_1=-17.0522$
  $d_1=0.8700$ $nd_1=1.58423$ $vd_1=30.49$
$r_2=10.3391$
  $d_2=9.3242$ (wide-angle), 4.1425 (middle), 0.8130 (telephoto)
$r_3=6.6134$ (aspherical)
  $d_3=2.6500$ $nd_3=1.52542$ $vd_3=55.78$
$r_4=-8.2008$ (aspherical)
  $d_4=1.0153$ (wide-angle), 3.4242 (middle), 7.4741 (telephoto)
$r_5=-11.9531$ (aspherical)
  $d_5=0.9000$ $nd_5=1.58423$ $vd_5=30.49$
$r_6=-25.2615$ (aspherical)
  $d_6=0.5800$ (wide-angle), 0.5800 (middle), 0.5800 (telephoto)
$r_7=\infty$
  $d_7=14.5000$ $nd_7=1.52542$ $vd_7=55.78$
$r_8=\infty$
  $d_8=2.0000$
$r_9=\infty$ (stop)
  $d_9=0.1250$
$r_{10}$ 8.8415
  $d_{10}=26.8129$ $nd_{10}=1.52542$ $vd_{10}=55.78$
$r_{11}=\infty$
  $d_{11}=1.7000$
$r_{12}=11.1075$ (aspherical)
  $d_{12}=2.5000$ $nd_{12}=1.49241$ $vd_{12}=57.66$
$r_{13}=-74.2974$
  $d_{13}=16.8$
$r_{14}$ (eyepoint)

Conic Constants and Aspherical Coefficients
Third surface
K=0.1958
$A_4=-9.8010\times10^{-4}$, $A_6=-3.5198\times10^{-5}$,
$A_8=3.2868\times10^{-6}$, $A_{10}=-5.4278\times10^{-7}$
Fourth surface
K=0.1931
$A_4=3.3183\times10^{-4}$, $A_6=-4.3263\times10^{-5}$,
$A_8=2.8435\times10^{-6}$, $A_{10}=-3.9112\times10^{-7}$
Fifth surface
K=3.7491
$A_4=1.4568\times10^{-4}$, $A_6=3.2824\times10^{-4}$,
$A_8=-1.1757\times10^{-4}$, $A_{10}=1.1918\times10^{-5}$
Sixth surface
K=4.6721
$A_4=-2.1994\times10^{-4}$, $A_6=4.4292\times10^{-4}$,
$A_8=-1.1339\times10^{-4}$ $A_{10}=9.8788\times10^{-6}$
Twelfth surface
K=0
$A_4=-1.9469\times10^{-4}$, $A_6=3.2810\times10^{-6}$,
$A_8=-1.4016\times10^{-7}$, $A_{10}=2.4489\times10^{-9}$ FIGS. 38A–38C, 39A–39C, and 40A–40C show aberration curves in the finder of the tenth embodiment.

Eleventh Embodiment

Figure 41A:
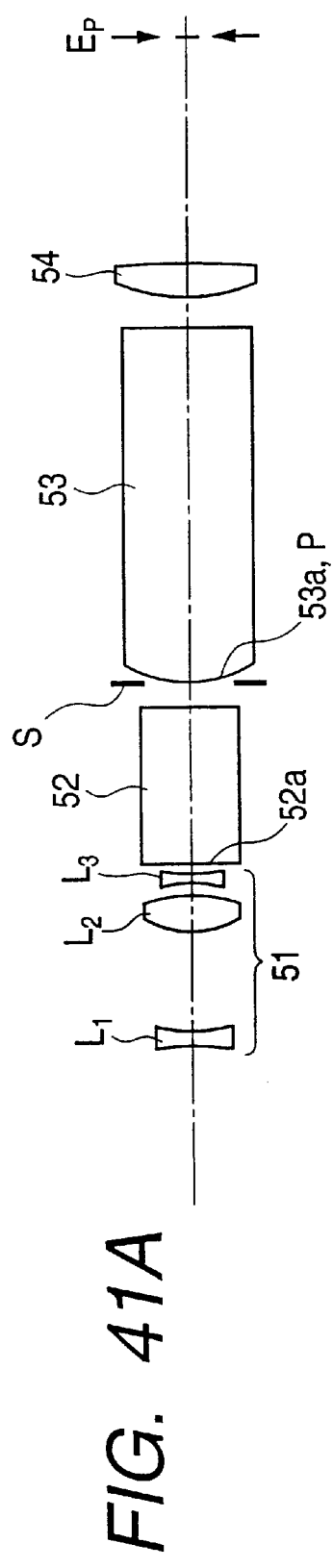
FIGS. 41A, 41B, and 41C are sectional views showing arrangements, developed along the optical axis, at wide-angle, middle, and telephoto positions, respectively, of the real image mode finder of an eleventh embodiment in the present invention.
Figure 41B:
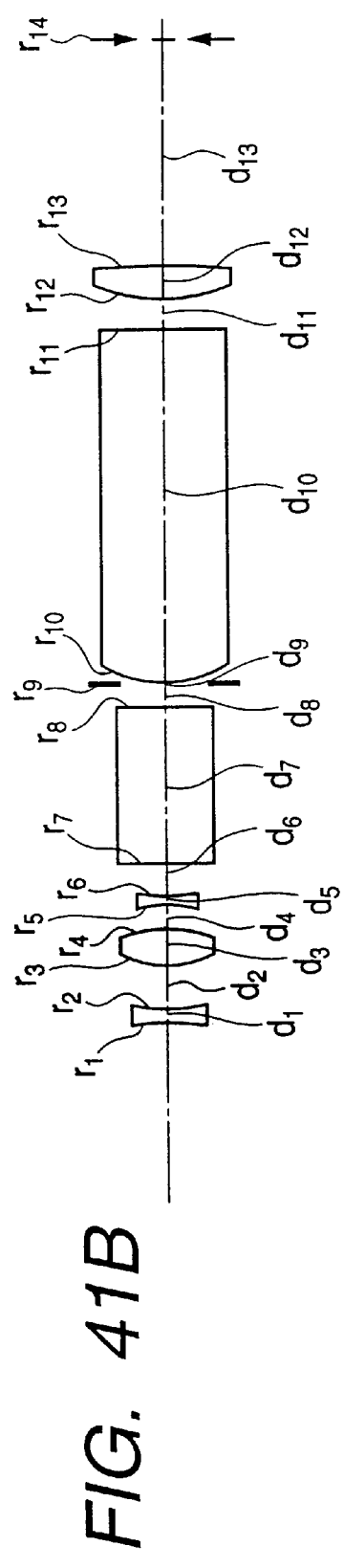
Figure 41C:
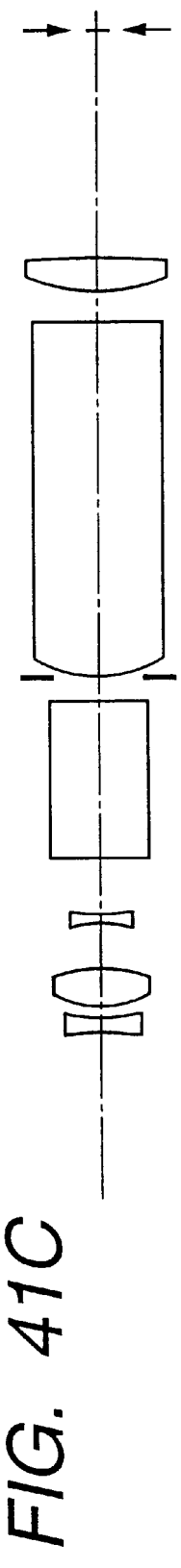
Figure 42A:
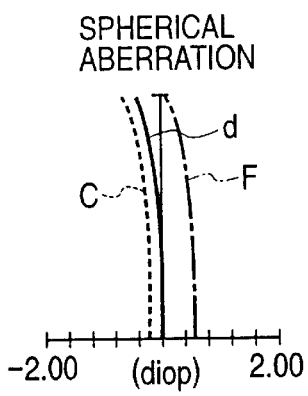
FIGS. 42A, 42B, and 42C are diagrams showing aberration curves at the wide-angle position of the real image mode finder of the eleventh embodiment.
Figure 42B:
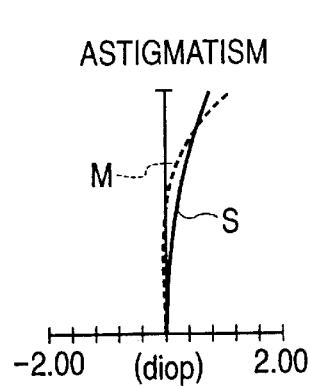
Figure 42C:
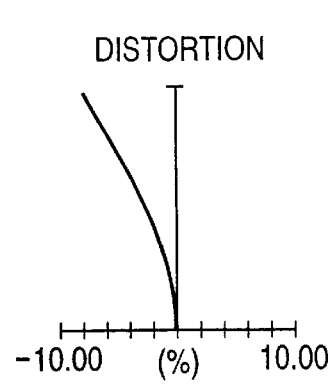
Figure 43A:
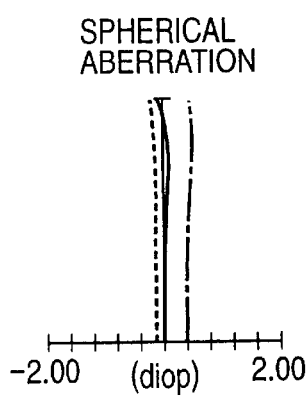
FIGS. 43A, 43B, and 43C are diagrams showing aberration curves at the middle position of the real image mode finder of the eleventh embodiment.
Figure 43B:
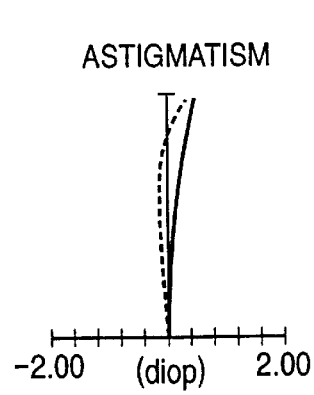
Figure 43C:
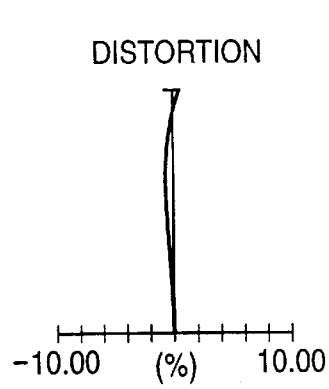
Figure 44A:
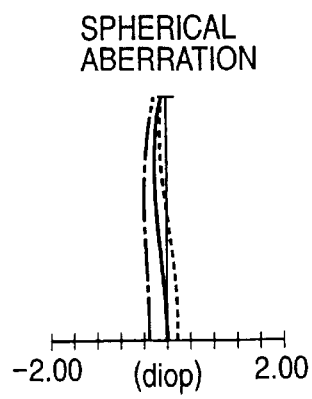
FIGS. 44A, 44B, and 44C are diagrams showing aberration curves at the telephoto position of the real image mode finder of the eleventh embodiment.
Figure 44B:
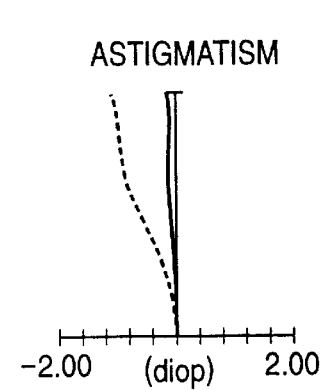
Figure 44C:
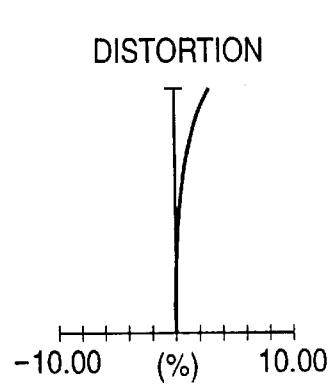

The finder of this embodiment, as shown in FIGS. 41A, 41B, and 41C, is constructed to include, in order from the object side, an objective optical system 51 comprised of the first lens unit $L_1$ with a negative refracting power, the second lens unit $L_2$ with a positive refracting power, and the third lens unit $L_3$ with a negative refracting power; a prism 52; a prism 53; and an eyepiece optical system 54. In the finder of the eleventh embodiment, the prism 52 and the prism 53 constitute an image erecting optical system, and in particular, an entrance surface 52a of the prism 52 is configured as a planar surface. The intermediate image position P is set to lie on an entrance surface 53a of the prism 53.

The finder of the eleventh embodiment has a variable magnification function. The first lens unit $L_1$ is moved along the optical axis toward the pupil side when the magnification is changed in the range from the wide-angle position to the middle position, and is moved toward the object side in the range from the middle position to the telephoto position. The second and third lens units $L_2$ and $L_3$ are simply moved along the optical axis toward the object side when the magnification is changed in the range from the wide-angle position to the telephoto position. The finder of the eleventh embodiment is particularly designed to make the zoom space of the objective optical system 51 smaller than in other embodiments, and thus is peculiarly suitable for a compact camera.

The following are various numerical data relative to the finder of the eleventh embodiment.
Finder magnification=0.40×–1.04×
Angle of incidence=24.9° −9.0°
Pupil diameter=5 mm
D/fw=1.6036
Variable magnification ratio Z=2.595
Refractive index Nd=1.52542
$r_1=-11.7101$
  $d_1=0.8000$ $nd_1=1.58423$ $vd_1=30.49$ $r_2=9.4734$
  $d_2=7.0631$ (wide-angle), 3.1893 (middle), 0.7000 (telephoto)
$r_3=4.4360$ (aspherical)
  $d_3=2.8800$ $nd_3=1.52542$ $vd_3=55.78$
$r_4=-6.4974$ (aspherical)
  $d_4=0.9192$ (wide-angle), 1.8213 (middle), 3.2828 (telephoto)
$r_5=-7.9073$ (aspherical)
  $d_5=0.8300$ $nd_5=1.58423$ $vd_5=30.49$
$r_6=413.4453$ (aspherical)
  $d_6=0.8000$ (wide-angle), 2.4629 (middle), 4.6198 (telephoto)
$r_7=\infty$
  $d_7=11.7500$ $nd_7=1.52542$ $vd_7=55.78$
$r_8=\infty$
  $d_8=2.0000$
$r_9=\infty$ (stop)
  $d_9=0.1250$
$r_{10}=8.7661$
  $d_{10}=27.0000$ $nd_{10}=1.52542$ $vd_{10}=55.78$
$r_{11}=\infty$
  $d_{11}=1.5500$
$r_{12}=11.0069$ (aspherical)
  $d_{12}=3.2000$ $nd_{12}=1.49241$ $vd_{12}=57.66$
$r_{13}=-78.4183$
  $d_{13}=16.9$
$r_{14}$ (eyepoint)
Conic Constants and Aspherical Coefficients
Third surface
  $K=0.1472$
  $A_4=-1.7346\times10^{-3}$, $A_6=-3.0806\times10^{-5}$,
  $A_8=-5.8541\times10^{-6}$, $A_{10}=2.8383\times10^{-7}$
Fourth surface
  $K=0.0976$
  $A_4=1.8229\times10^{-3}$, $A_6=-4.9836\times10^{-5}$,
  $A_8=1.8886\times10^{-6}$, $A_{10}=2.9337\times10^{-7}$
Fifth surface
  $K=3.6416$
  $A_4=3.0122\times10^{-3}$, $A_6=3.9661\times10^{-4}$,
  $A_8=-7.9567\times10^{-5}$, $A_{10}=5.9032\times10^{-6}$
Sixth surface
  $K=3.5017$
  $A_4=1.7615\times10^{-3}$, $A_6=7.2179\times10^{-4}$,
  $A_8=-6.3774\times10^{-5}$ $A_{10}=-2.7087\times10^{-6}$
Twelfth surface
  $K=0$
  $A_4=-2.0589\times10^{-4}$, $A_6=4.1192\times10^{-6}$,
  $A_8=-1.2619\times10^{-7}$, $A_{10}=1.3430\times10^{-9}$ FIGS. 42A–42C, 43A–43C, and 44A–44C show aberration curves in the finder of the eleventh embodiment.

Twelfth Embodiment

Figure 45A:
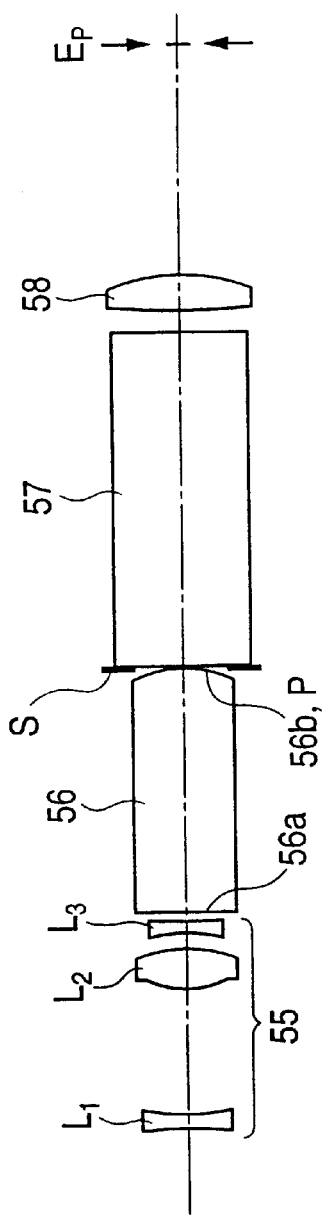
FIGS. 45A, 45B, and 45C are sectional views showing arrangements, developed along the optical axis, at wide-angle, middle, and telephoto positions, respectively, of the real image mode finder of a twelfth embodiment in the present invention.
Figure 45B:
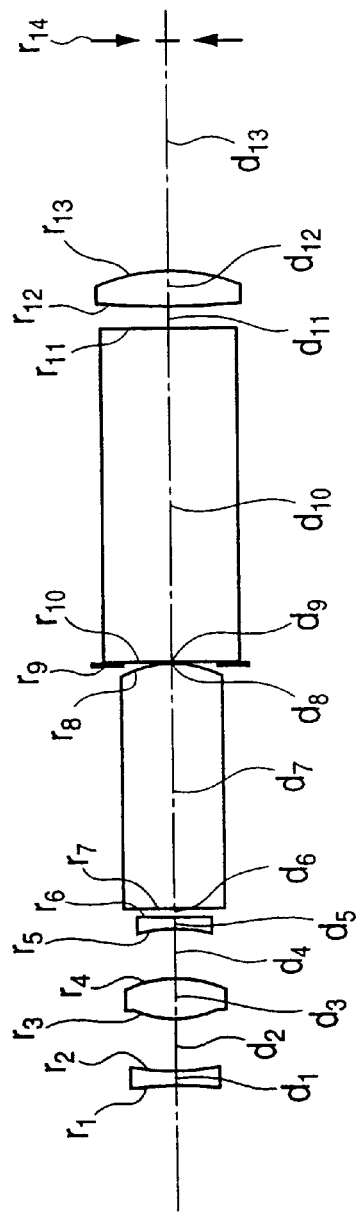
Figure 45C:
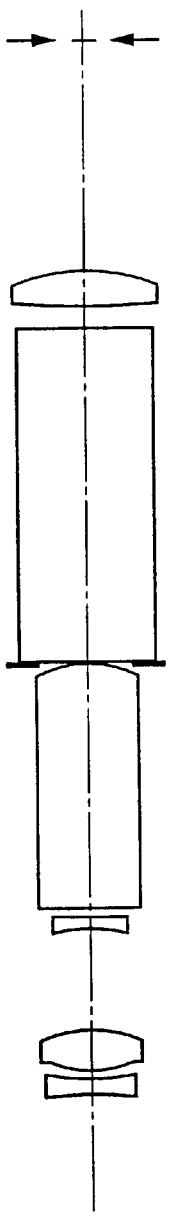
Figure 46A:
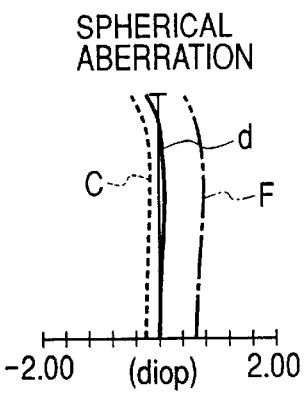
FIGS. 46A, 46B, and 46C are diagrams showing aberration curves at the wide-angle position of the real image mode finder of the twelfth embodiment.
Figure 46B:
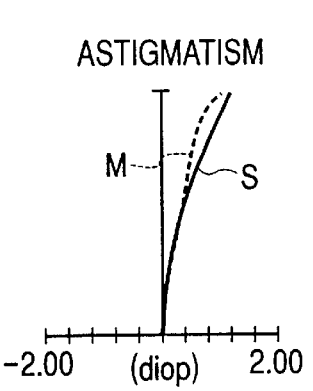
Figure 46C:
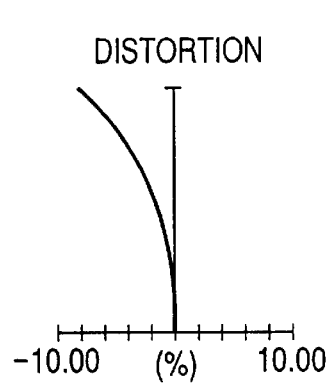
Figure 47A:
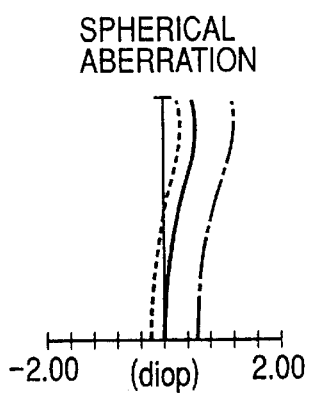
FIGS. 47A, 47B, and 47C are diagrams showing aberration curves at the middle position of the real image mode finder of the twelfth embodiment.
Figure 47B:
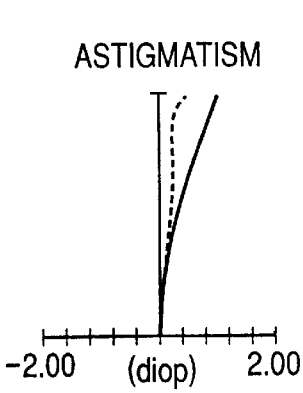
Figure 47C:
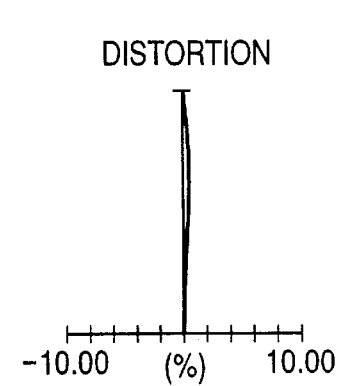
Figure 48A:
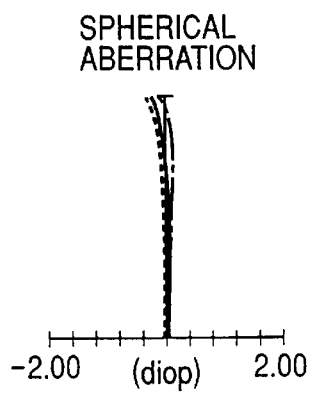
FIGS. 48A, 48B, and 48C are diagrams showing aberration curves at the telephoto position of the real image mode finder of the twelfth embodiment.
Figure 48B:
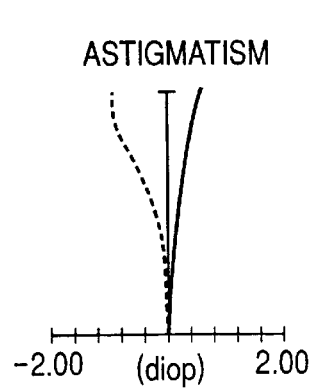
Figure 48C:
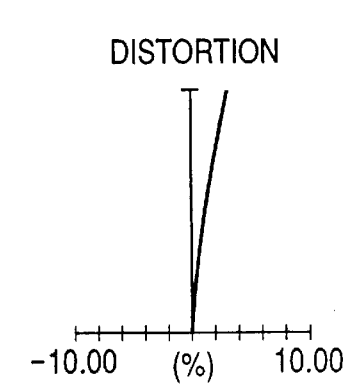

The finder of this embodiment, as shown in FIGS. 45A, 45B, and 45C, is constructed to include, in order from the object side, an objective optical system 55 comprised of the first lens unit $L_1$ with a negative refracting power, the second lens unit $L_2$ with a positive refracting power, and the third lens unit $L_3$ with a negative refracting power; a prism 56; a prism 57; and an eyepiece optical system 58. In the finder of the twelfth embodiment, the prism 56 and the prism 57 constitute an image erecting optical system, and in particular, an entrance surface 56a of the prism 56 is configured as a planar surface. The intermediate image position P is set to lie on an exit surface 56b of the prism 56.

The finder of the twelfth embodiment has a variable magnification function. The first lens unit $L_1$ is moved along the optical axis toward the pupil side when the magnification is changed in the range from the wide-angle position to the middle position, and is moved toward the object side in the range from the middle position to the telephoto position. The second lens unit $L_2$ is simply moved along the optical axis toward the object side when the magnification is changed in the range from the wide-angle position to the telephoto position. The third lens unit $L_3$ remains fixed.

The following are various numerical data relative to the finder of the twelfth embodiment.

Finder magnification=0.40×–1.04×
Angle of incidence=24.8° –9.0°
Pupil diameter=5 mm
D/fw=1.8944
Variable magnification ratio Z=2.604
Refractive index Nd=1.52542
$r_1=-19.2754$
  $d_1=0.8700$ $nd_1=1.58423$ $vd_1=30.49$
$r_2=9.5360$
  $d_2=9.1965$ (wide-angle), 4.0546 (middle), 0.7781 (telephoto)
$r_3=6.8412$ (aspherical)
  $d_3=2.6500$ $nd_3=1.52542$ $vd_3=55.78$
$r_4=-7.6555$ (aspherical)
  $d_4=1.1036$ (wide-angle), 3.4815 (middle), 7.4260 (telephoto)
$r_5=-8.4920$ (aspherical)
  $d_5=0.9000$ $nd_5=1.58423$ $vd_5=30.49$
$r_6=-13.8960$ (aspherical)
  $d_6=0.5800$ (wide-angle), 0.5800 (middle), 0.5800 (telephoto)
$r_7=\infty$
  $d_7=17.5303$ $nd_7=1.52542$ $vd_7=55.78$
$r_8=-8.9258$
  $d_8=0$
$r_9=\infty$ (stop)
  $d_9=0.1250$
$r_{10}=\infty$
  $d_{10}=24.6570$ $nd_{10}=1.52542$ $vd_{10}=55.78$
$r_{11}=\infty$
  $d_{11}=1.7000$
$r_{12}=40.1022$ (aspherical)
  $d_{12}=2.5000$ $nd_{12}=1.49241$ $vd_{12}=57.66$
$r_{13}=-12.3485$
  $d_{13}=16.8$
$r_{14}$ (eyepoint)
Conic Constants and Aspherical Coefficients
Third surface
  $K=0.1587$
  $A_4=-1.2297\times10^{-3}$, $A_6=-4.4768\times10^{-5}$,
  $A_8=-3.4388\times10^{-6}$, $A_{10}=-6.3978\times10^{-7}$
Fourth surface
  $K=0.1930$
  $A_4=-6.4989\times10^{-5}$, $A_6=-3.4059\times10^{-5}$,
  $A_8=-4.7002\times10^{-6}$, $A_{10}=-2.1470\times10^{-7}$
Fifth surface
  $K=3.8242$
  $A_4=8.1903\times10^{-3}$, $A_6=-5.7588\times10^{-4}$,
  $A_8=3.6704\times10^{-5}$, $A_{10}=8.5147\times10^{-7}$ Sixth surface
K=4.7229
$A_4$=8.1692×10$^{-3}$, $A_6$=−5.9533×10$^{-4}$,
$A_8$=6.1899×10$^{-5}$ $A_{10}$=−2.2431×10$^{-6}$
Twelfth surface
K=0
$A_4$=−8.4654×10$^{-6}$, $A_6$=−9.0218×10$^{-6}$,
$A_8$=4.2559×10$^{-7}$, $A_{10}$=−7.2036×10$^{-9}$ FIGS. 46A–46C, 47A–47C, and 48A–48C show aberration curves in the finder of the twelfth embodiment.

Thirteenth Embodiment

Figure 49A:
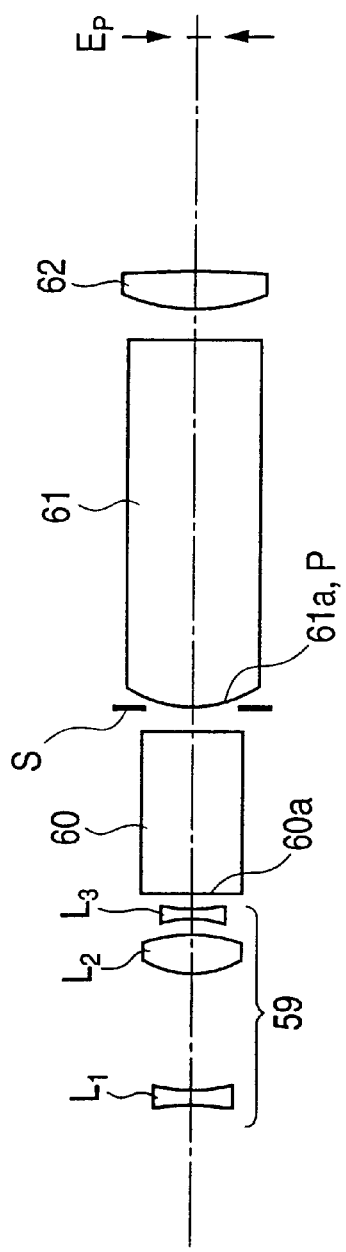
FIGS. 49A, 49B, and 49C are sectional views showing arrangements, developed along the optical axis, at wide-angle, middle, and telephoto positions, respectively, of the real image mode finder of a thirteenth embodiment in the present invention.
Figure 49B:
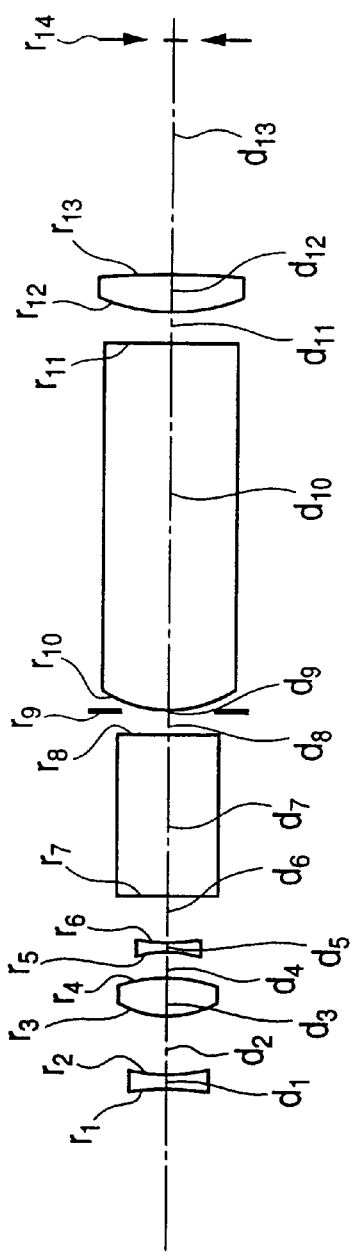
Figure 49C:
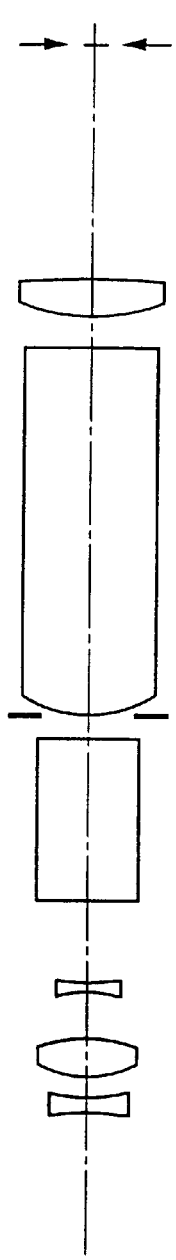
Figure 50A:
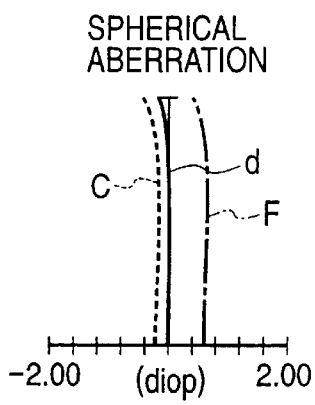
FIGS. 50A, 50B, and 50C are diagrams showing aberration curves at the wide-angle position of the real image mode finder of the thirteenth embodiment.
Figure 50B:
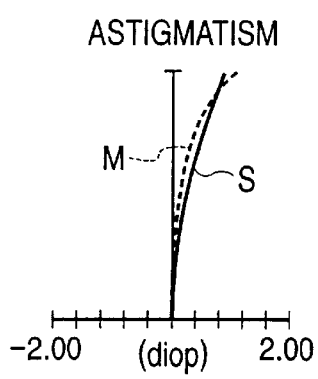
Figure 50C:
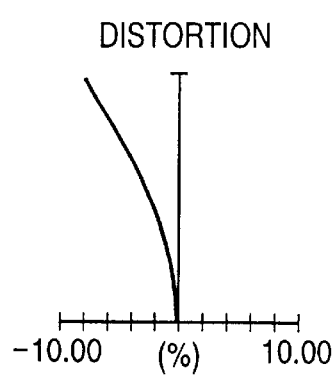
Figure 51A:
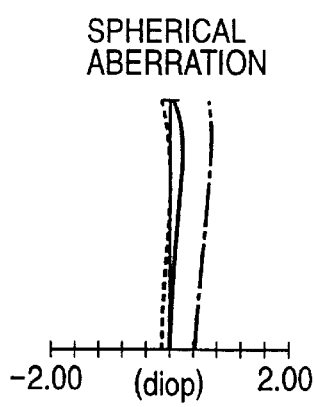
FIGS. 51A, 51B, and 51C are diagrams showing aberration curves at the middle position of the real image mode finder of the thirteenth embodiment.
Figure 51B:
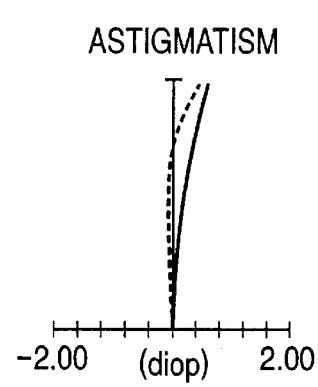
Figure 51C:
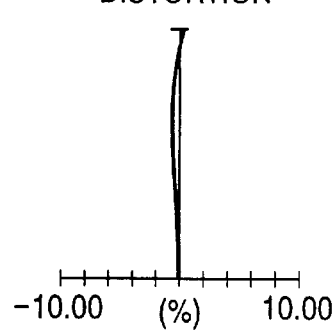
Figure 52A:
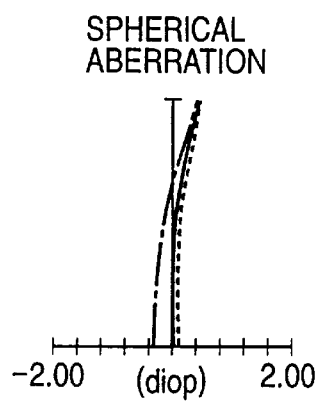
FIGS. 52A, 52B, and 52C are diagrams showing aberration curves at the telephoto position of the real image mode finder of the thirteenth embodiment.
Figure 52B:
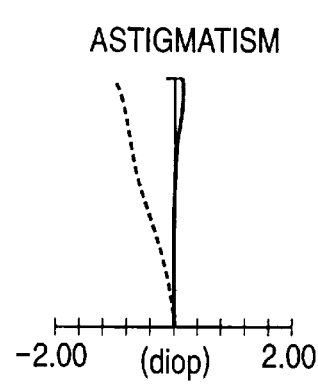
Figure 52C:
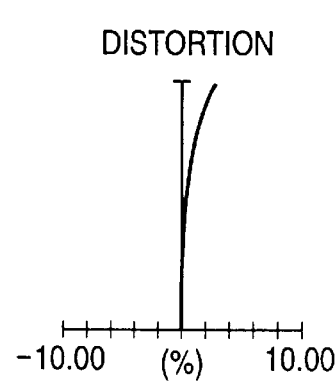

The finder of this embodiment, as shown in FIGS. 49A, 49B, and 49C, is constructed to include, in order from the object side, an objective optical system 59 comprised of the first lens unit $L_1$ with a negative refracting power, the second lens unit $L_2$ with a positive refracting power, and the third lens unit $L_3$ with a negative refracting power; a prism 60; a prism 61; and an eyepiece optical system 62. In the finder of the thirteenth embodiment, the prism 60 and the prism 61 constitute an image erecting optical system, and in particular, an entrance surface 60a of the prism 60 is configured as a planar surface. The intermediate image position P is set to lie on an entrance surface 61a of the prism 61.

The finder of the thirteenth embodiment has a variable magnification function. The first lens unit $L_1$ is moved along the optical axis toward the pupil side when the magnification is changed in the range from the wide-angle position to the middle position, and is moved toward the object side in the range from the middle position to the telephoto position. The second and third lens units $L_2$ and $L_3$ are simply moved along the optical axis toward the object side when the magnification is changed in the range from the wide-angle position to the telephoto position. The finder of the thirteenth embodiment is suitable for a high-magnification finder because its variable magnification ratio is set to be somewhat high.

The following are various numerical data relative to the finder of the thirteenth embodiment.
Finder magnification=0.39×–1.06×
Angle of incidence=25.2° −8.8°
Pupil diameter=5 mm
D/fw=1.8254
Variable magnification ratio Z=2.699
Refractive index Nd=1.52542
$r_1$=−15.3257
　$d_1$=0.9500 $nd_1$=1.58423 $vd_1$=30.49
$r_2$=8.9262
　$d_2$=8.1529 (wide-angle), 3.8497 (middle), 0.9624 (telephoto)
$r_3$=4.6415 (aspherical)
　$d_3$=2.9500 $nd_3$=1.52542 $vd_3$=55.78
$r_4$=−7.5724 (aspherical)
　$d_4$=0.9962 (wide-angle), 1.8004 (middle), 3.3225 (telephoto)
$r_5$=−9.7203 (aspherical)
　$d_5$=0.9500 $nd_5$=1.58423 $vd_5$=30.49
$r_6$=128.7740 (aspherical)
　$d_6$=0.8000 (wide-angle), 2.8254 (middle), 5.4901 (telephoto)
$r_7$=∞
　$d_7$=11.7500 $nd_7$=1.52542 $vd_7$=55.78
$r_8$=∞
　$d_8$=2.0000
$r_9$=∞ (stop)
　$d_9$=0.1250
$r_{10}$=8.9990
　$d_{10}$=27.0000 $nd_{10}$=1.52542 $vd_{10}$=55.78
$r_{11}$=∞
　$d_{11}$=1.5500
$r_{12}$=10.9139 (aspherical)
　$d_{12}$=3.2000 $nd_{12}$=1.49241 $vd_{12}$=57.66
$r_{13}$=−83.3961
　$d_{13}$=16.9
$r_{14}$ (eyepoint)
Conic Constants and Aspherical Coefficients
Third surface
K=0.0956
$A_4$=−1.2002×10$^{-3}$, $A_6$=−6.7082×10$^{-5}$,
$A_8$=9.1602×10$^{-7}$, $A_{10}$=−8.0863×10$^{-8}$
Fourth surface
K=0.1115
$A_4$=1.3722×10$^{-3}$, $A_6$=−9.9488×10$^{-5}$,
$A_8$=1.1158×10$^{-5}$, $A_{10}$=−4.2709×10$^{-7}$
Fifth surface
K=3.6386
$A_4$=1.5127×10$^{-3}$, $A_6$=3.9146×10$^{-4}$,
$A_8$=−8.5206×10$^{-5}$, $A_{10}$=6.3426×10$^{-6}$
Sixth surface
K=3.8317
$A_4$=1.1342×10$^{-3}$, $A_6$=7.8281×10$^{-4}$,
$A_8$=−1.1392×10$^{-4}$ $A_{10}$=4.4761×10$^{-6}$
Twelfth surface
K=0
$A_4$=−1.9117×10$^{-4}$, $A_6$=3.3233×10$^{-6}$,
$A_8$=−1.3303×10$^{-7}$, $A_{10}$=2.0830×10$^{-9}$ FIGS. 50A–50C, 51A–51C, and 52A–52C show aberration curves in the finder of the thirteenth embodiment.

Fourteenth Embodiment

Figure 53A:
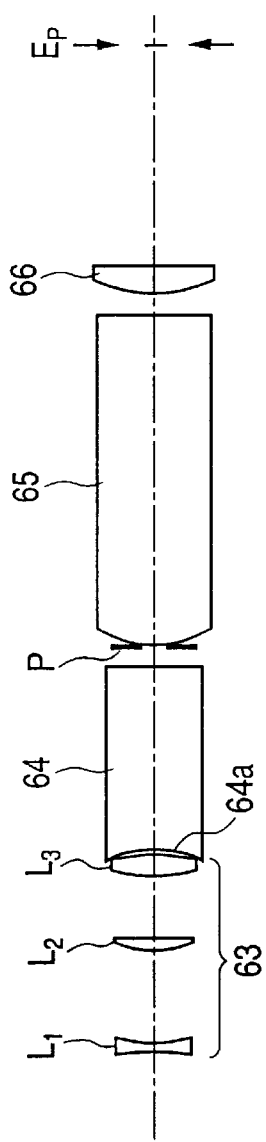
FIGS. 53A, 53B, and 53C are sectional views showing arrangements, developed along the optical axis, at wide-angle, middle, and telephoto positions, respectively, of the real image mode finder of a fourteenth embodiment in the present invention.
Figure 53B:
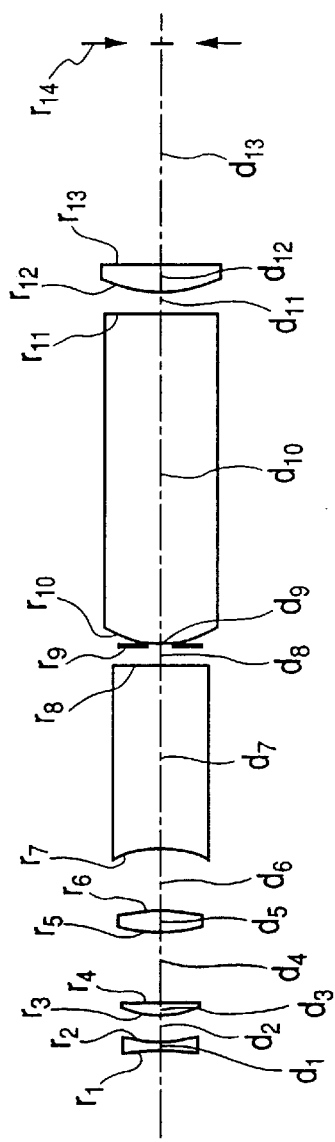
Figure 53C:
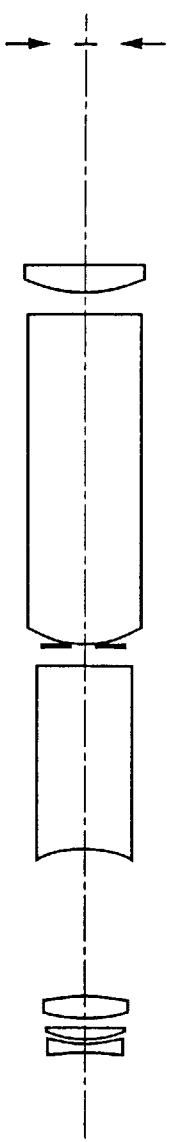
Figure 54A:
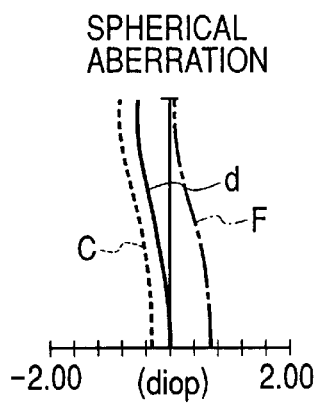
FIGS. 54A, 54B, and 54C are diagrams showing aberration curves at the wide-angle position of the real image mode finder of the fourteenth embodiment.
Figure 54B:
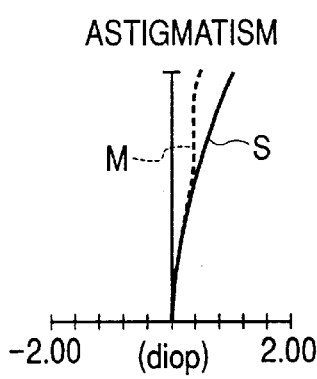
Figure 54C:
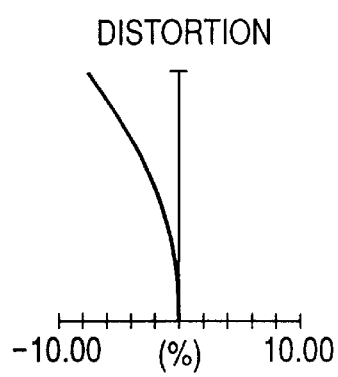
Figure 55A:
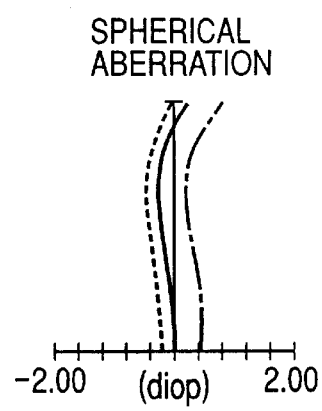
FIGS. 55A, 55B, and 55C are diagrams showing aberration curves at the middle position of the real image mode finder of the fourteenth embodiment.
Figure 55B:
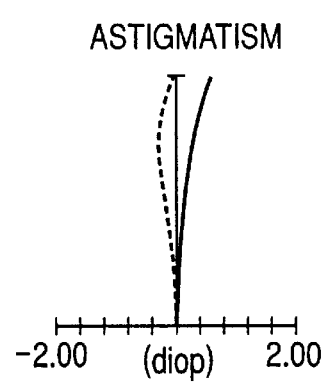
Figure 55C:
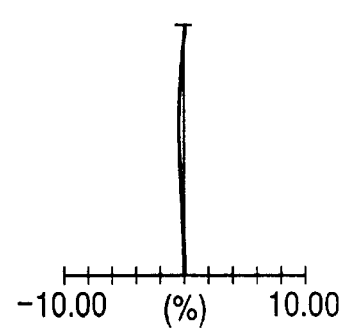
Figure 56A:
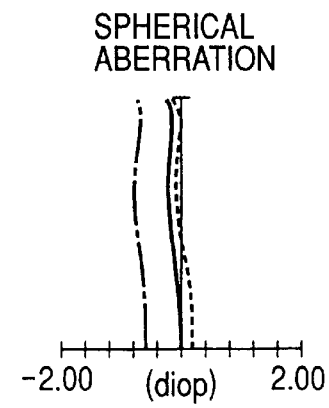
FIGS. 56A, 56B, and 56C are diagrams showing aberration curves at the telephoto position of the real image mode finder of the fourteenth embodiment.
Figure 56B:
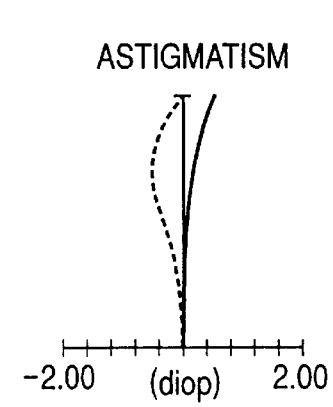
Figure 56C:
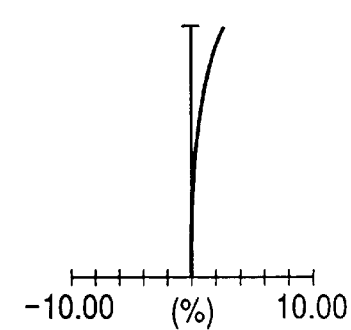

The finder of this embodiment, as shown in FIGS. 53A, 53B, and 53C, is constructed to include, in order from the object side, an objective optical system 63 comprised of the first lens unit $L_1$ with a negative refracting power, the second lens unit $L_2$ with a positive refracting power, and the third lens unit $L_3$ with a positive refracting power; a prism 64 whose entrance surface has a negative refracting power; a prism 65; and an eyepiece optical system 66. In the finder of the fourteenth embodiment, the prism 64 and the prism 65 constitute an image erecting optical system, and in particular, an entrance surface 64a of the prism 64 is configured as an aspherical surface and at the same time, is provided with a negative refracting power.

The finder of the fourteenth embodiment has a variable magnification function. When the magnification is changed in the range from the wide-angle position to the telephoto position, the first lens unit $L_1$ is fixed, and the second and third lens units $L_2$ and $L_3$ are simply moved along the optical axis toward the object side. The finder of the fourteenth embodiment is set so that its variable magnification ratio is relatively high, and thus can be used as a high variable magnification finder.

The following are various numerical data relative to the finder of the fourteenth embodiment.
Finder magnification=0.37×–1.18×
Angle of incidence=25.6° −8.0°
Pupil diameter=4 mm
D/L=1.6525

Variable magnification ratio Z=3.148
Refractive index Nd=1.52542
$f_1/Z=-2.515$
$(r_b+r_a)/(r_b-r_a)=0.672$
$r_1=-14.2481$
  $d_1=0.5000$ $nd_1=1.58423$ $vd_1=30.49$
$r_2=6.9390$ (aspherical)
  $d_2=7.1902$ (wide-angle), 2.3800 (middle), 0.3179 (telephoto)
$r_3=6.6411$ (aspherical)
  $d_3=1.0000$ $nd_3=1.49241$ $vd_3=57.66$
$r_4=-33.8435$
  $d_4=4.8168$ (wide-angle), 5.1206 (middle), 0.7996 (telephoto)
$r_5=10.1631$
  $d_5=1.7925$ $nd_5=1.49241$ $vd_5=57.66$
$r_6=-15.8201$ (aspherical)
  $d_6=0.3000$ (wide-angle), 4.8069 (middle), 11.1876 (telephoto)
$r_7=-20.9612$ (aspherical)
  $d_7=14.4000$ $nd_7=1.52542$ $vd_7=55.78$
$r_8=\infty$
  $d_8=1.5000$
$r_9=\infty$ (intermediate image position)
  $d_9=0$
$r_{10}=10.6000$
  $d_{10}=26.3921$ $nd_{10}=1.52542$ $vd_{10}=55.78$
$r_{11}=\infty$
  $d_{11}=1.7565$
$r_{12}=13.1424$ (aspherical)
  $d_{12}=2.2210$ $nd_{12}=1.49241$ $vd_{12}=57.66$
$r_{13}=-34.7528$
  $d_{13}=17.3$
$r_{14}$ (eyepoint)
Conic Constants and Aspherical Coefficients
Second surface
  $K=-6.4906$
  $A_4=1.2153\times10^{-3}$, $A_6=-6.0777\times10^{-5}$,
  $A_8=4.2101\times10^{-5}$, $A_{10}=-6.2087\times10^{-6}$
Third surface
  $K=-0.5772$
  $A_4=-1.0875\times10^{-3}$, $A_6=7.7167\times10^{-5}$,
  $A_8=2.8316\times10^{-5}$, $A_{10}=-4.7912\times10^{-6}$
Sixth surface
  $K=-10.8883$
  $A_4=2.8711\times10^{-5}$, $A_6=1.8333\times10^{-5}$,
  $A_8=-1.4429\times10^{-7}$, $A_{10}=-2.3236\times10^{-7}$
Seventh surface
  $K=-3.1754$
  $A_4=-2.6146\times10^{-4}$, $A_6=-1.1264\times10^{-4}$,
  $A_8=2.9418\times10^{-5}$ $A_{10}=-2.4589\times10^{-6}$
Twelfth surface
  $K=1.3861$
  $A_4=-2.1455\times10^{-4}$, $A_6=6.8469\times10^{-7}$,
  $A_8=5.8748\times10^{-10}$, $A_{10}=-1.6135\times10^{-9}$ FIGS. 54A–54C, 55A–55C, and 56A–56C show aberration curves in the finder of the fourteenth embodiment.

Fifteenth Embodiment

Figure 57A:
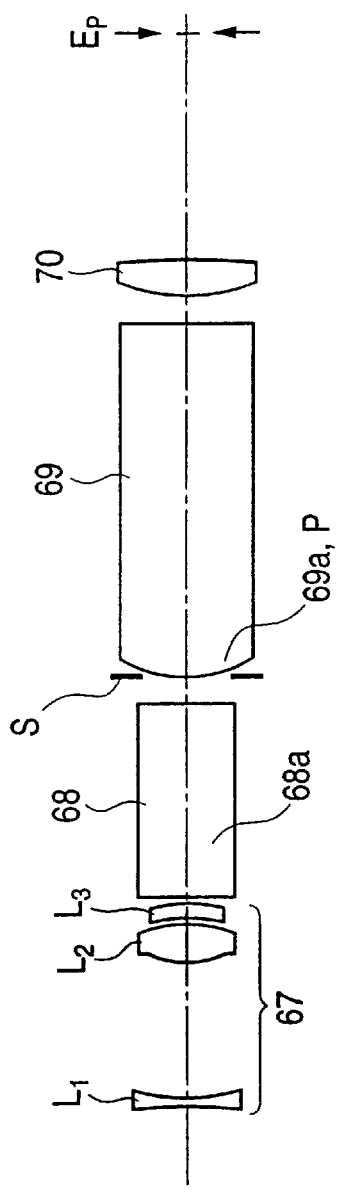
FIGS. 57A, 57B, and 57C are sectional views showing arrangements, developed along the optical axis, at wide-angle, middle, and telephoto positions, respectively, of the real image mode finder of a fifteenth embodiment in the present invention.
Figure 57B:
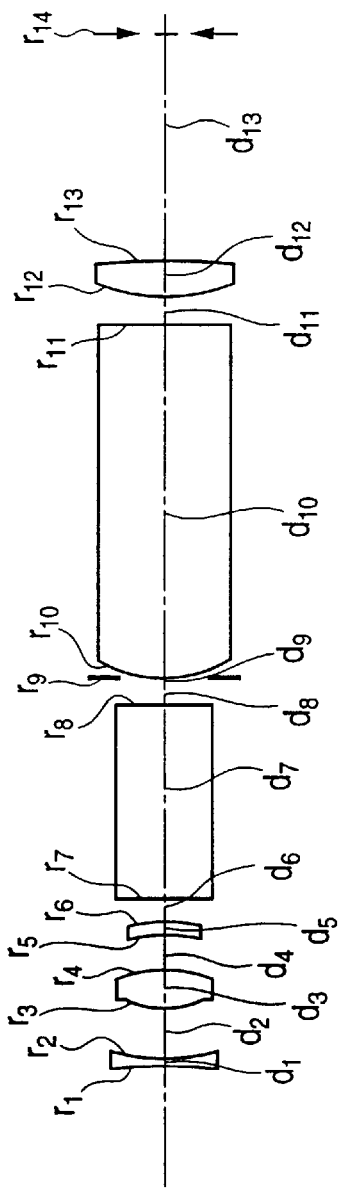
Figure 57C:
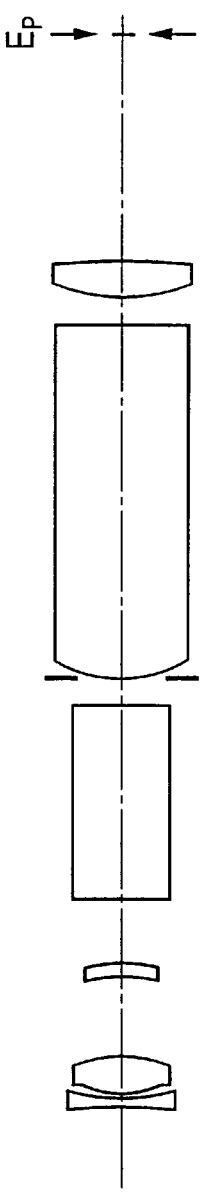
Figure 58A:
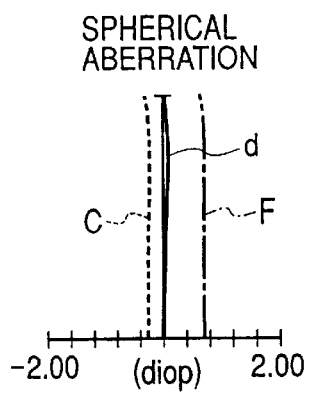
FIGS. 58A, 58B, and 58C are diagrams showing aberration curves at the wide-angle position of the real image mode finder of the fifteenth embodiment.
Figure 58B:
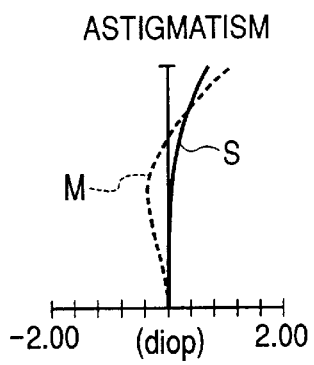
Figure 58C:
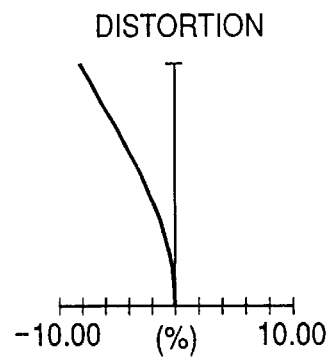
Figure 59A:
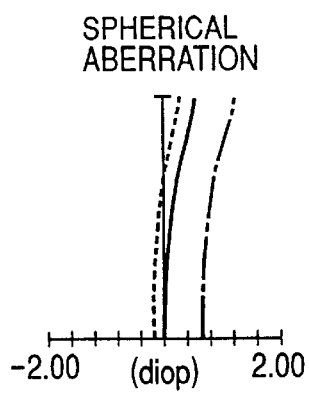
FIGS. 59A, 59B, and 59C are diagrams showing aberration curves at the middle position of the real image mode finder of the fifteenth embodiment.
Figure 59B:
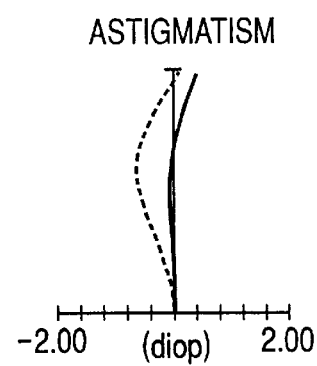
Figure 59C:
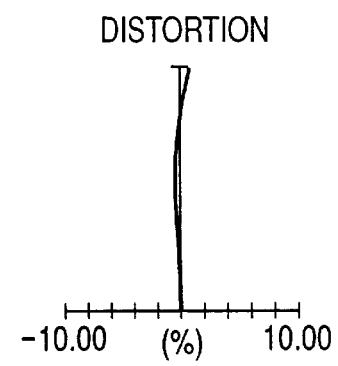
Figure 60A:
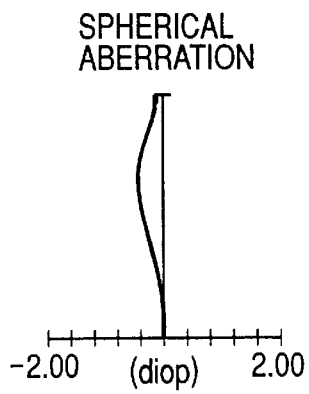
FIGS. 60A, 60B, and 60C are diagrams showing aberration curves at the telephoto position of the real image mode finder of the fifteenth embodiment.
Figure 60B:
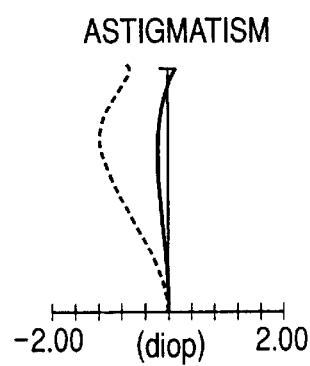
Figure 60C:
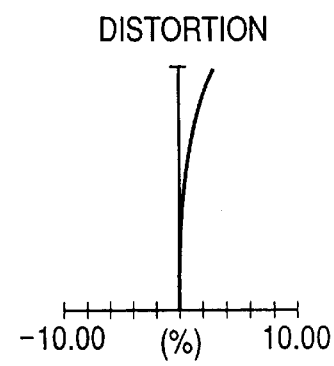

The finder of this embodiment, as shown in FIGS. 57A, 57B, and 57C, is constructed to include, in order from the object side, an objective optical system 67 comprised of the first lens unit $L_1$ with a negative refracting power, the second lens unit $L_2$ with a positive refracting power, and the third lens unit $L_3$ with a negative refracting power; a prism 68; a prism 69; and an eyepiece optical system 70. In the finder of the fifteenth embodiment, the prism 68 and the prism 69 constitute an image erecting optical system, and in particular, an entrance surface 68a of the prism 68 is configured as a planar surface. The intermediate image position P is set to lie on an entrance surface 69a of the prism 69.

The finder of the fifteenth embodiment has a variable magnification function. The first lens unit $L_1$ is moved along the optical axis toward the pupil side when the magnification is changed in the range from the wide-angle position to the middle position, and is moved toward the object side in the range from the middle position to the telephoto position. The second and third lens units $L_2$ and $L_3$ are simply moved along the optical axis toward the object side when the magnification is changed in the range from the wide-angle position to the telephoto position. The finder of the fifteenth embodiment is suitable for a high variable magnification finder because a high variable magnification ratio is set.

Figure 61A:
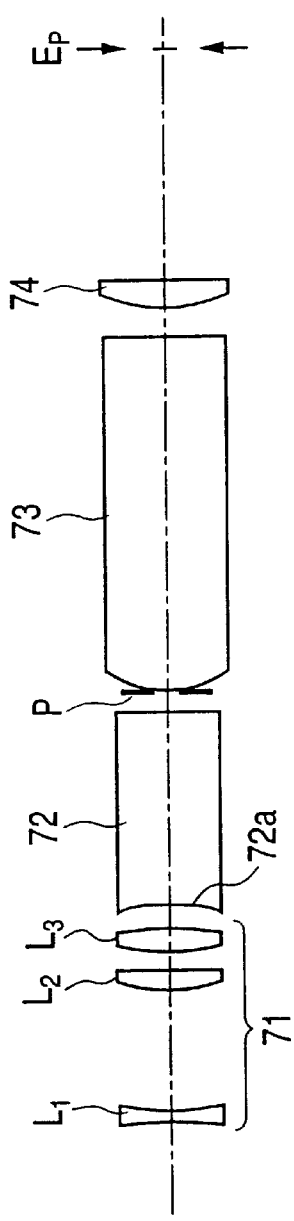
FIGS. 61A, 61B, and 61C are sectional views showing arrangements, developed along the optical axis, at wide- angle, middle, and telephoto positions, respectively, of the real image mode finder of a sixteenth embodiment in the present invention.
Figure 61B:
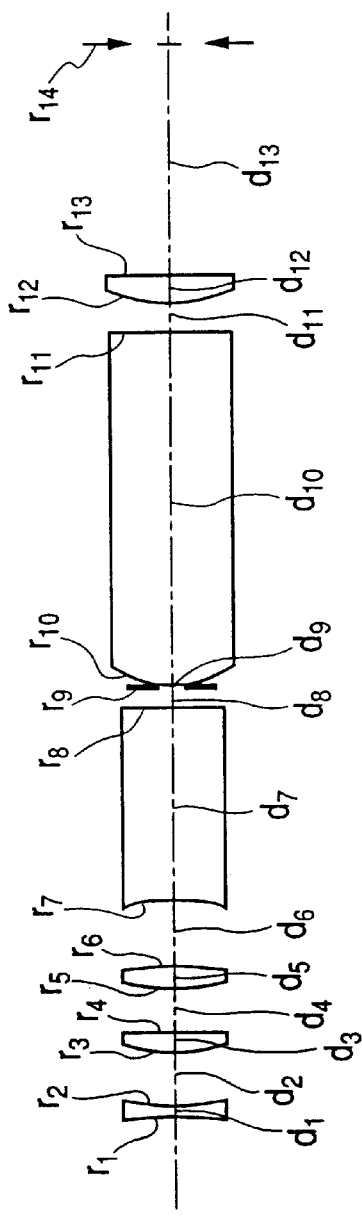
Figure 61C:
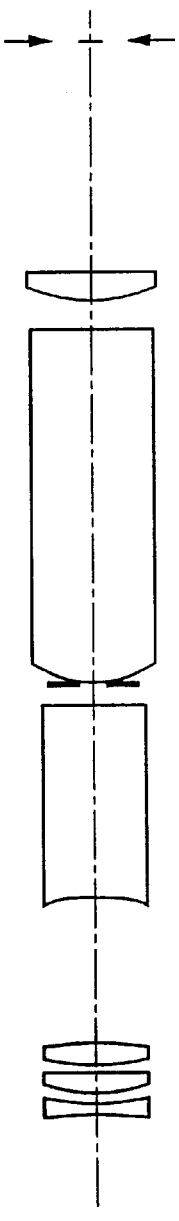
Figure 62A:
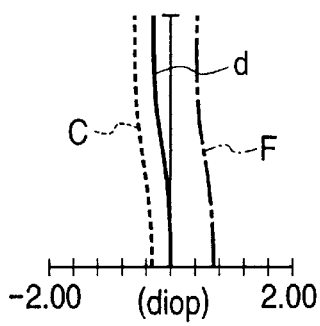
FIGS. 62A, 62B, and 62C are diagrams showing aberration curves at the wide-angle position of the real image mode finder of the sixteenth embodiment.
Figure 62B:
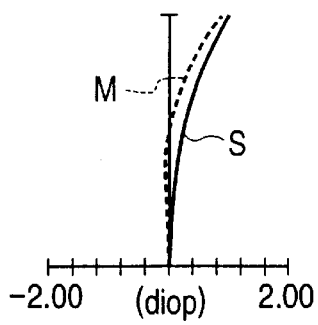
Figure 62C:
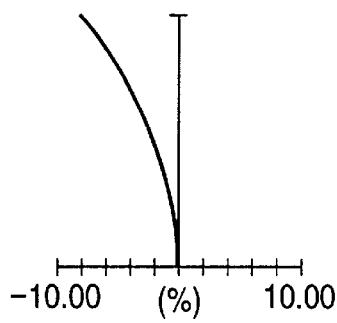
Figure 63A:
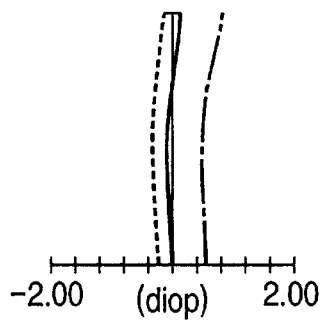
FIGS. 63A, 63B, and 63C are diagrams showing aberration curves at the middle position of the real image mode finder of the sixteenth embodiment.
Figure 63B:
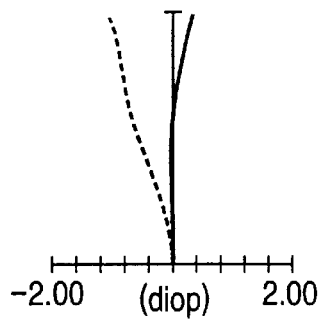
Figure 63C:
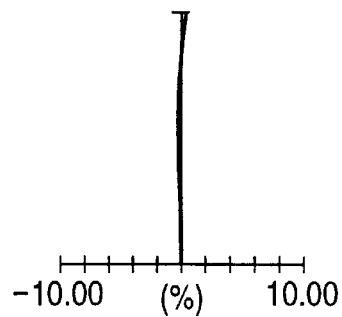
Figure 64A:
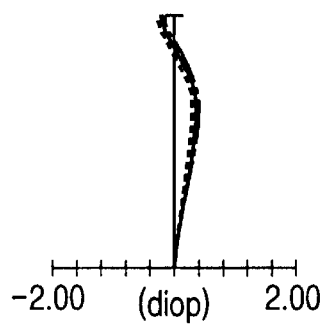
FIGS. 64A, 64B, and 64C are diagrams showing aberration curves at the telephoto position of the real image mode finder of the sixteenth embodiment.
Figure 64B:
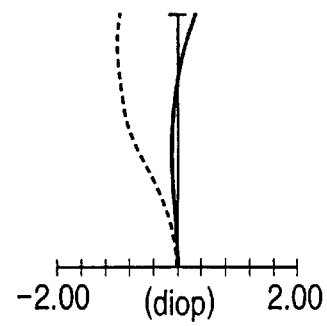
Figure 64C:
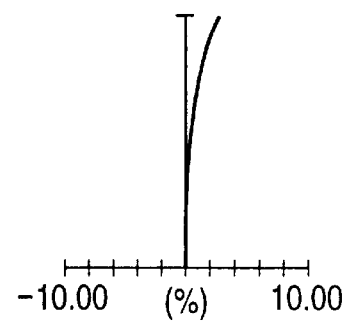

The following are various numerical data relative to the finder of the fifteenth embodiment.
Finder magnification=0.36×–1.12×
Angle of incidence=27.1° –8.4°
Pupil diameter=5 mm
D/fw=2.1163
Variable magnification ratio Z=3.068
Refractive index Nd=1.52542
$r_1=-33.9845$
  $d_1=0.3000$ $nd_1=1.58423$ $vd_1=30.49$
$r_2=8.6817$
  $d_2=10.5133$ (wide-angle), 4.0844 (middle), 0.5020 (telephoto)
$r_3=6.8311$ (aspherical)
  $d_3=2.7300$ $nd_3=1.52542$ $vd_3=55.78$
$r_4=-10.0635$ (aspherical)
  $d_4=0.3376$ (wide-angle), 2.6395 (middle), 5.9102 (telephoto)
$r_5=-6.6765$ (aspherical)
  $d_5=1.0871$ $nd_5=1.58423$ $vd_5=30.49$
$r_6=-7.2820$ (aspherical)
  $d_6=0.3000$ (wide-angle), 1.6530 (middle), 4.7712 (telephoto)
$r_7=\infty$
  $d_7=15.1948$ $nd_7=1.52542$ $vd_7=55.78$
$r_8=\infty$
  $d_8=2.0000$
$r_9=\infty$ (stop)
  $d_9=0.1250$
$r_{10}=8.8273$
  $d_{10}=26.8477$ $nd_{10}=1.52542$ $vd_{10}=55.78$
$r_{11}=\infty$
  $d_{11}=1.6580$
$r_{12}=10.8740$ (aspherical)
  $d_{12}=3.2000$ $nd_{12}=1.49241$ $vd_{12}=57.66$
$r_{13}=-83.0740$
  $d_{13}=16.9$
$r_{14}$ (eyepoint)
Conic Constants and Aspherical Coefficients
Third surface
  $K=0.1414$
  $A_4=-6.9830\times10^{-4}$, $A_6=-3.2229\times10^{-5}$,
  $A_8=-1.6702\times10^{-6}$, $A_{10}=-4.4457\times10^{-7}$
Fourth surface
  $K=0.1303$ $A_4=6.1657\times10^{-6}$, $A_6=-3.5449\times10^{-5}$,
$A_8=-5.3721\times10^{-6}$, $A_{10}=1.8267\times10^{-8}$
Fifth surface
  K=3.5635
  $A_4=2.4848\times10^{-3}$, $A_6=3.2459\times10^{-5}$,
  $A_8=-3.0859\times10^{-5}$, $A_{10}=9.6469\times10^{-6}$
Sixth surface
  K=4.2602
  $A_4=2.4692\times10^{-3}$, $A_6=7.6644\times10^{-5}$,
  $A_8=-2.8878\times10^{-5}$ $A_{10}=9.1660\times10^{-6}$
Twelfth surface
  K=0
  $A_4=-2.2448\times10^{-4}$, $A_6=7.0161\times10^{-6}$,
  $A_8=-2.9881\times10^{-7}$, $A_{10}=4.6223\times10^{-9}$
FIGS. 58A–58C, 59A–59C, and 60A–60C show aberration curves in the finder of the fifteenth embodiment.
Sixteenth Embodiment The finder of this embodiment, as shown in FIGS. 61A, 61B, and 61C, is constructed to include, in order from the object side, an objective optical system 71 comprised of the first lens unit $L_1$ with a negative refracting power, the second lens unit $L_2$ with a positive refracting power, and the third lens unit $L_3$ with a positive refracting power; a prism 72 whose entrance surface has a negative refracting power; a prism 73; and an eyepiece optical system 74. In the finder of the sixteenth embodiment, the prism 72 and the prism 73 constitute an image erecting optical system, and in particular, an entrance surface 72a of the prism 72 is configured as an aspherical surface and at the same time, is provided with a negative refracting power.

The finder of the sixteenth embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side. The finder of the sixteenth embodiment is set so that the negative refracting power of the first lens unit $L_1$ of the objective optical system 71 is weak, and hence can easily accommodate the case where an assembly error is considerably produced.

Figure 65A:
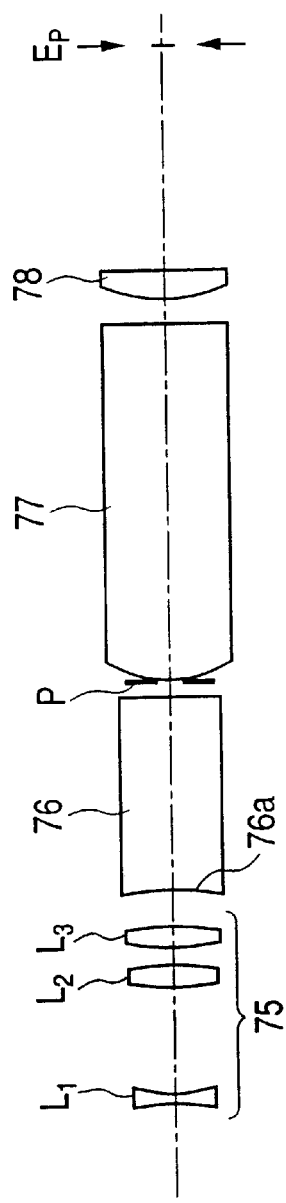
FIGS. 65A, 65B, and 65C are sectional views showing arrangements, developed along the optical axis, at wide-angle, middle, and telephoto positions, respectively, of the real image mode finder of a seventeenth embodiment in the present invention.
Figure 65B:
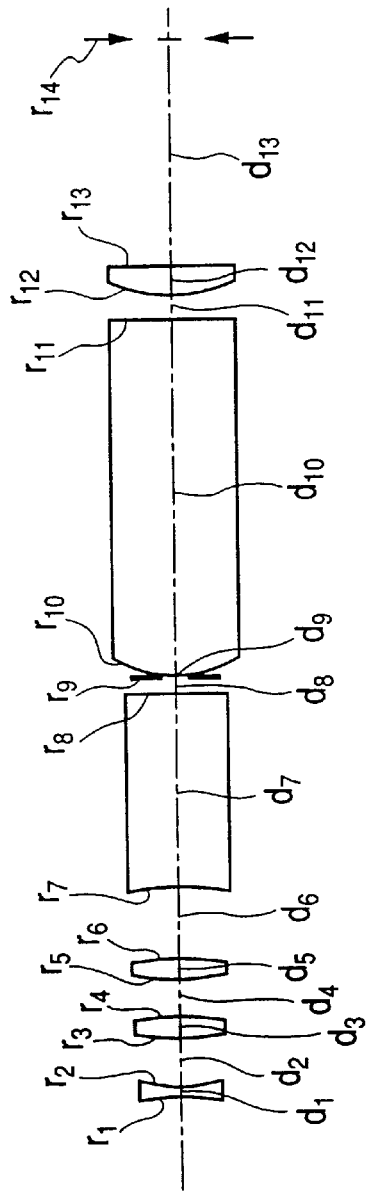
Figure 65C:
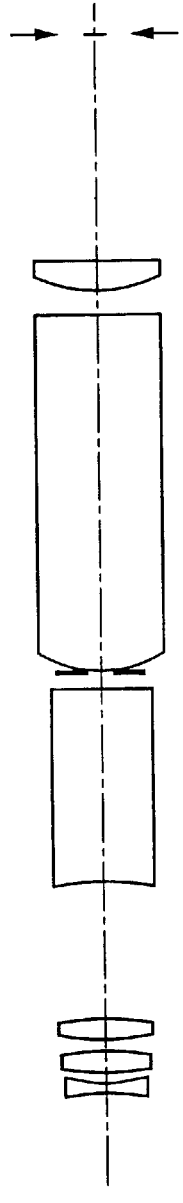
Figure 66A:
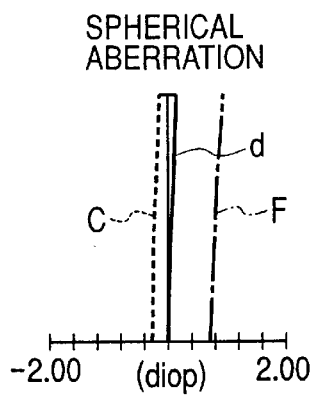
FIGS. 66A, 66B, and 66C are diagrams showing aberration curves at the wide-angle position of the real image mode finder of the seventeenth embodiment.
Figure 66B:
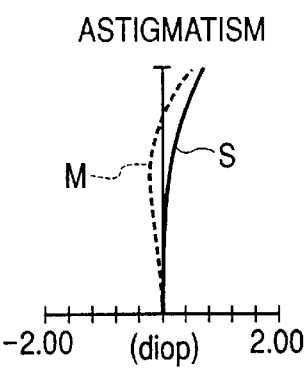
Figure 66C:
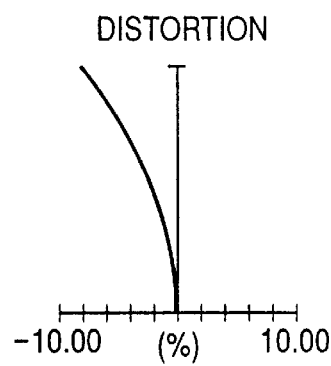
Figure 67A:
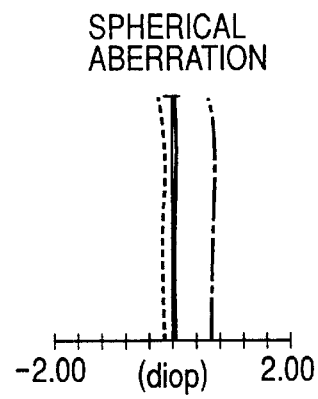
FIGS. 67A, 67B, and 67C are diagrams showing aberration curves at the middle position of the real image mode finder of the seventeenth embodiment.
Figure 67B:
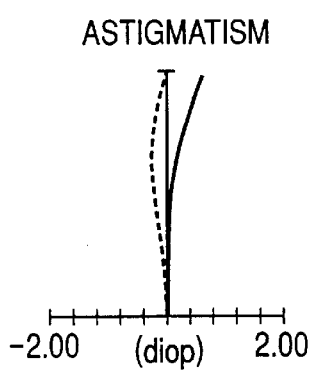
Figure 67C:
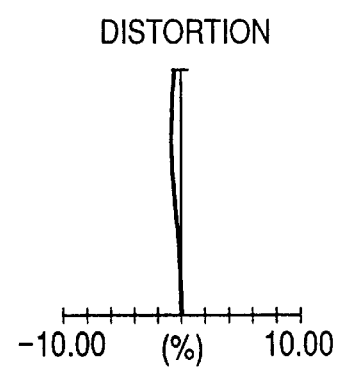
Figure 68A:
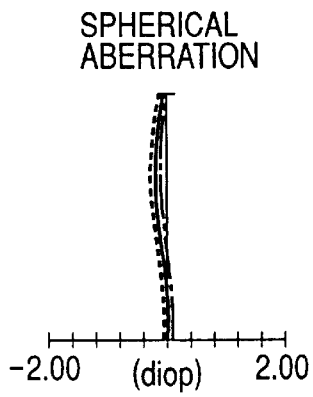
FIGS. 68A, 68B, and 68C are diagrams showing aberration curves at the telephoto position of the real image mode finder of the seventeenth embodiment.
Figure 68B:
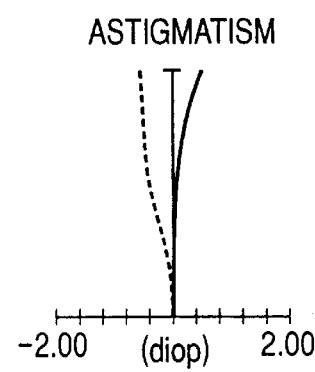
Figure 68C:
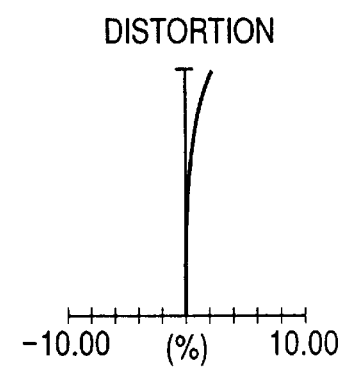

The following are various numerical data relative to the finder of the sixteenth embodiment.
Finder magnification=0.40×–1.06×
Angle of incidence=25.1° –9.0°
Pupil diameter=5 mm
D/L=1.4351
Variable magnification ratio Z=2.641
Refractive index Nd=1.52542
$f_1/Z=-3.982$
$(r_b+r_a)/(r_b-r_a)=0.892$
$r_1=-15.3306$
  $d_1=0.8000$ $nd_1=1.58423$ $vd_1=30.49$
$r_2=10.4465$ (aspherical)
  $d_2=8.5237$ (wide-angle), 3.7507 (middle), 0.7030 (telephoto)
$r_3$7.1022 (aspherical)
  $d_3=1.5537$ $nd_3=1.49241$ $vd_3=57.66$
$r_4=-124.9852$
  $d_4=1.3828$ (wide-angle), 3.0769 (middle), 0.7000 (telephoto)
$r_5=18.0865$
  $d_5=1.5397$ $nd_5=1.49241$ $vd_5=57.66$
$r_6=-13.2339$ (aspherical)
  $d_6=1.9000$ (wide-angle), 4.9789 (middle), 10.4036 (telephoto)
$r_7=-36.7719$ (aspherical)
  $d_7=14.4000$ $nd_7=1.52542$ $vd_7=55.78$
$r_8=\infty$
  $d_8=1.5000$
$r_9=\infty$ (intermediate image position)
  $d_9=0$
$r_{10}=10.6000$
  $d_{10}=26.4003$ $nd_{10}=1.52542$ $vd_{10}=55.78$
$r_{11}=\infty$
  $d_{11}=1.6984$
$r_{12}=13.7688$ (aspherical)
  $d_{12}=2.2210$ $nd_{12}=1.49241$ $vd_{12}=57.66$
$r_{13}=-31.3886$
  $d_{13}=17.3$
$r_{14}$ (eyepoint)
Conic Constants and Aspherical Coefficients
Second surface
  K=-2.2661
  $A_4=-3.3586\times10^{-4}$, $A_6=8.2042\times10^{-5}$,
  $A_8=-2.5525\times10^{-6}$, $A_{10}=-4.2719\times10^{-7}$
Third surface
  K=-0.0738
  $A_4=-7.0577\times10^{-4}$, $A_6=6.0184\times10^{-5}$,
  $A_8=-6.6797\times10^{-6}$, $A_{10}=2.8699\times10^{-7}$
Sixth surface
  K=-7.9825
  $A_4=-6.8490\times10^{-5}$, $A_6=9.3340\times10^{-6}$,
  $A_8=-7.9317\times10^{-7}$, $A_{10}=9.2245\times10^{-8}$
Seventh surface
  K=-21.8838
  $A_4=-4.9472\times10^{-4}$, $A_6=-2.6247\times10^{-5}$,
  $A_8=9.0546\times10^{-6}$ $A_{10}=-6.9183\times10^{-7}$
Twelfth surface
  K=1.2639
  $A_4=-2.0656\times10^{-4}$, $A_6=3.5918\times10^{-6}$,
  $A_8=-2.0259\times10^{-7}$, $A_{10}=3.4944\times10^{-9}$
FIGS. 62A–62C, 63A–63C, and 64A–64C show aberration curves in the finder of the sixteenth embodiment.
Seventeenth Embodiment The finder of this embodiment, as shown in FIGS. 65A, 65B, and 65C, is constructed to include, in order from the object side, an objective optical system 75 comprised of the first lens unit $L_1$ with a negative refracting power, the second lens unit $L_2$ with a positive refracting power, and the third lens unit $L_3$ with a positive refracting power; a prism 76 whose entrance surface has a negative refracting power; a prism 77; and an eyepiece optical system 78. In the finder of the seventeenth embodiment, the prism 76 and the prism 77 constitute an image erecting optical system, and in particular, an entrance surface 76a of the prism 76 is configured as an aspherical surface and at the same time, is provided with a negative refracting power.

The finder of the seventeenth embodiment has a variable magnification function. When the magnification of the finder is changed in the range from the wide-angle position to the telephoto position, the first lens unit $L_1$ is fixed and the second and third lens units $L_2$ and $L_3$ are simply moved along the optical axis toward the object side. Since the finder of the seventeenth embodiment is set so that its variable magnification ratio is somewhat low, a space between the objective optical system 75 and the prism 76 is comparatively easy to increase and this finder can easily accommodate the case where an assembly error is considerably produced.

The following are various numerical data relative to the finder of the seventeenth embodiment.
Finder magnification=0.46×–1.06×
Angle of incidence=22.2° –9.0°
Pupil diameter=5 mm
D/L=1.3658
Variable magnification ratio Z=2.302
Refractive index Nd=1.52542
$f_1/Z=-4.802$
$r_1=-11.2676$
  $d_1=0.8000$ $nd_1=1.58423$ $vd_1=30.49$
$r_2=15.5240$ (aspherical)
  $d_2=7.7592$ (wide-angle), 3.5598 (middle), 0.7030 (telephoto)
$r_3=11.2589$ (aspherical)
  $d_3=1.6664$ $nd_3=1.49241$ $vd_3=57.66$
$r_4=-12.2786$
  $d_4=1.5274$ (wide-angle), 2.7272 (middle), 0.7036 (telephoto)
$r_5=18.1719$
  $d_5=1.4303$ $nd_5=1.49241$ $vd_5=57.66$
$r_6=-23.5310$ (aspherical)
  $d_6=2.3169$ (wide-angle), 5.1162 (middle), 9.9966 (telephoto)
$r_7=-34.6966$ (aspherical)
  $d_7=14.7996$ $nd_7=1.52542$ $vd_7=55.78$
$r_8=\infty$
  $d_8=1.5000$
$r_9=\infty$ (intermediate image position)
  $d_9=0$
$r_{10}=10.6000$
  $d_{10}=26.4010$ $nd_{10}=1.52542$ $vd_{10}=55.78$
$r_{11}=\infty$
  $d_{11}=1.7093$
$r_{12}=13.6550$ (aspherical)
  $d_{12}=2.2210$ $nd_{12}=1.49241$ $vd_{12}=57.66$
$r_{13}=-31.5174$
  $d_{13}=17.3$
$r_{14}$ (eyepoint)
Conic Constants and Aspherical Coefficients
Second surface
  $K=-2.2894$
  $A_4=3.9522\times10^{-5}$, $A_6=6.3305\times10^{-6}$,
  $A_8=-3.7298\times10^{-6}$, $A_{10}=1.9064\times10^{-7}$
Third surface
  $K=0.0249$
  $A_4=-4.0432\times10^{-4}$, $A_6=3.3293\times10^{-6}$,
  $A_8=-1.2898\times10^{-6}$, $A_{10}=6.7916\times10^{-8}$
Sixth surface
  $K=-7.7179$
  $A_4=-1.0422\times10^{-4}$, $A_6=-1.4186\times10^{-5}$,
  $A_8=2.2062\times10^{-6}$, $A_{10}=-1.0352\times10^{-7}$
Seventh surface
  $K=-22.0520$
  $A_4=-9.9439\times10^{-5}$, $A_6=-8.7133\times10^{-5}$,
  $A_8=1.2266\times10^{-5}$, $A_{10}=-5.6020\times10^{-7}$
Twelfth surface
  $K=1.8048$
  $A_4=-2.3929\times10^{-4}$, $A_6=2.8311\times10^{-6}$,
  $A_8=-1.3325\times10^{-7}$, $A_{10}=1.0300\times10^{-9}$
FIGS. 66A–66C, 67A–67C, and 68A–68C show aberration curves in the finder of the seventeenth embodiment.

In the numerical data shown in the above embodiments, $r_1, r_2, \ldots$ represent radii of curvature of the surfaces of individual optical elements such as lenses; $d_1, d_2, \ldots$ represent thicknesses of individual optical elements, or spaces therebetween; $nd_1, nd_2, \ldots$ represent refractive indices of individual optical elements; and $vd_1, vd_2, \ldots$ represent Abbe's numbers of individual optical elements. Also, when X is taken as the coordinate in the direction of the optical axis, Y is taken as the coordinate in the direction normal to the optical axis, K denotes a conic constant, and $A_4$, $A_6$, $A_8$, and $A_{10}$ denote aspherical coefficients, the configuration of each of the aspherical surfaces in the embodiments is expressed by the following equation:

$$X = \frac{Y^2/r}{1+\sqrt{1-(1+K)(Y/r)^2}} + A_4 Y^4 + A_6 Y^6 + A_8 Y^8 + A_{10} Y^{10}$$

Eighteenth Embodiment

Figure 69:
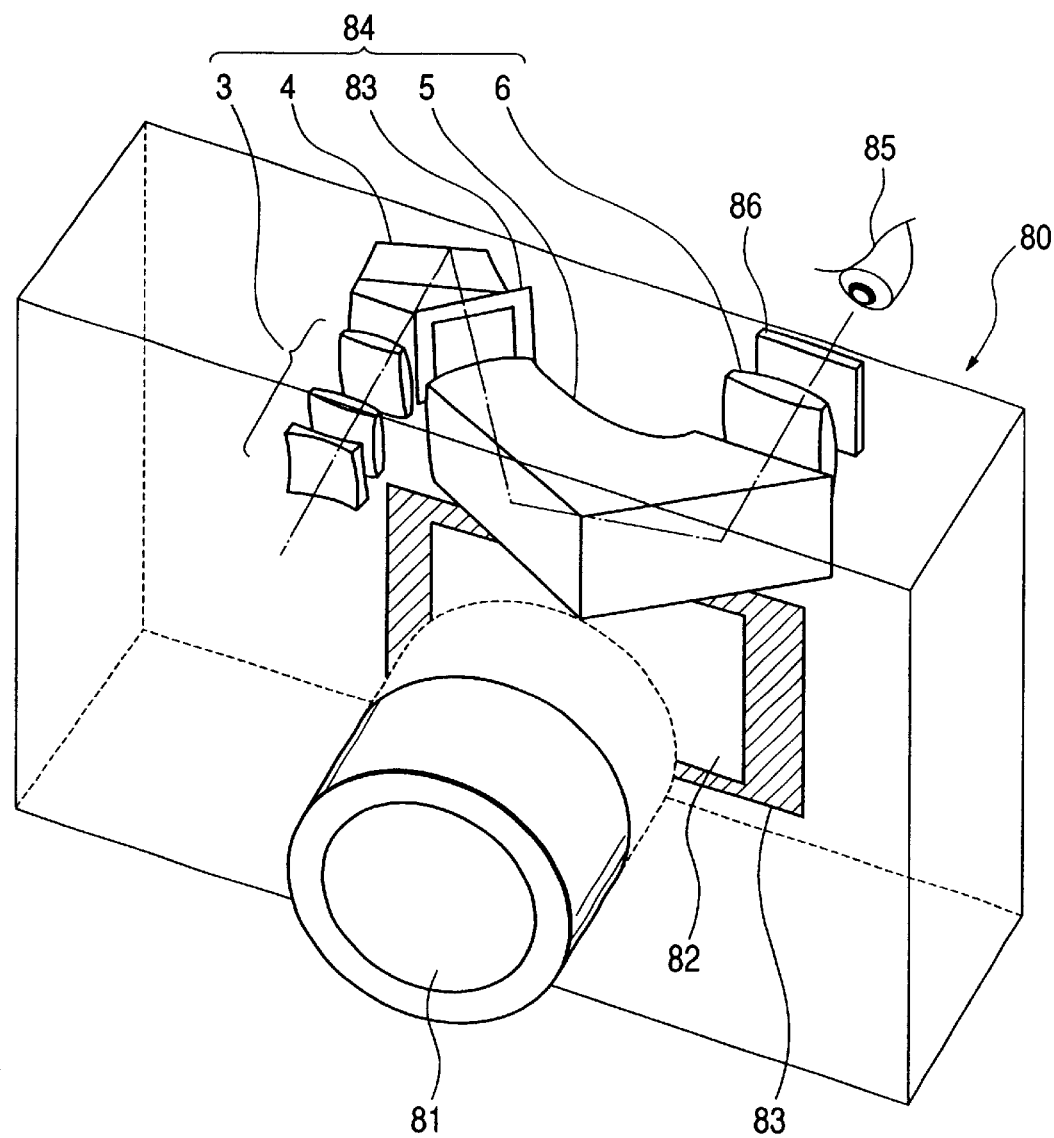
FIG. 69 is a view showing schematically the construction of a camera using the real image mode finder of the present invention.

FIG. 69 illustrates a camera 80 using the real image mode finder of the present invention. The camera in this embodiment, as shown in the figure, refers to the so-called lens shutter camera in which the real image mode finder of the present invention is provided to be independent of a photographic lens, introducing an incoming image into an observer's eye. A film plane 82 is provided so that a photographic film is placed close to the image plane of a photographic lens 81, and one of rectangular field stops 83 for determining a photographing area is placed immediately before the film plane 82. In this embodiment, as shown in FIG. 69, a direction nearly perpendicular to a plane including the optical axis of a real image mode finder 84 is taken as a short side, while a direction nearly parallel to the plane is taken as a long side.

The objective optical system 3 and the eyepiece optical system 6 of the real image mode finder 84 are configured so that the ineffective section of each lens is cut out, and thus compactness and lightweight of the finder can be obtained. In this way, the depth of the finder of the present invention is reduced and thereby compactness of the entire camera is achieved. On the side of an observer's eye 85, a glass cover 86 is placed which is comprised of a plane-parallel plate to protect the lens of the eyepiece optical system 6. This arrangement is not limited to the real image mode finder shown and may, of course, be used in the real image mode finder described in each of the other embodiments.

Also, the embodiments having been mentioned may be freely combined or may be partially removed in accordance with claims to be described below.

What is claimed is:

1. A real image mode finder comprising:
    an objective optical system with a positive refracting power;
    an image erecting optical system with a roof reflecting section, a first reflecting section, and a second reflecting section; and
    an eyepiece optical system with a positive refracting power,
    said image erecting optical system being constructed so that an optical axis is prevented from crossing in said image erecting optical system and a ray of light from said objective optical system is introduced into said roof reflecting section, said first reflecting section, and said second reflecting section in this order, and
    said real image mode finder satisfying the following conditions:

$49° < \gamma < 62.5°$ $20° < \alpha < 30°$ where γ is an angle of incidence of an axial ray of light on said second reflecting section and α is an angle of incidence of the axial ray of light on a roof ridgeline of said roof reflecting section.

2. A real image mode finder according to claim 1, wherein said angle of incidence γ satisfies the following condition:

$51.5° < \gamma < 56.5°$.

3. A real image mode finder according to claim 1, wherein said angle of incidence γ satisfies the following condition:

$53.5° < \gamma < 55°$.

4. A real image mode finder according to claim 1, wherein said angle of incidence α satisfies the following condition:

$22.5° < \alpha < 27.5°$.

5. A real image mode finder according to claim 1, wherein said angle of incidence α satisfies the following condition:

$24° < \alpha < 26°$.

6. A real image mode finder according to claim 1, satisfying the following condition:

$52.5° < \beta < 67.5°$ where β is an angle of incidence of the axial ray of light on said first reflecting section.

7. A real image mode finder according to claim 1, wherein the optical axis is totally reflected by said roof reflecting section, said first reflecting section, and said second reflecting section.

8. A real image mode finder according to claim 1, wherein each of said first reflecting section and said second reflecting section is an internally reflecting surface configured in a prism.

9. A real image mode finder according to claim 8, wherein said prism is configured so that an ineffective section of said prism is cut out.

10. A real image mode finder according to claim 8, wherein said prism is constructed integrally with said first reflecting section and said second reflecting section, and a surface opposite to both said first reflecting section and said second reflecting section is configured to direct a convex surface toward said first reflecting section and said second reflecting section.

11. A real image mode finder according to claim 8, satisfying the following condition:

$1.4 < Nd < 1.9$ where Nd is a refractive index of a medium of said prism.

12. A real image mode finder according to claim 1, wherein said objective optical system includes, in order from an object side, a first lens unit with a negative refracting power and a second lens unit with a positive refracting power.

13. A real image mode finder according to claim 12, wherein an optical group with power is interposed between an intermediate image formed by said objective optical system and said second lens unit.

14. A real image mode finder according to claim 1, wherein said objective optical system includes, in order from an object side, a first lens unit with a negative refracting power, a second lens unit with a positive refracting power, and a third lens unit with a positive refracting power.

15. A real image mode finder according to claim 1, wherein said objective optical system includes, in order from an object side, a first lens unit with a negative refracting power, a second lens unit with a positive refracting power, and a third lens unit with a negative refracting power.

16. A real image mode finder according to claim 1, wherein an optical axis incident on said objective optical system is substantially parallel to an optical axis emergent from said eyepiece optical system.

17. A real image mode finder according to claim 1, wherein at least one of said first reflecting section and said second reflecting section is a planar reflecting surface.

18. A real image mode finder according to claim 1, wherein each of said first reflecting section and said second reflecting section is a planar reflecting surface.

19. A real image mode finder comprising:
an objective optical system with a positive refracting power;
an image erecting optical system with a roof reflecting section, a first reflecting section, and a second reflecting section; and
an eyepiece optical system with a positive refracting power,
said image erecting optical system being constructed so that an optical axis is prevented from crossing in said image erecting optical system and a ray of light from said objective optical system is introduced into said roof reflecting section, said first reflecting section, and said second reflecting section in this order,
a prism, said first reflecting section and said second reflecting section being constructed integrally with said prism, and
a predetermined surface of said prism where effective light fails to pass being configured to direct a concave surface toward an opposite side of a medium of said prism.

20. A real image mode finder according to claim 19, wherein said predetermined surface of said prism where effective light fails to pass is opposite to both said first reflecting section and said second reflecting section.

21. A real image mode finder according to claim 19 or 20, wherein a crossline made by the concave surface of said prism with planes including the optical axis going through said prism is arcuate.

22. A real image mode finder according to claim 19 or 20, wherein a crossline made by the concave surface of said prism with planes including the optical axis going through said prism has arcs with different radii of curvature.

23. A real image mode finder according to claim 22, wherein said crossline has no angle.

24. A real image mode finder according to claim 19 or 20, wherein a crossline made by the concave surface of said prism with planes including the optical axis going through said prism is configured so that a plurality of arcs with different radii are smoothly connected.

25. A real image mode finder according to claim 19 or 20, wherein the concave surface of said prism is configured as a diffusing surface for diffusing light.

26. A real image mode finder according to claim 19 or 20, wherein the concave surface of said prism is provided with a light-absorbing material.

27. A real image mode finder comprising:
an objective optical system with a positive refracting power;

an image erecting optical system with a roof reflecting section, a first reflecting section, and a second reflecting section; and an eyepiece optical system with a positive refracting power, said image erecting optical system being constructed so that an optical axis is prevented from crossing in said image erecting optical system and a ray of light from said objective optical system is introduced into said roof reflecting section, said first reflecting section, and said second reflecting section in this order, a prism, said first reflecting section and said second reflecting section being constructed integrally with said prism, and a predetermined surface of said prism where effective light fails to pass being configured as a diffusing surface for diffusing light.

28. A real image mode finder comprising:

an objective optical system with a positive refracting power;

an image erecting optical system with a roof reflecting section, a first reflecting section, and a second reflecting section; and an eyepiece optical system with a positive refracting power, said image erecting optical system being constructed so that an optical axis is prevented from crossing in said image erecting optical system and a ray of light from said objective optical system is introduced into said roof reflecting section, said first reflecting section, and said second reflecting section in this order, a prism, said first reflecting section and said second reflecting section being constructed integrally with said prism, and a predetermined surface of said prism where effective light fails to pass being provided with a light-absorbing material.

29. A real image mode finder according to any one of claim 1, 19, 27 or 28, wherein said roof reflecting section is provided in a roof prism, said roof prism having an entrance surface that makes the optical axis incident on said roof prism and introduces the optical axis into said roof reflecting section and an exit surface that directs the optical axis reflected by said roof reflecting section toward said first reflecting section.

30. A real image mode finder according to claim 29, wherein at least one of said entrance surface and said exit surface of said roof prism is a curved refracting surface.

31. A real image mode finder according to claim 29, wherein each of said entrance surface and said exit surface of said roof prism is a curved refracting surface.

32. A real image mode finder comprising:

an objective optical system with a positive refracting power;

an image erecting optical system for erecting an intermediate image formed by said objective optical system;

a condenser lens element with a positive refracting power, placed in the proximity of said intermediate image; and an eyepiece optical system with a positive refracting power, introducing said intermediate image into an observer's eye, said objective optical system including, in order from an object side, a first lens unit with a negative refracting power, a second lens unit with a positive refracting power, and a third lens unit with a negative refracting power, only two of said first lens unit, said second lens unit, and said third lens unit being moved along an optical axis to change a magnification in a range from a wide-angle position to a telephoto position of said finder, and said finder satisfying the following conditions:

$1.5 < D/f_w < 2.2$ $2.52 < Z < 10$ where D is an axial distance from a foremost object-side surface of said objective optical system at the wide-angle position to a rearmost image-side surface thereof, $f_w$ is a focal length of said objective optical system at the wide-angle position, and Z is a variable magnification ratio of said objective optical system.

33. A real image mode finder according to claim 32, satisfying the following condition:

$1.5 < D/fw < 2.0$.

34. A real image mode finder according to claim 32, satisfying the following condition:

$2.52 < Z < 3.2$.

35. A real image mode finder according to claim 32, wherein when the magnification is changed, said third lens unit of said objective optical system is fixed.

36. A real image mode finder according to claim 32, satisfying the following condition:

$-3.9 < f_1/Z < -3.1$ (mm)

where $f_1$ is a focal length of said first lens unit of said objective optical system and is expressed in millimeters.

37. A real image mode finder according to claim 32, wherein said image erecting optical system includes a prism, and said condenser lens element constitutes at least one of an entrance surface and an exit surface of said prism.

38. A real image mode finder comprising:

an objective optical system with a positive refracting power;

an image erecting optical system having a first prism placed on an object side of an intermediate image formed by said objective optical system;

a condenser lens element with a positive refracting power, placed in the proximity of said intermediate image; and an eyepiece optical system with a positive refracting power, introducing said intermediate image into an observer's eye, said objective optical system including, in order from the object side, a first lens unit with a negative refracting power, a second lens unit with a positive refracting power, and a third lens unit with a positive refracting power, at least two of said first lens unit, said second lens unit, and said third lens unit being moved along an optical axis to change a magnification in a range from a wide-angle position to a telephoto position of said finder, and said finder satisfying the following conditions:

$1.15 < D/L < 1.58$ $2.52 < Z < 10$ where D is an axial distance from a foremost object-side surface of said objective optical system at the wide-angle position to a rear-most image-side surface thereof, L is an axial air-equivalent length from an entrance surface of said first prism placed on the object side of said intermediate image to said intermediate image, and Z is a variable magnification ratio of said objective optical system.

39. A real image mode finder according to claim 38, satisfying the following condition:

$$-3.8 < f_1/Z < -2.5 \text{ (mm)}$$

where $f_1$ is a focal length of said first lens unit of said objective optical system and is expressed in millimeters.

40. A real image mode finder according to claim 38, satisfying the following condition:

$$-3.8 < f_1/Z < -2.8 \text{ (mm)}$$

where $f_1$ is a focal length of said first lens unit of said objective optical system and is expressed in millimeters.

41. A real image mode finder according to claim 38, wherein when the magnification is changed, said first lens unit is fixed.

42. A real image mode finder according to claim 38, wherein said condenser lens element constitutes an exit surface with a positive refracting power, configured in said first prism placed on the object side of said intermediate image.

43. A real image mode finder according to claim 38, wherein said image erecting optical system has a second prism placed between said intermediate image and said eyepiece optical system, and said condenser lens element constitutes an entrance surface with a positive refracting power, configured in said second prism.

44. A real image mode finder according to claim 38, wherein said second lens unit of said objective optical system consists of one element and satisfies the following condition:

$$0.3 < (r_b + r_a)/(r_b - r_a) < 3.0$$

where $r_a$ is a radius of curvature of an object-side surface of said second lens unit and $r_b$ is a radius of curvature of an image-side surface of said second lens unit.

45. A real image mode finder according to claim 38, wherein said objective optical system includes a fourth lens unit with a negative refracting power, having a concave surface directed toward the object side, interposed between said third lens unit and said intermediate image.

46. A real image mode finder according to claim 38, wherein an entrance surface of said first prism is a concave surface directed toward the object side.

47. A real image mode finder according to any one of claim 1, 19, 27, 28, 32 or 38, wherein said finder is provided to be independent of a photographing optical system, said photographing optical system and said finder being used in a camera.

* * * * *